United States Patent
Mastopietro et al.

(10) Patent No.: US 12,027,278 B2
(45) Date of Patent: Jul. 2, 2024

(54) ANTI-ROTATION ARRANGEMENT FOR THERMAL SLEEVES

(71) Applicant: Westinghouse Electric Company LLC, Cranberry Township, PA (US)

(72) Inventors: Anthony J. Mastopietro, Wauwatosa, WI (US); Eric M. Benacquista, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 107 days.

(21) Appl. No.: 17/433,779

(22) PCT Filed: Feb. 20, 2020

(86) PCT No.: PCT/US2020/019116
§ 371 (c)(1),
(2) Date: Aug. 25, 2021

(87) PCT Pub. No.: WO2020/205079
PCT Pub. Date: Oct. 8, 2020

(65) Prior Publication Data
US 2022/0139580 A1     May 5, 2022

Related U.S. Application Data

(60) Provisional application No. 62/864,857, filed on Jun. 21, 2019, provisional application No. 62/853,976, (Continued)

(51) Int. Cl.
*G21C 13/036* (2006.01)
*G21C 13/04* (2006.01)

(52) U.S. Cl.
CPC .......... *G21C 13/036* (2013.01); *G21C 13/04* (2013.01)

(58) Field of Classification Search
CPC .... G21C 13/04; G21C 13/036; G21C 17/017; G21C 17/012
See application file for complete search history.

(56) References Cited

U.S. PATENT DOCUMENTS 3,415,080 A * 12/1968 Swanson ............. F16C 29/0688
464/71
4,518,559 A   5/1985 Fischer et al.
(Continued)

FOREIGN PATENT DOCUMENTS

FR      9203605 A1      3/1992
FR      2689297 A1 * 10/1993 ........... G21C 13/036
(Continued)

OTHER PUBLICATIONS

International Search Report and Written Opinion for International PCT Application No. PCT/US2020/019116, dated Nov. 20, 2020.

*Primary Examiner* — Lily C Garner
(74) *Attorney, Agent, or Firm* — K&L Gates LLP

(57) ABSTRACT

Arrangements and devices for reducing and/or preventing wear of a thermal sleeve in a nuclear reactor are disclosed. Arrangements include a first structure provided on or in one the thermal sleeve and a second structure provided on or in the head penetration adapter. At least a portion of the first structure and at least another portion of the second structure interact to resist, reduce, and/or prevent rotation of the thermal sleeve about its central axis relative to the head penetration adapter. Devices include a base for coupling to a guide tube of the reactor and a plurality of protruding members extending upward from the base. Each member having a portion for engaging a corresponding portion of a guide funnel of the thermal sleeve.

15 Claims, 42 Drawing Sheets

Related U.S. Application Data filed on May 29, 2019, provisional application No. 62/833,066, filed on Apr. 12, 2019, provisional application No. 62/810,180, filed on Feb. 25, 2019.

(56) References Cited

U.S. PATENT DOCUMENTS

| | | | | |
|---|---|---|---|---|
| 4,655,483 | A * | 4/1987 | Margotta | F16L 19/065 |
| | | | | 376/292 |
| 4,720,898 | A * | 1/1988 | Calfo | G21C 7/08 |
| | | | | 976/DIG. 118 |
| 4,723,795 | A * | 2/1988 | Shenoy | G21C 13/036 |
| | | | | 976/DIG. 173 |
| 5,001,840 | A | 3/1991 | Dixon et al. | |
| 5,053,189 | A | 10/1991 | Chrise et al. | |
| 5,263,060 | A * | 11/1993 | Obermeyer | G21C 17/10 |
| | | | | 376/245 |
| 5,396,525 | A * | 3/1995 | Domy | G21C 17/01 |
| | | | | 29/402.06 |
| 5,918,911 | A * | 7/1999 | Sims | G21C 13/036 |
| | | | | 285/15 |
| 6,053,652 | A * | 4/2000 | Deaver | G21C 19/207 |
| | | | | 403/312 |
| 6,275,556 | B1 | 4/2001 | Kinney et al. | |
| 11,557,402 | B2 * | 1/2023 | Brenin | G21C 7/16 |
| 2018/0202497 | A1 | 7/2018 | Lentini et al. | |
| 2021/0366624 | A1 * | 11/2021 | Brenin | G21C 7/10 |

FOREIGN PATENT DOCUMENTS

| | | | |
|---|---|---|---|
| FR | 2701785 A1 * | 8/1994 | G21C 13/036 |
| WO | 2019193088 A1 | 10/2019 | |
| WO | 2020205079 A2 | 10/2020 | |

\* cited by examiner

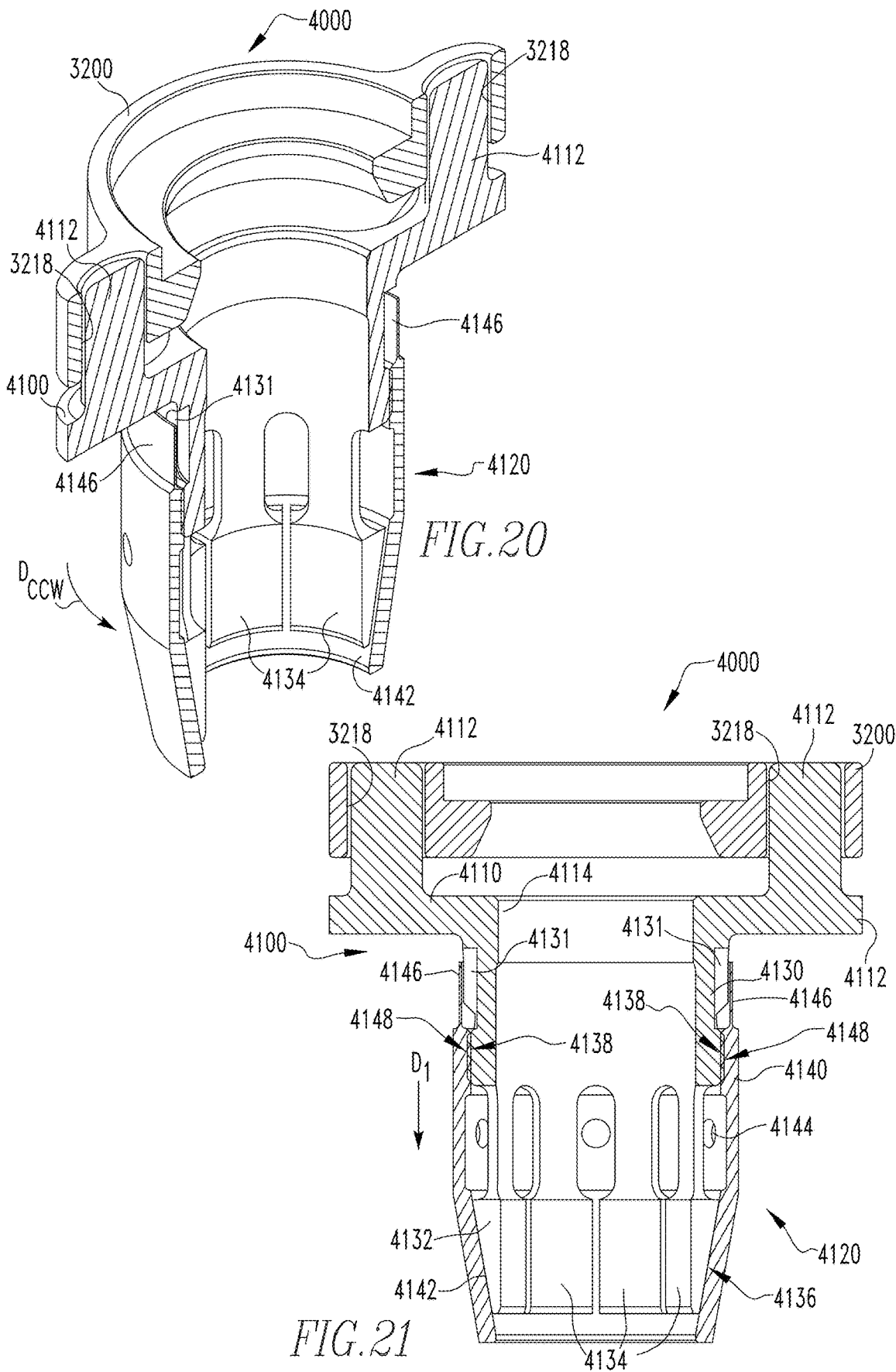

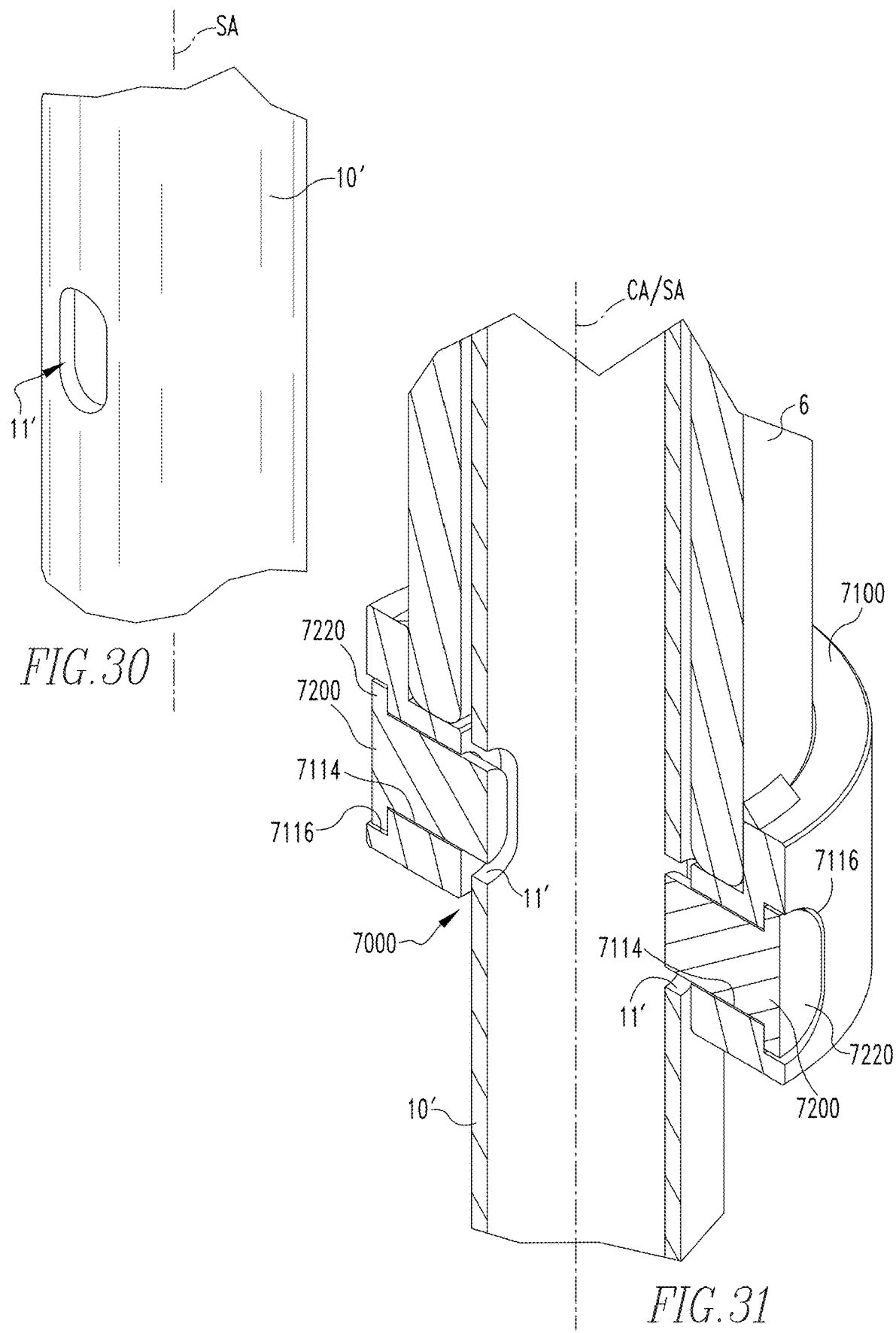

ANTI-ROTATION ARRANGEMENT FOR THERMAL SLEEVES

CROSS-REFERENCE TO RELATED APPLICATIONS

This application is a U.S. National Stage Entry under 35 U.S.C. § 371 of International Patent Application No. PCT/US2020/019116, entitled ANTI-ROTATION ARRANGEMENTS FOR THERMAL SLEEVES, filed Feb. 20, 2020, which claims benefit under 35 U.S.C. § 119 (e) to U.S. Provisional Patent Application Ser. No. 62/810,180, entitled ANTI-ROTATION ARRANGEMENT FOR THERMAL SLEEVES, filed Feb. 25, 2019, the disclosure of which is incorporated by reference herein in its entirety. This application also claims the benefit of U.S. Provisional Patent Application Ser. No. 62/833,066, entitled WEAR REDUCING ARRANGEMENTS FOR THERMAL SLEEVES, filed Apr. 12, 2019, the disclosure of which is incorporated by reference herein in its entirety. This application also claims the benefit of U.S. Provisional Patent Application Ser. No. 62/853,976, entitled WEAR REDUCING ARRANGEMENTS FOR THERMAL SLEEVES, filed May 29, 2019, the disclosure of which is incorporated by reference herein in its entirety. This application also claims the benefit of U.S. Provisional Patent Application Ser. No. 62/864,857, entitled WEAR REDUCING ARRANGEMENTS FOR THERMAL SLEEVES, filed Jun. 21, 2019, the disclosure of which is incorporated by reference herein in its entirety.

BACKGROUND

The disclosed concept pertains generally to thermal sleeves and, more particularly, to arrangements for resisting, reducing, and/or preventing rotation of thermal sleeves used in nuclear reactors. The disclosed concept also pertains to methods of installing such arrangements.

In response to operational experience at a number of nuclear plants there is a clear need for increasing lifespan of thermal sleeves used in nuclear reactors. Thermal sleeve flange wear is a phenomenon first identified domestically in 2014 when a part-length sleeve failed. Since then inspections have been recommended and acceptance criteria have been developed. More recently (December 2017), two additional thermal sleeve failures at rodded locations were identified.

FIG. 1A is a schematic cross-sectional view of an upper portion of a conventional nuclear reactor 2 illustrating a portion of a reactor vessel 4 penetrated by a plurality of head penetration adapters 6 which extend downward from a control rod drive mechanism (CRDM) housing 8. Continuing to refer to FIG. 1A, as well as to the sectional view of FIG. 1B, a thermal sleeve 10 including a guide funnel 12 is positioned within each head penetration adapter 6 beneath each CRDM housing 8 such that each guide funnel 12 is positioned directly above, and spaced a distance from, a corresponding guide tube 14 extending from an upper support plate 16 within reactor vessel 4. The thermal sleeve 10 is housed within the head penetration adapter 6 within the reactor vessel 4 except within region 15 (FIG. 1B) where the thermal sleeve 10 is exposed to the reactor coolant.

The current belief is that wear of thermal sleeve 10 and head penetration adapter 6 in region 13 illustrated in FIGS. 1A and 1B results from rotation of the thermal sleeve 10 within the head penetration adapter 6 about a central axis 18 of the thermal sleeve 10. It is believed that vortices in the reactor coolant flowing within the reactor vessel 4 come into contact with the thermal sleeve 10 (i.e., in region 15) causing the thermal sleeve 10 to rotate about its central axis 18 relative to the head penetration adapter 6.

SUMMARY

Embodiments of the disclosed concept increase the lifespan of thermal sleeves employed in nuclear reactors by reducing the wear of such sleeves and related components resulting from rotation of thermal sleeves within a head penetration adapter. In general, embodiments of the present invention utilize structures which can be readily attached, either during installation of a thermal sleeve or retrofit to an installed thermal sleeve, that resist, reduce, and/or prevent the thermal sleeve from rotating, but still allow for axial movement of the sleeve, such as due to thermal expansion/contraction and/or to allow the passage of reactor coolant when necessary. In other words, the structures attachable to the thermal sleeve and/or the head penetration adapter are configured to resist rotation of the thermal sleeve which may result due to vortices of coolant flow within the reactor which come into contact with the thermal sleeve.

As one aspect of the disclosed concept, an arrangement for resisting, reducing, and/or preventing rotation and/or precession of a thermal sleeve about a central axis thereof relative to a head penetration adapter in a nuclear reactor is provided. The arrangement comprises a first structure provided on or in the thermal sleeve and a second structure provided on or in the head penetration adapter, wherein the first structure and the second structure are configured to be operably engaged to resist, reduce, and/or prevent rotation of the thermal sleeve about the central axis relative to the head penetration adapter while allowing axial movement of the thermal sleeve relative to the head penetration adapter.

The first structure may comprise a first ring configured to be coupled to one of the thermal sleeve or the head penetration adapter, the first ring having a plurality of rod members extending therefrom, each rod member extending along a respective rod axis positioned so as to be disposed parallel to the central axis when the first structure is coupled to the one of the thermal sleeve or the head penetration adapter, wherein the second structure comprises a second ring configured to be coupled to the other one of the thermal sleeve or the head penetration adapter, the second ring having a plurality of thru-holes formed therein, each thru-hole being disposed about a thru-hole axis positioned so as to be disposed parallel to the central axis when the second ring is coupled to the other one of the thermal sleeve or the head penetration adapter, and wherein each rod member of the first ring is configured to slidingly engage a corresponding thru-hole of the second ring in a manner such that they resist, reduce, and/or prevent rotation of the thermal sleeve about the central axis relative to the head penetration adapter while allowing axial movement of the thermal sleeve relative to the head penetration adapter.

The first ring may be formed of a stainless steel material, and the second ring may be formed from an alloy.

The second ring may comprise a female threaded portion which is configured to engage a cooperatively male threaded portion of the head penetration adapter.

The second ring may comprise an inner stepped portion configured to receive a lower end of the head penetration adapter.

The second ring may comprise a first segment and a second segment selectively couplable to the first segment.

The plurality of rod members may comprise two rod members.

The first ring may be split into a first segment and a second segment.

The first segment and the second segment may each include interlocking portions, wherein the first segment and the second segment are couplable together via the interlocking portions.

The first ring may comprise a first piece and a second piece separate from the first piece, the first piece may include one rod member of the plurality of rod members, and the second piece may include another rod member of the plurality of rod members.

Each rod member may have a non-circular cross-section and each thru-hole may have a correspondingly-shaped non-circular cross-section.

One of the first structure or the second structure may comprise a mechanical clamp configured to mechanically couple the one of the first structure or the second structure to the thermal sleeve or the head penetration adapter.

One of the first structure or the second structure may comprise a split clamp configured to be coupled to the thermal sleeve, the split clamp formed from two segments which are configured to be selectively coupled together via threaded fasteners.

One of the two segments may include pockets formed therein for engagement by crimped portions of one of the threaded fasteners.

The one of the first structure or the second structure may further comprise rods, the other one of the first structure or the second structure may comprise axial slots formed in the head penetration adapter, and each rod may be configured to engage a respective axial slot.

The first structure may comprise a main body portion configured to be coupled to a head penetration adapter, the main body portion may include a plurality of horizontally oriented apertures formed therein with each aperture housing a sliding member therein, the second structure may comprise a plurality of slots defined in the thermal sleeve, and each sliding member may be configured to engage a corresponding slot.

As another aspect of the disclosed concept, a device for resisting, reducing, and/or preventing wear of a thermal sleeve of a nuclear reactor is provided. The device comprises a base configured to be coupled to a guide tube of the nuclear reactor and a plurality of protruding elements, or members, extending upward from the base. Each member is configured to engage a corresponding portion of a guide funnel of the thermal sleeve.

The base may comprise a generally circular ring.

The ring may comprise a plurality of apertures defined therethrough.

The base may further comprise a circumferential lip extending downward therefrom, wherein the circumferential lip is sized and configured to engage an outer portion of the guide tube.

The base may further comprise a plurality of collars, each collar being disposed about a corresponding one of the apertures and extending upward from the base.

Each protruding member may comprise an outward facing surface disposed at an angle that corresponds to the angle of an inner conical surface of the guide funnel.

Each outward facing surface is sized and configured to engage a corresponding portion of the inner conical surface of the guide funnel.

The outward facing surface of each protruding member may comprise a key extending further outward therefrom, each key may be sized and configured to cooperatively engage a corresponding slot defined in the guide funnel.

Each key may comprise a vertically oriented ridge-like member.

Each protruding member may comprise an inward facing notch that is sized and configured to engage a portion of the outer periphery of a guide funnel coupled to the thermal sleeve.

As yet a further aspect of the disclosed concept, a method of installing any of the aforementioned arrangements and/or devices is provided.

BRIEF DESCRIPTION OF THE DRAWINGS

Various features of the embodiments described herein, together with advantages thereof, may be understood in accordance with the following description taken in conjunction with the accompanying drawings as follows:

FIG. 20 is a perspective cross-sectional view of the device of FIG. 18 taken along line 20-20 in FIG. 18;

FIG. 21 is a side cross-sectional view of the device of FIG. 18 taken along line 21-21 in FIG. 18;

FIG. 30 is a perspective view of a portion of a thermal sleeve including axial cutouts for use with the device of FIG. 28;

FIG. 31 is a cross-sectional view of FIG. 29 taken along line 31-31 of FIG. 29;

Corresponding reference characters indicate corresponding parts throughout the several views. The exemplifications set out herein illustrate various embodiments of the invention, in one form, and such exemplifications are not to be construed as limiting the scope of the invention in any manner.

DETAILED DESCRIPTION

Figure 1A:
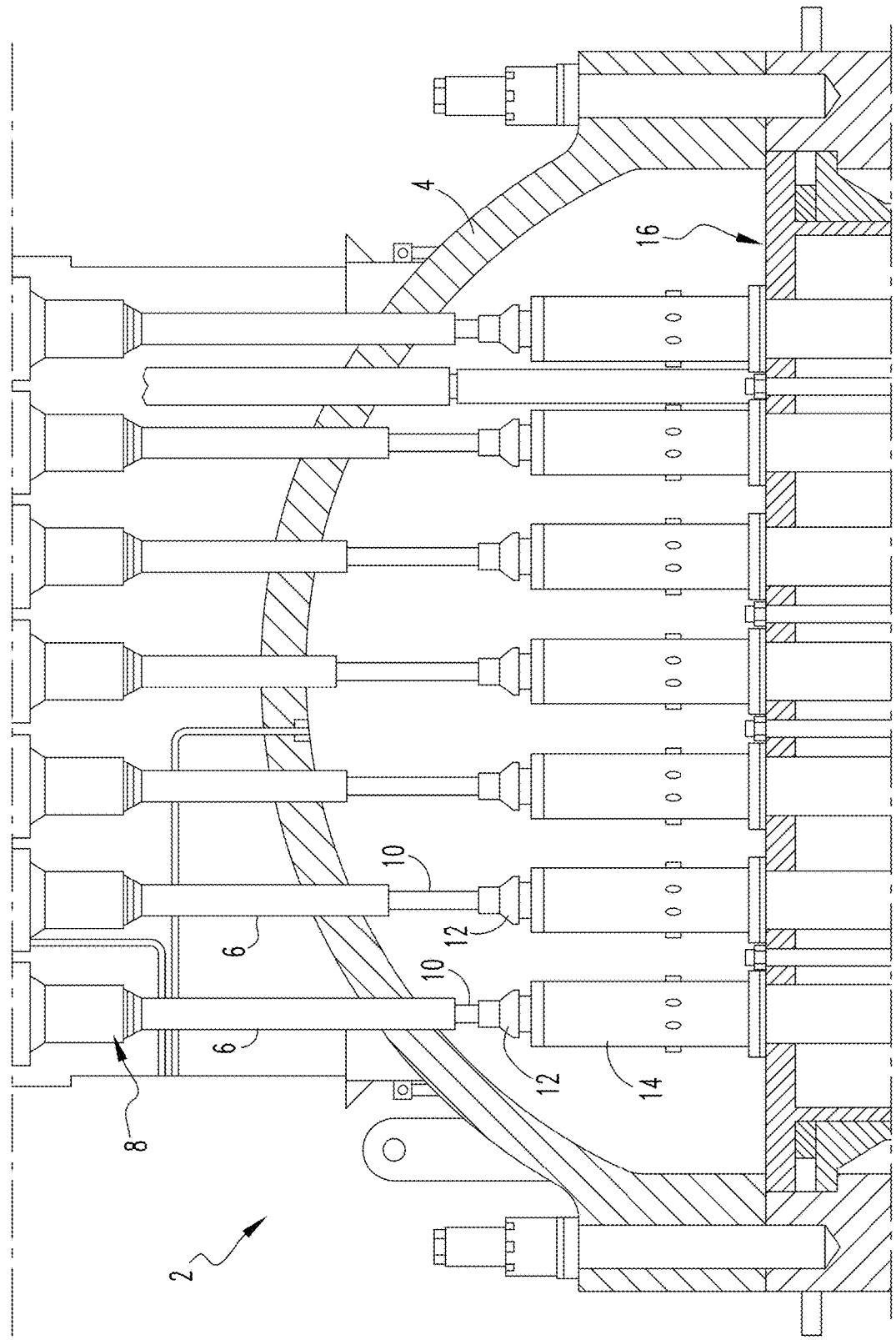
FIG. 1A is a schematic cross-sectional view of an upper portion of a conventional nuclear reactor.
Figure 1B:
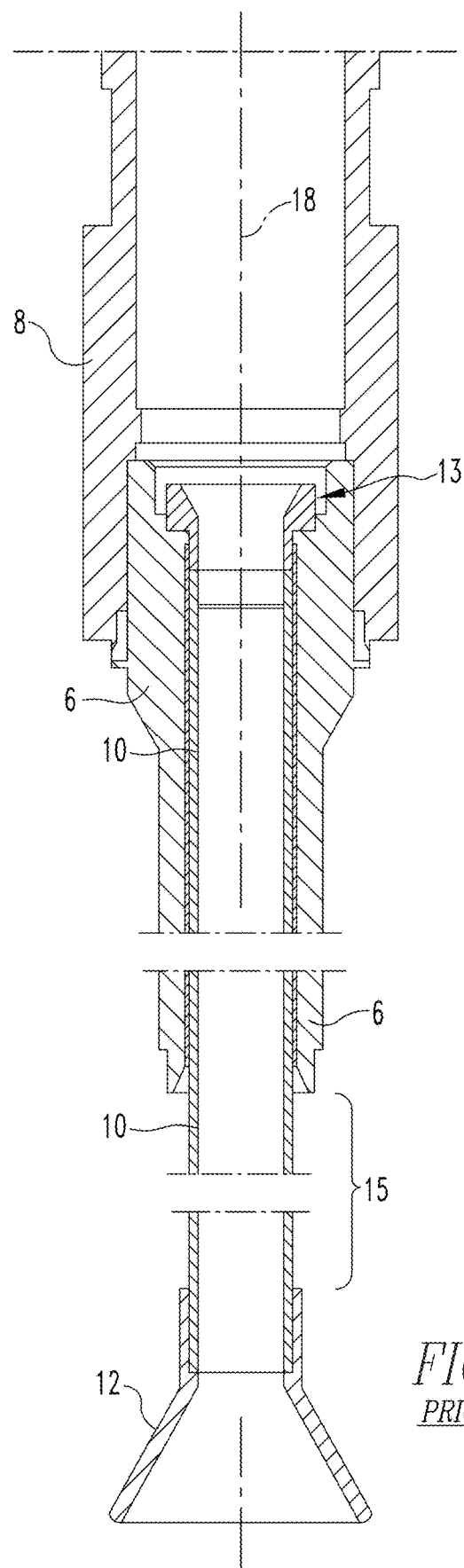
FIG. 1B is a schematic cross-sectional view of a conventional reactor vessel head penetration illustrating a CRDM housing, a head penetration adapter, and a thermal sleeve.

It has been observed that thermal sleeves have been wearing between the upper head on the thermal sleeve and the head penetration adapter. This wear is observed by taking measurements using laser metrology to determine the amount that a particular thermal sleeve has "dropped" relative to the head penetration adapter. As part of an innovation program, methods for removing worn thermal sleeves and replacing them with a temporary "compressible thermal sleeve" was developed, which does not require removal of the CRDM motor assembly from the top side of the reactor head. Such methods and replacement thermal sleeves are described in pending U.S. patent application Ser. No. 16/262,037, entitled THERMAL SLEEVE, filed Jan. 30, 2019, the disclosure of which is incorporated by reference herein in its entirety. However, the mechanism of failure (i.e., wearing of the thermal sleeve and head penetration adapter) was not addressed, and a compressible thermal sleeve will most likely continue to wear along with the head penetration adapter in a similar manner to the worn thermal sleeve which has been replaced.

A solution to reduce and/or preventing such wear is to install a device on to the head penetration adapter which will create an interface for a second device which is attached to the thermal sleeve. Once the two devices are in place and interfaced with one another, the degrees of freedom of the thermal sleeve are limited, removing rotation about the centerline axis of the thermal sleeve. Embodiments of the concept generally utilize a ring or similar structure which is attached to the head penetration adapter by various methods depending on the design of the head penetration adapter. The device may attach to the threads or interface with the outer diameter of the head penetration adapter. The device is fixed and retained by any suitable mechanical means, such as, without limitation, welding, clamping, pinning, screwing, etc., and/or combinations thereof. In at least one embodiment, the device is integral to the head penetration adapter. The device includes features such as holes, slots, splines or keyways which are engaged by a mating device attached to the thermal sleeve. The device which attaches to the thermal sleeve can be attached by any suitable mechanical means such as welding, clamping, pinning, screwing, etc., In at least one embodiment, the device which attaches to the thermal sleeve is integral to the thermal sleeve design. The engagement of the splines or keys will prevent most of the relative rotational motion of the thermal sleeve and the head penetration adapter. This motion is the source of the wear which leads to thermal sleeve failure. By restricting this motion, the functional life of the thermal sleeves is greatly extended. In at least one embodiment, the device or devices resist, reduce, and/or prevent rotational motion of the thermal sleeve relative to the head penetration adapter while allowing some axial movement of the thermal sleeve relative to the head penetration adapter.

There are generally two applications for such solutions. The first application incorporates the device(s) into a replacement compressible thermal sleeve. The second application incorporates the device(s) on an existing thermal sleeve which has shown some wear within acceptable limits.

Alternative designs include, for example, attaching a device to the head penetration adapter which interfaces with features machined into the thermal sleeve which meet the design intention of resisting, reducing, and/or preventing rotation and/or translation (one or both).

Before explaining various aspects of the present disclosure in detail, it should be noted that the illustrative examples are not limited in application or use to the details of construction and arrangement of parts illustrated in the accompanying drawings and description. The illustrative examples may be implemented or incorporated in other aspects, variations, and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects, and/or examples.

Figure 2:
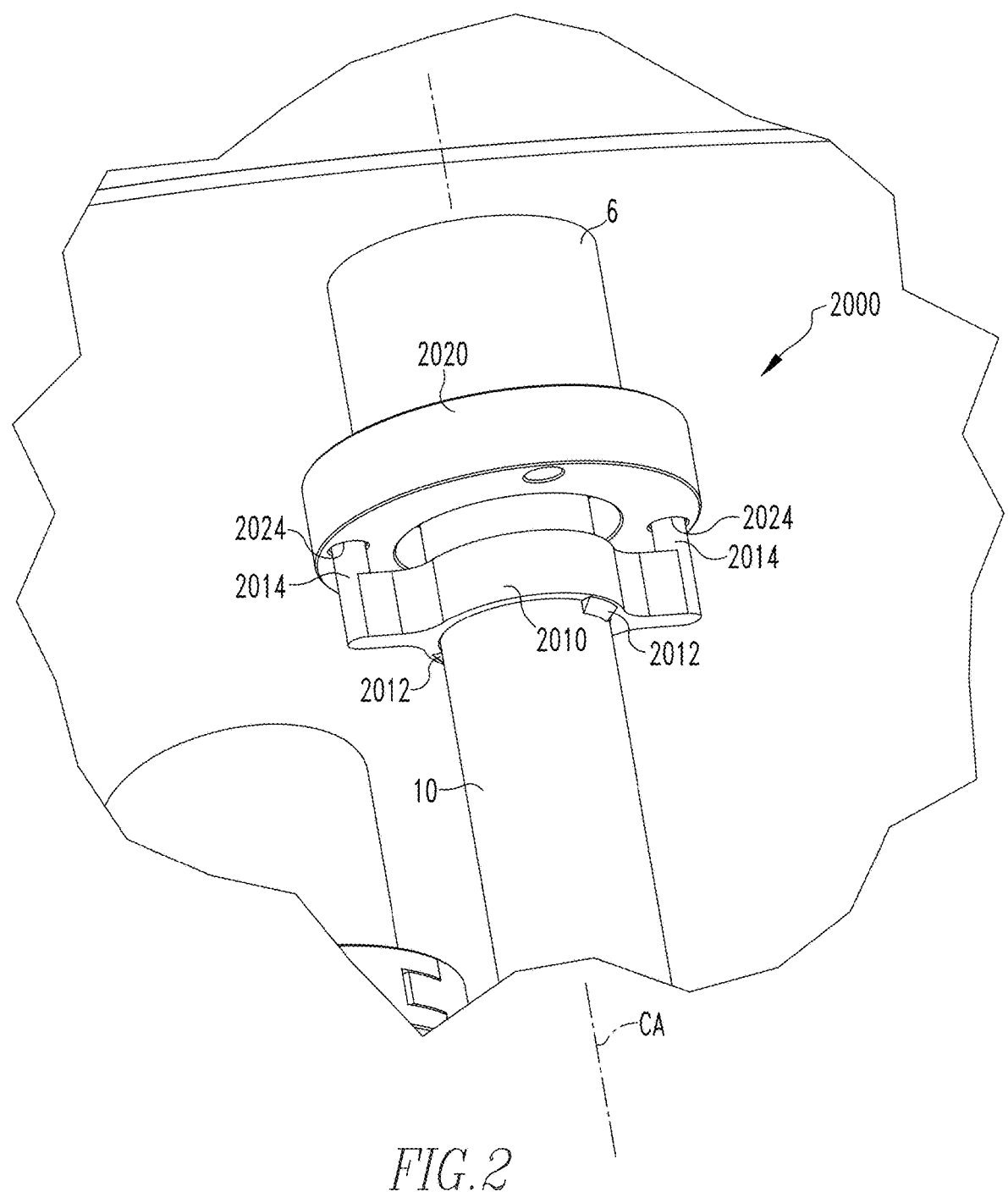
FIG. 2 is a perspective view of a device for resisting, reducing, and/or preventing rotation of a thermal sleeve about a central axis thereof relative to a head penetration adapter in a nuclear reactor in accordance with at least one aspect of the present disclosure

FIGS. 2-7 depict a device 2000 configured to resist, reduce, and/or prevent rotation of a thermal sleeve 10 about a central axis CA thereof relative to a head penetration adapter 6 in a nuclear reactor. FIG. 2 illustrates the device 2000 installed on portions of the head penetration adapter 6 and the thermal sleeve 10. The arrangement includes a first structure, or a first ring 2010, which is coupled (e.g., via welds 2012) to the thermal sleeve 10. Various welds are depicted in a number of embodiments of the present disclosure as filet welds. This, however, should not be construed as limiting. Other suitable welds for use with the embodiments of the present disclosure are contemplated. The first ring includes a plurality of rod members 2014 extending therefrom. More specifically, each rod member 2014 extends from the first ring 2010 along a rod axis RA which is parallel to the central axis CA when the first ring 2010 is coupled to the thermal sleeve 10. In the illustrated embodiment, the rod members 2014 are symmetrical with respect to the central axis CA, however, other embodiments are envisioned where the rod members 2014 are not symmetrical. In certain embodiments, one or more of the rod members 2014 extend along respective rod axes that are not parallel to the central axis CA. In at least one embodiment, the first ring 2010 is formed from a stainless steel material.

Figure 3:
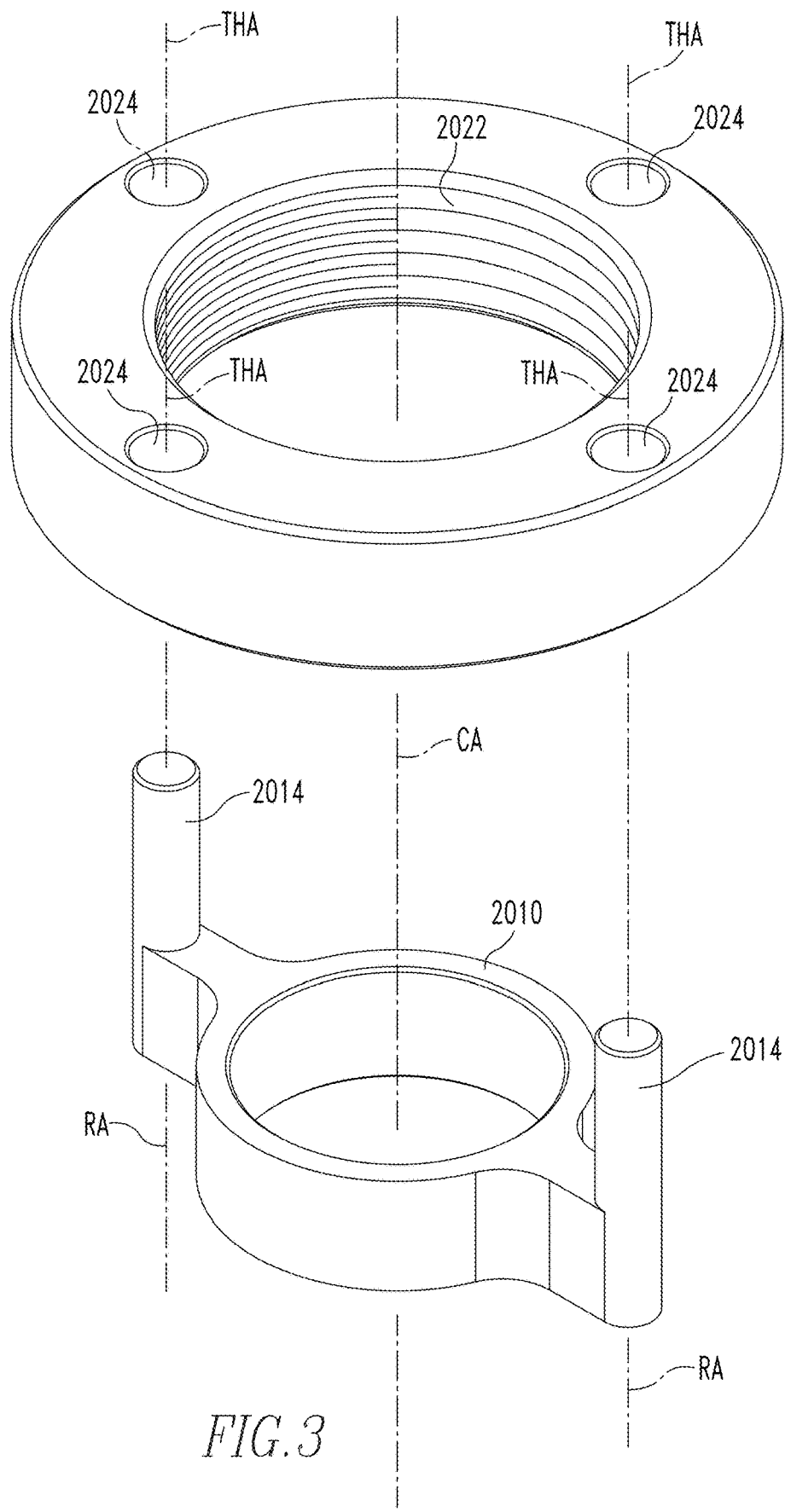
FIG. 3 is an exploded view of the device of FIG. 2.
Figure 4:
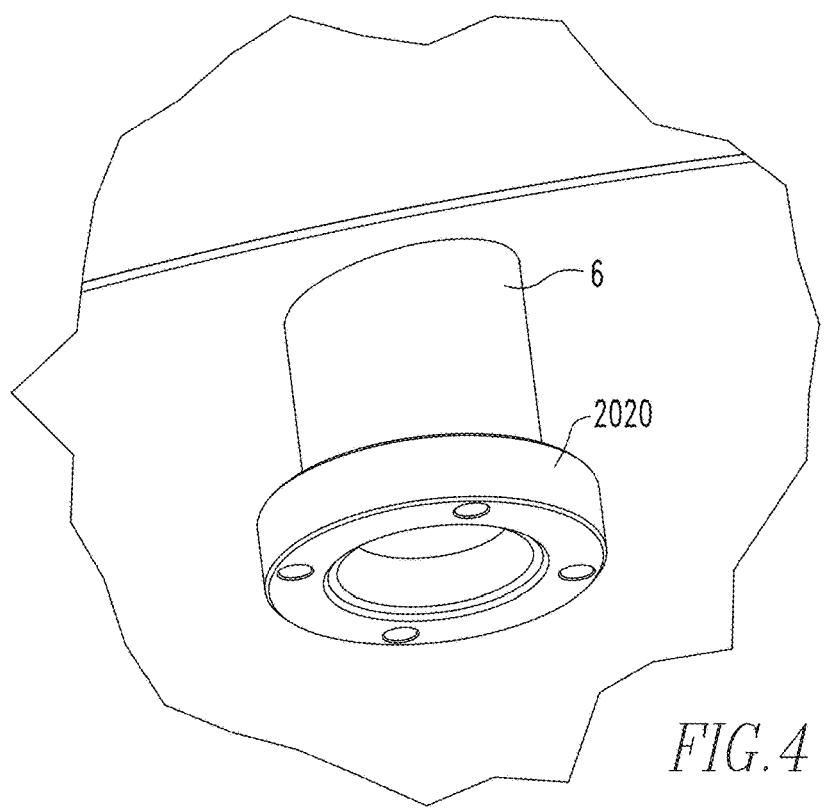
FIG. 4 is a perspective view of a portion of the device of FIG. 2 coupled to a lower portion of a head penetration adapter.
Figure 5:
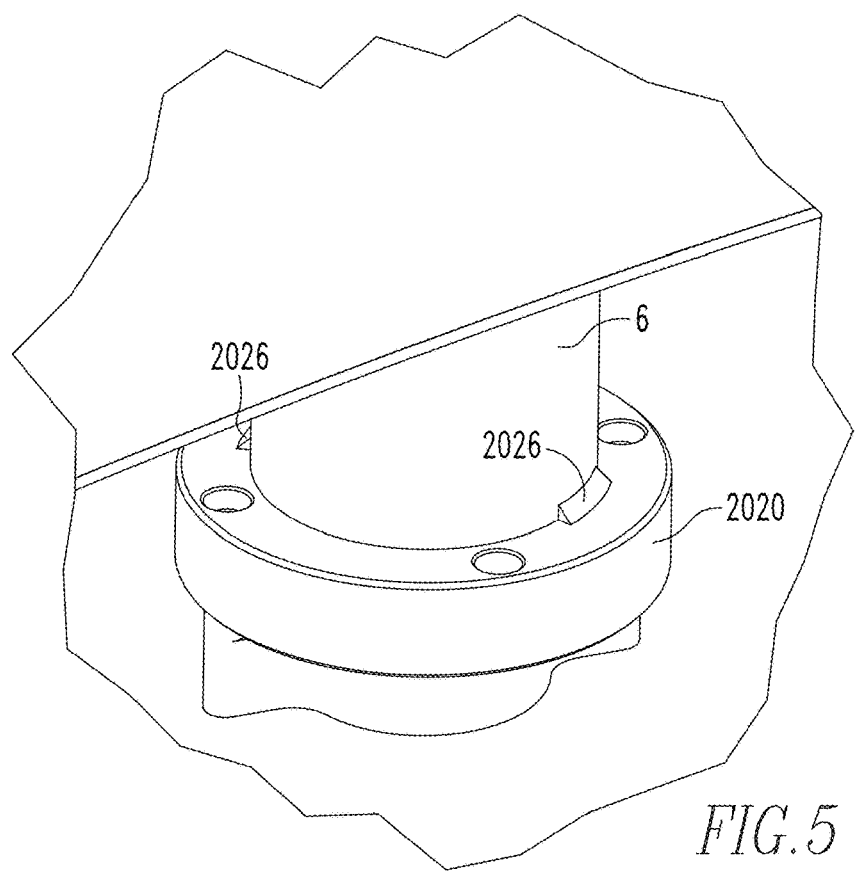
FIG. 5 is a perspective view of a portion of the device of FIG. 2 coupled to a lower portion of the head penetration adapter via welds.

Referring primarily to FIGS. 2 and 3, the device 2000 further includes a second structure, or second ring 2020, coupled to the head penetration adapter 6. The second ring 2020 comprises an internal diameter including a threaded portion 2022 which engages a cooperative threaded portion on the outside diameter of the head penetration adapter 6. Head penetration adapters for certain types of reactors comprise threaded portions on the outside diameter of their bottom end. For head penetration adapters without such threaded portions, the head penetration adapter may be machined via any suitable means to create a threaded portion to receive the threaded portion 2022 of the second ring 2020, for example. The second ring 2020 includes a plurality of thru-holes 2024 formed therein, with each thru-hole 2024 defining a thru-hole axis THA. In the illustrated embodiment, the thru-holes 2024 are equally radially spaced approximately ninety degrees apart about the central axis CA, however, other embodiments are envisioned where the thru-holes 2024 are not equally radially spaced. In at least one embodiment, the second ring 2020 is formed from an alloy. Each rod member 2014 of the first ring 2010 is configured to engage a corresponding thru-hole 2024 of the second ring 2020 to resist, reduce, and/or prevent rotation of the thermal sleeve 10 about its central axis CA relative to the head penetration adapter 6, while allowing axial movement of the thermal sleeve 10 relative to the head penetration adapter 6. For example, axial movement of the thermal sleeve 10 relative to the head penetration adapter can be caused by thermal expansion/contraction of the thermal sleeve 10 and/or may be necessary to allow the passage of reactor coolant flow. FIGS. 4 and 5 illustrate further views of the second ring 2020 coupled to the lower portion of the head penetration adapter 6. As shown in FIG. 5, the second ring 2020 is further secured to the head penetration adapter by a plurality of welds 2026 in addition to the threaded connection previously discussed.

Figure 6:
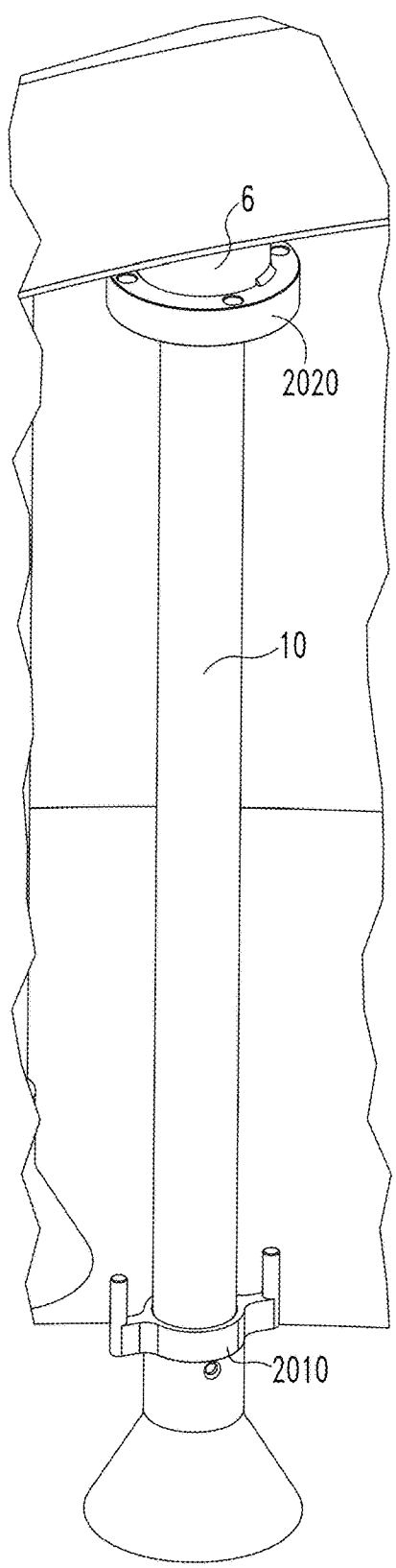
FIG. 6 is a side perspective view of a first portion of the device of FIG. 2 positioned on a lower portion of the head penetration adapter, where a second portion of the device of FIG. 2 loosely positioned on a lower portion of the thermal sleeve.
Figure 7:
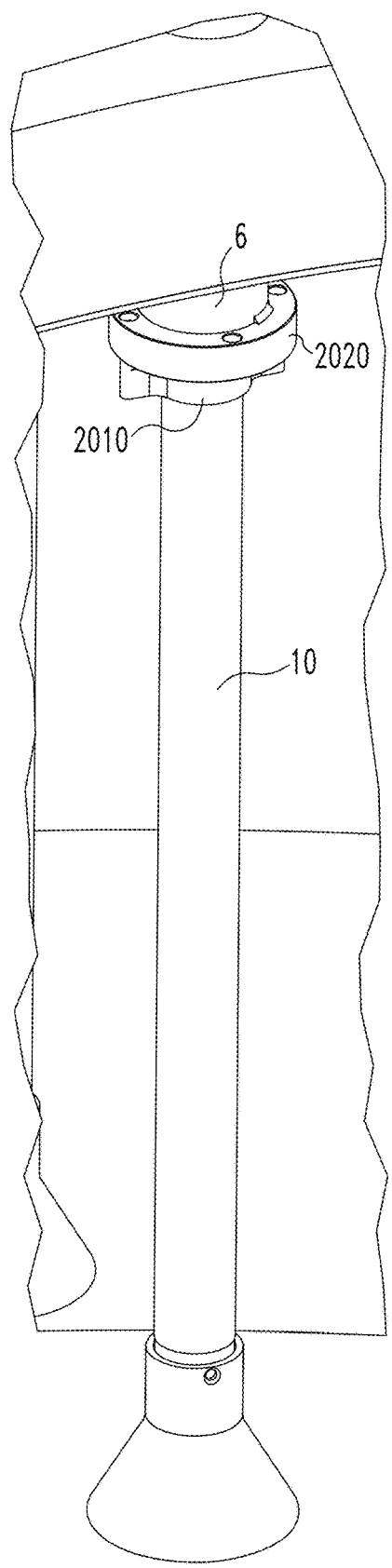
FIG. 7 is a side perspective view illustrating the second portion of the device of FIG. 2 secured to the thermal sleeve and in engagement with the first portion of the device of FIG. 2 on the lower portion of the head penetration adapter.

Referring primarily to FIG. 6, the first ring 2010 may initially be installed onto a newly installed replacement thermal sleeve 10. Clearance is provided between the inner diameter of the first ring 2010 and the outer diameter of the thermal sleeve 10 to allow the first ring 2010 to be slid along and/or rotated about the thermal sleeve 10 to a desired position. The second ring 2020 is coupled to the bottom portion of the head penetration adapter 6 as discussed above. The first ring 2010 is then slid into engagement with the second ring 2020 (FIG. 7) and then suitably coupled (e.g., via welding or any suitable attachment method) to the thermal sleeve 10 in the desired position.

Figure 8:
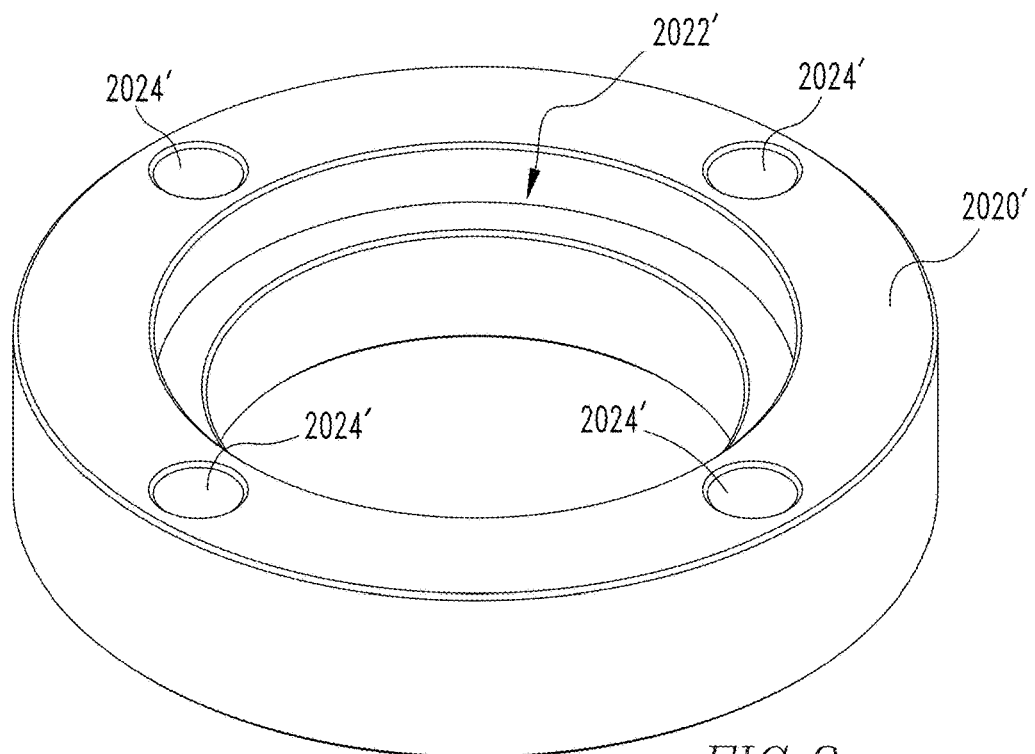
FIG. 8 is a perspective view illustrating an alternative ring which may be employed in the arrangement of FIGS. 2 and 3 in accordance with at least one aspect of the present disclosure.
Figure 9:
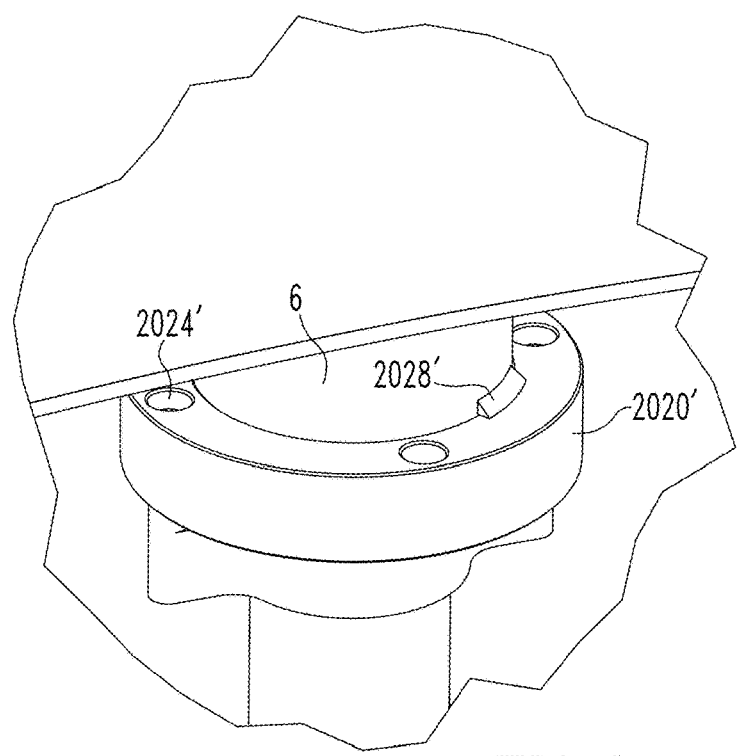
FIG. 9 is perspective view of the ring of FIG. 8 secured to an end portion of a head penetration adapter via welds.

FIGS. 8 and 9 depict a second ring 2020' for use with the first ring 2010 in place of the second ring 2020. The second ring 2020' comprises an inner stepped portion 2022' for receiving the lower end of a head penetration adapter 6 and through holes 2024' for interfacing with the rod members 2014 of the first ring 2010. In the illustrated embodiment, the second ring 2020' is attached to the head penetration adapter 6 via welds 2028'. However, any suitable attachment method may be utilized to attach the second ring 2020' to the bottom portion of the head penetration adapter 6.

Figure 10:
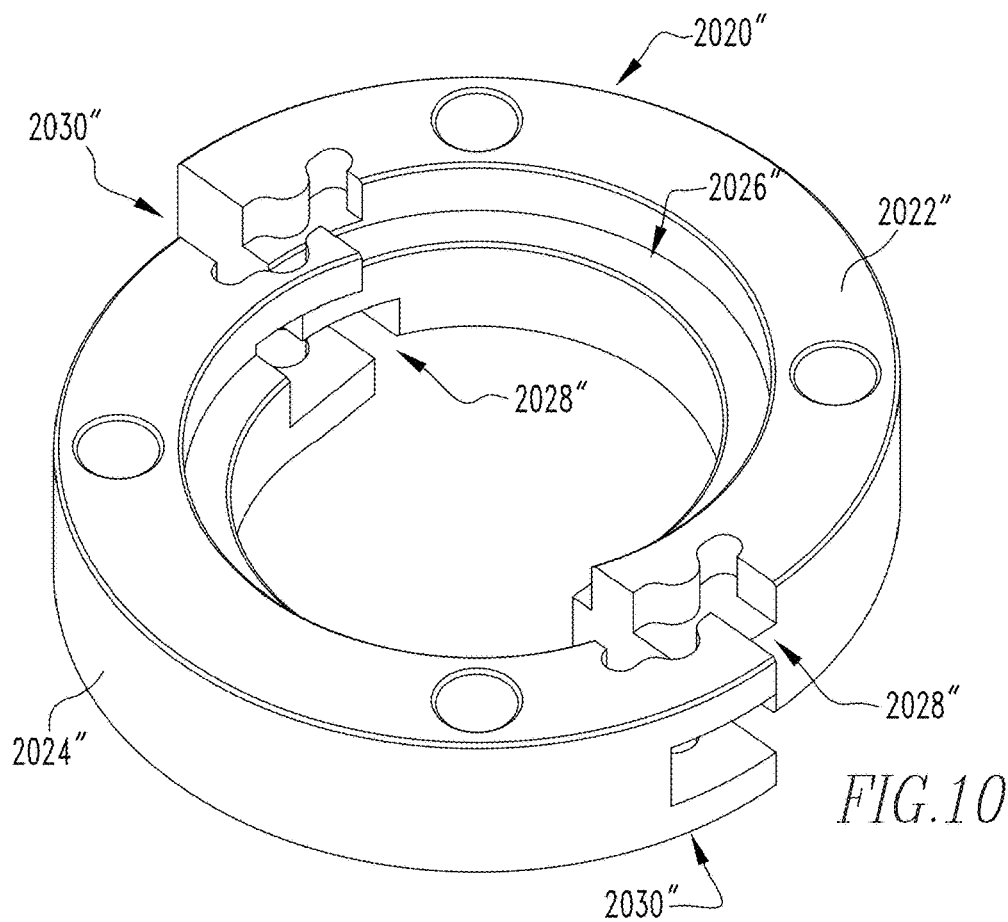
FIG. 10 is a top perspective view illustrating a multi-piece ring, in an unassembled state, which may be employed in the arrangement of FIGS. 2 and 3 in accordance with at least one aspect of the present disclosure.
Figure 11:
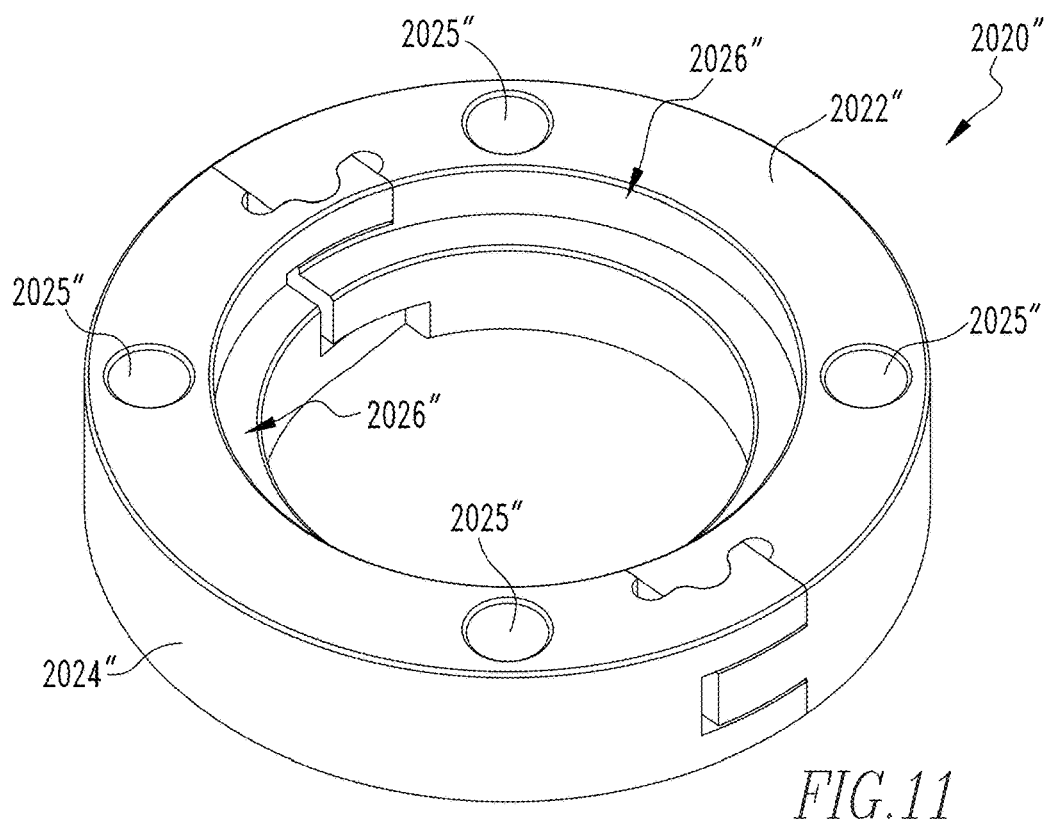
FIG. 11 is a top perspective view of the multi-piece ring of FIG. 10 in an assembled state.

FIGS. 10 and 11 depict another a second ring 2020" for use with the first ring 2010 in place of the second ring 2020. The second ring 2020' comprises a first arcuate portion 2022" and a second arcuate portion 2024" configured to be mated together around a portion, such as the bottom end of the head penetration adapter 6 to form a circular ring. Each of the first portion 2022" and the second portion 2024" comprises a stepped portion 2026" for receiving the bottom end of the head penetration adapter 6 when the first portion 2022" and the second portion 2024" are mated together. Further, each of the first portion 2022" and the second portion 2024" comprise a plurality of through holes 2025" therein. The through holes 2025" are similar to the through holes 2024 previously described (FIG. 3). The first portion 2022" comprises a female interlock portion 2028" at both ends and the second portion 2024" comprises a male interlock portion 2030" at both ends. The female interlock portions 2028" are configured to receive the male interlock portions 2030" to form the second ring 2020". Once mated together around the bottom end of the penetration adapter 6, the second ring 2020' can be welded in the female and male interlock regions 2028", 2030" to prevent the second ring 2020" from coming apart in service. In other embodiments, the first portions 2022" and the second portions 2022" are each modified to include one female interlock portion on one end thereof and one male interlock portion on the other end.

Figure 12:
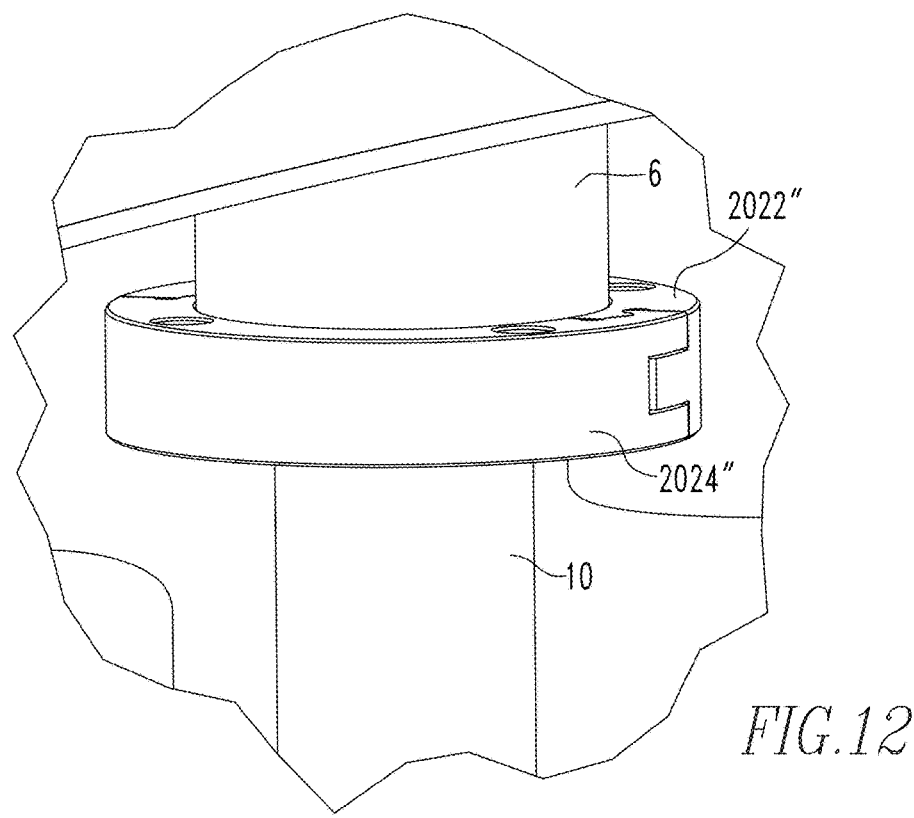
FIG. 12 is a perspective view of the multi-piece ring of FIGS. 10 and 11 positioned on a lower end of a head penetration adapter.
Figure 13:
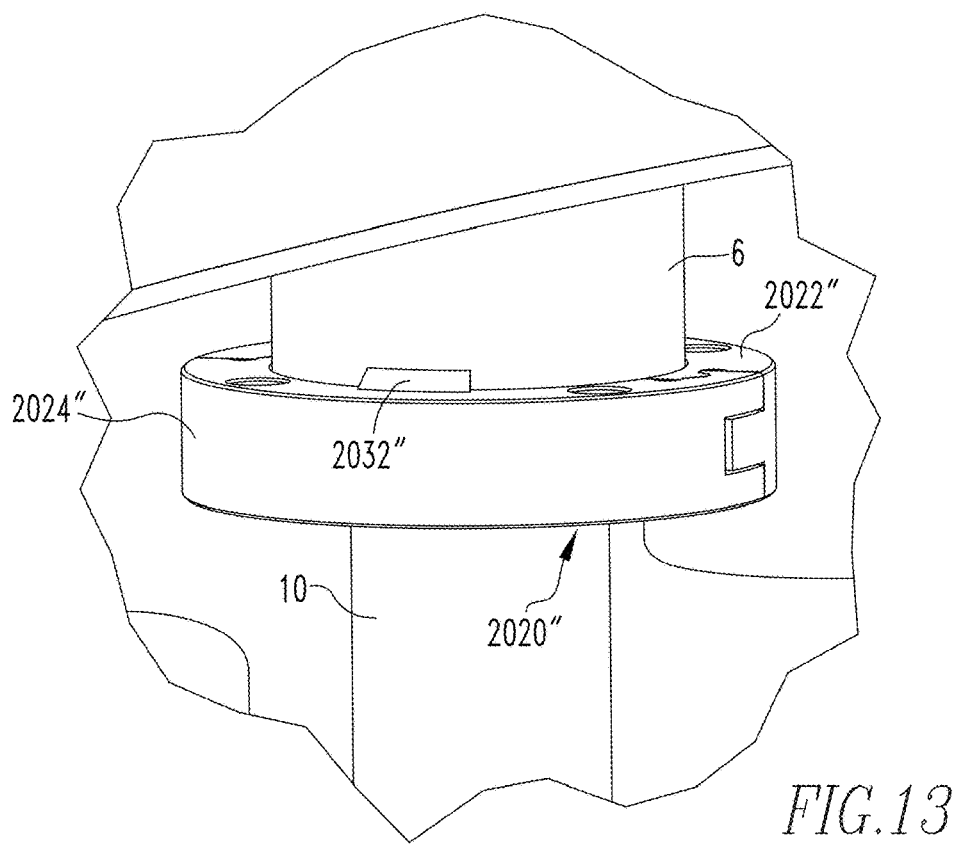
FIG. 13 is a perspective view of the multi-piece ring of FIGS. 10 and 11 secured to the lower end of the head penetration adapter via welds.

In at least one embodiment, the second ring 2020" can be retro-fit onto an already installed thermal sleeve 10. As illustrated in FIGS. 12 and 13, the first portion 2022" and the second portion 2024" are positioned around the head penetration adapter 6 and mated together to form the second ring 2020". Once the second ring 2020" is in the desired position, the second ring 2020" can be secured to the head penetration adapter 6 via welds 2032", as shown in FIG. 13. In at least one embodiment, the second ring 2020" can be used in conjunction with the first ring 2010 in the manner describe above with regard to FIGS. 2, 3, 6, and 7, for example. However, other embodiments are contemplated for use with the second ring 2020", as discussed in greater detail below.

Figure 14:
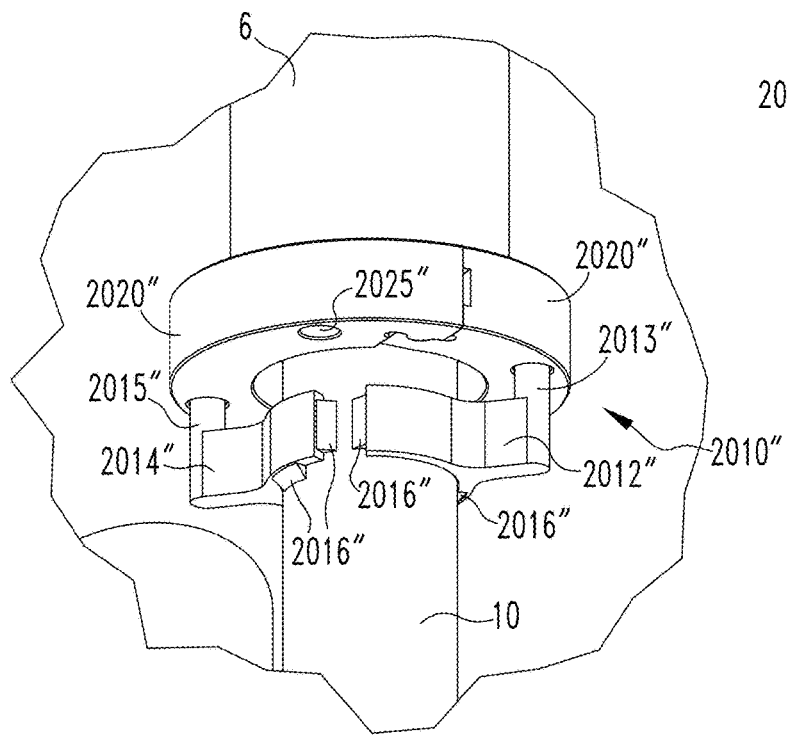
FIG. 14 is a bottom perspective view illustrating a multi-piece first ring coupled to a thermal sleeve via welds and engaged with the multi-piece ring of FIGS. 10 and 11 coupled to a lower end of a head penetration adapter, in accordance with at least one aspect of the present disclosure.
Figure 15:
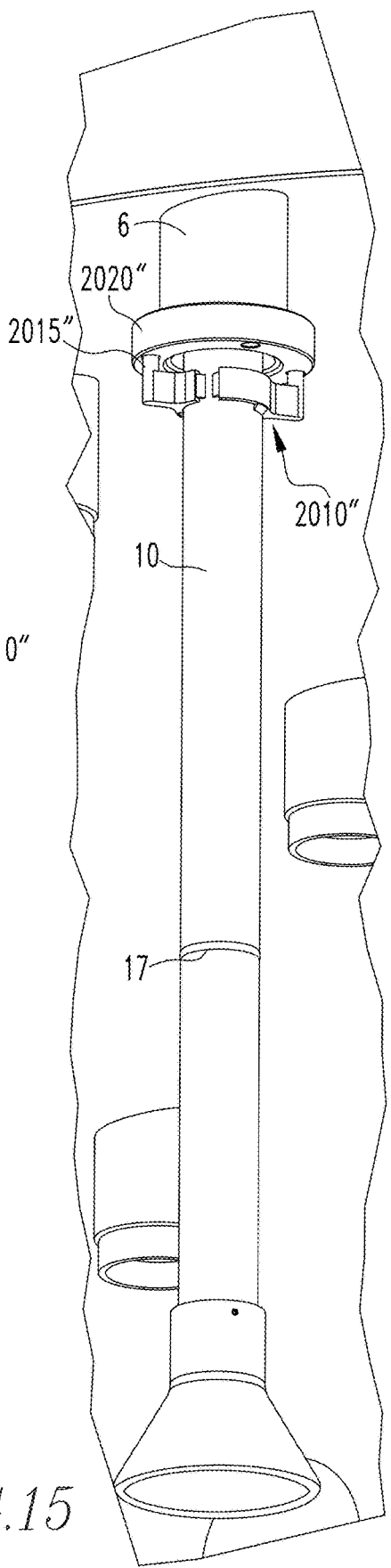
FIG. 15 is a side perspective view of the arrangement of FIG. 14 further illustrating a location where the thermal sleeve was cut and welded in order to allow for installation of the structures of the arrangement on the head penetration adapter and the thermal sleeve.

FIGS. 14 and 15 depict a first ring 2010" configured to be attached to the thermal sleeve 10 and mate with the second ring 2020" which is attached to the head penetration adapter 6, as discussed above. The first ring 2010" comprises a first portion 2012" and a second portion 2014". The first portion 2012" comprises a first upstanding rod member 2013" configured to be received within one of the through holes 2025" in the second ring 2020". The second portion 2014" comprises a second upstanding rod member 2015" configured to be received within another one of the through holes 2025" in the second ring 2020". Once the first portion 2012" and the second portion 2014" are in the desired position, welds 2016" are applied to secure the first portion 2012" and the second portion 2014" to the thermal sleeve 10. As can be seen in FIG. 14, each of the first portion 2012" and the second portion 2014" comprises less than half of a full circumference. The first portion 2012" and the second portion 2014" are sized in this manner to permit variability of the installation positions and/or weld locations.

Further to the above, FIG. 15 illustrates a cut location 17 on the thermal sleeve 10 where the thermal sleeve 10 may be cut in order to allow for the installation of the devices discussed herein onto the head penetration adapter 6 and/or the remaining portion of the thermal sleeve 10. Once the assembly is complete, the thermal sleeve 10 is welded back together.

Figure 16:
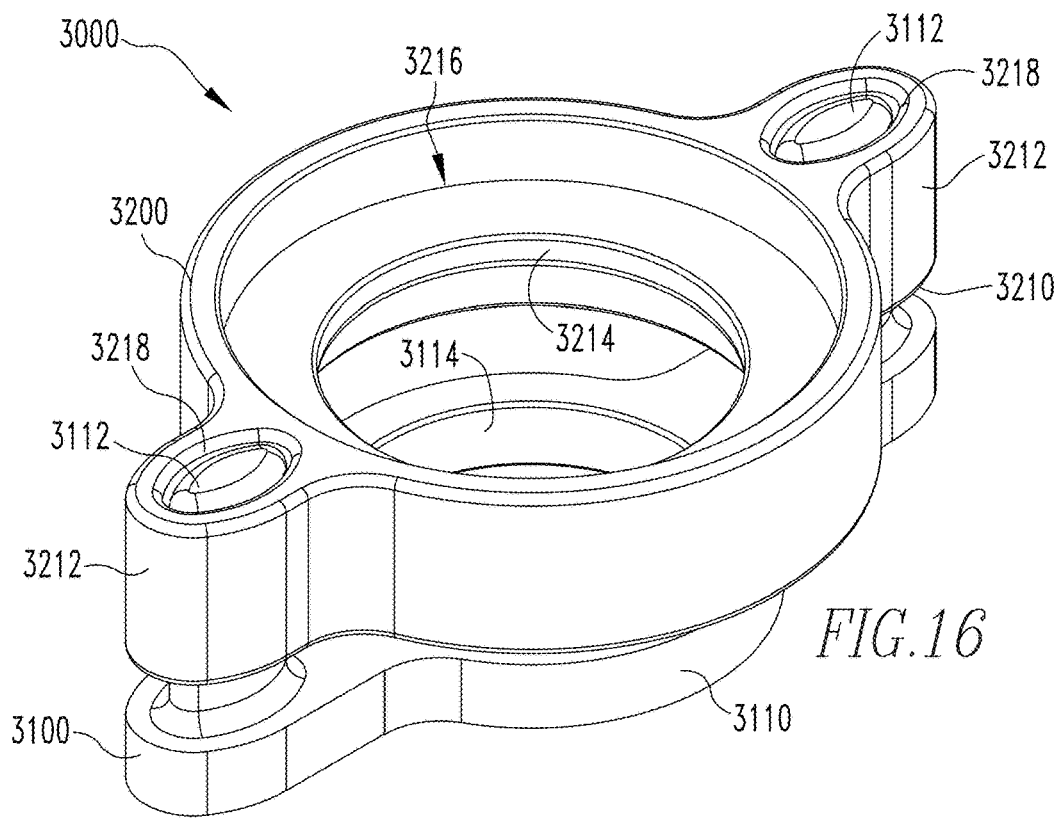
FIG. 16 is a perspective view of another device for resisting, reducing, and/or preventing rotation of a thermal sleeve about a central axis thereof relative to a head penetration adapter in a nuclear reactor in accordance with at least one aspect of the present disclosure.
Figure 17:
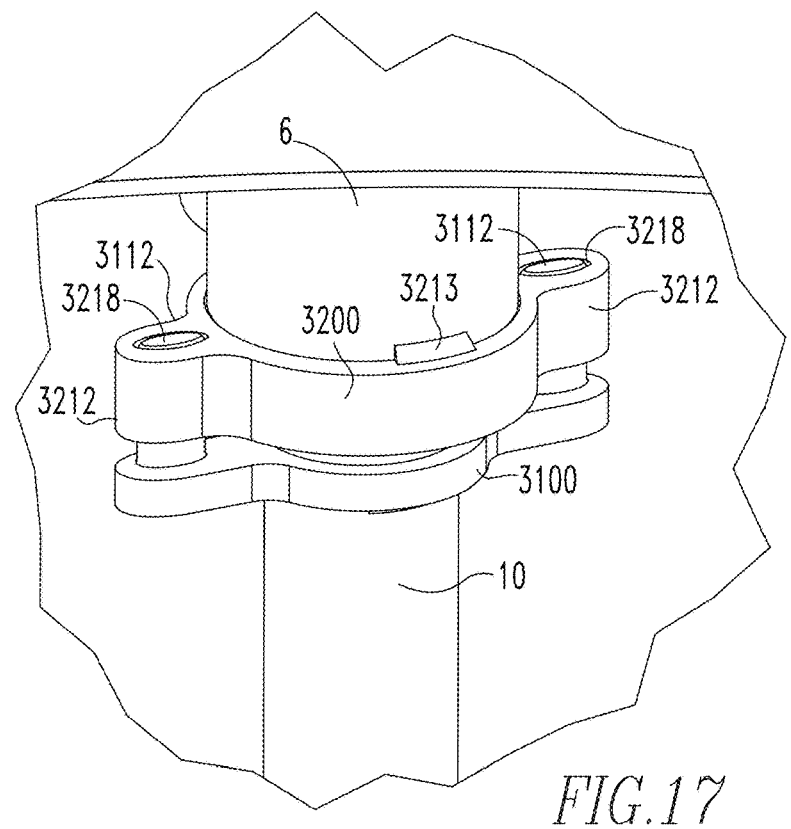
FIG. 17 is a perspective view of the device of FIG. 16, shown with first and second structures thereof coupled, respectively, to the lower portions of a head penetration adapter and thermal sleeve.
Figure 18:
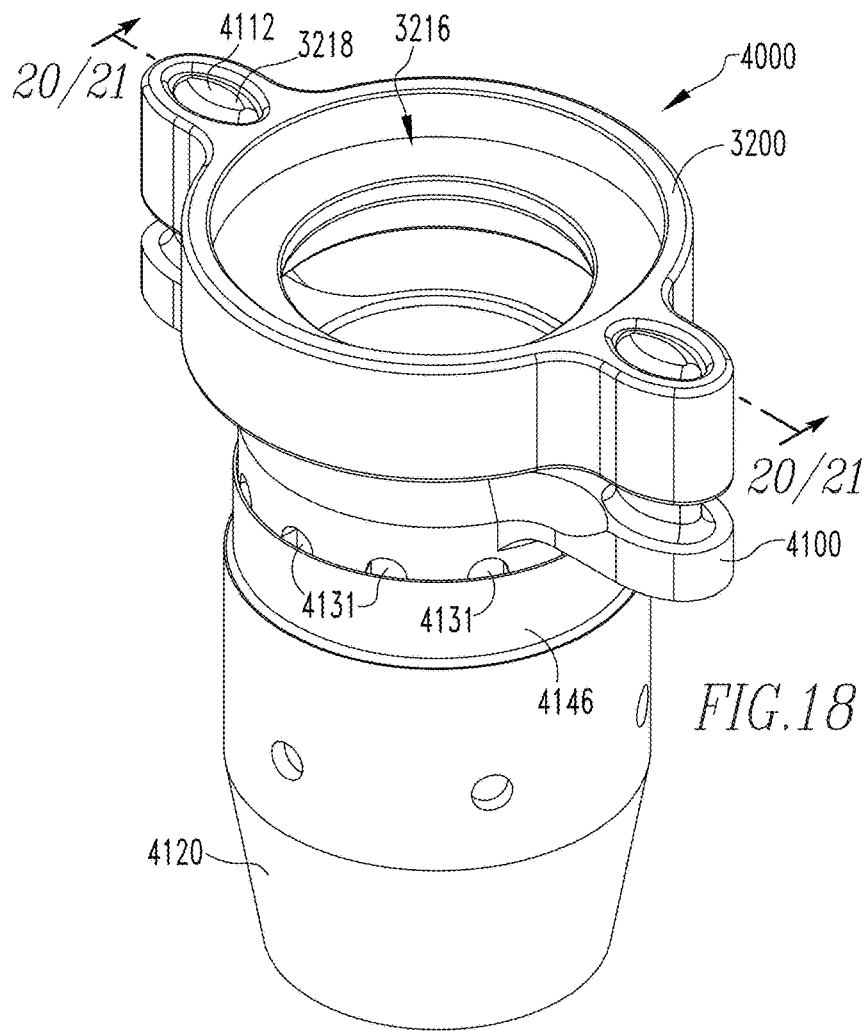
FIG. 18 is a perspective view of yet another device for resisting, reducing, and/or preventing rotation of a thermal sleeve about a central axis thereof relative to a head penetration adapter in a nuclear reactor in accordance with at least one aspect of the present disclosure.

FIGS. 16 and 17 depict a device 3000 configured to resist, reduce, and/or prevent rotation of the thermal sleeve 10 about an axis thereof relative to the head penetration adapter 6. The device 3000 comprises a first ring 3100 configured to be attached to a thermal sleeve 10 and a second ring 3200 configured to be attached to the head penetration adapter 6. The first ring 3100 and the second ring 3200 are configured for operable engagement to resist, reduce, and/or prevent rotation of the thermal sleeve 10 relative to the head penetration adapter 6, as discussed in greater detail below.

The first ring 3100 comprises a body 3110 and two upstanding rod members 3112 extending from the ring body 3110. The ring body 3110 comprises an opening 3114 sized such that the first ring 3100 can slide onto the thermal sleeve 10. In the illustrated embodiment, the upstanding rod members 3112 comprise an ellipse cross-section that is non-circular. However, other embodiments are envisioned where the upstanding rod members 3112 comprise a cylindrical shape, such as the rod members 2014 illustrated in FIG. 2. In any event, the second ring 3200 comprises a ring body 3210 including two lug members 3212 extending laterally therefrom. An opening 3214 and a cutout region 3216 are defined in the ring body 3210. The opening 3214 is sized such that the second ring 3200 can be slid along the thermal sleeve 10 and abut against the bottom end of the head penetration adapter 6. More specifically, the cutout region 3216, provided in the body 3210 of the second ring 3200, receives the bottom end of the head penetration adapter 6. The lug members 3212 comprise openings 3218 therein which are sized and shaped to receive the upstanding rod members 3112 when the first ring 3100 and the second ring 3200 are assembled together as illustrated in FIG. 17.

In use, the second ring 3200 can already be attached to a replacement thermal sleeve 10 or can be retrofit to an existing thermal sleeve as described herein. The second ring 3200 is slid along the thermal sleeve 10 until the bottom end of the head penetration adapter 6 is received in the cutout region 3216 of the second ring 3200. An already installed thermal sleeve 10 may be cut, as discussed above, in order to receive the second ring 3200. The second ring 3200 is then welded to the head penetration adapter 6 via welds 3213. The first ring 3100 is then installed onto the thermal sleeve 10 and slid along the thermal sleeve 10 until the upstanding rod members 3112 are received within their respective openings 3218 in the second ring 3200. Once the first ring 3100 is in the desired position, the first ring 3100 is welded to the thermal sleeve 10. The first ring 3100 is engaged with the second ring 3200 to resist, reduce, and/or prevent the thermal sleeve 10 from rotating about an axis thereof. However, the thermal sleeve 10 is permitted to axially translate due to the relationship between the upstanding rod members 3112 and the openings 3218.

FIGS. 18-21 depict a device 4000 configured to resist, reduce, and/or prevent rotation of the thermal sleeve 10 about an axis thereof relative to the head penetration adapter 6. The device 4000 comprises a first ring 4100 configured to be attached to a thermal sleeve 10 and the second ring 3200, discussed above with regard to FIGS. 16 and 17, configured to be attached to the head penetration adapter 6. The first ring 4100 and the second ring 3200 are configured for operable engagement to resist, reduce, and/or prevent rotation of the thermal sleeve 10 relative to the head penetration adapter 6, as discussed in greater detail below.

The first ring 4100 comprises a body 4110 and two upstanding rod members 4112 extending from the ring body 4110, The ring body 4110 comprises an opening 4114 sized such that the first ring 4100 can slide along the thermal sleeve 10. In the illustrated embodiment, the upstanding rod members 4112 comprise an ellipse cross-section that is non-circular. However, other embodiments are envisioned where the upstanding members 4112 comprise a cylindrical shape, such as the rod members 2014 illustrated in FIG. 2.

Further to the above, the ring body 4110 comprises a mechanical clamp 4120 extending therefrom. The mechanical clamp 4120 comprises an inner housing 4130 extending from the body 4110 of the first ring 4100 and an outer housing 4140 positionable around the inner housing 4130. The outer housing 4140 comprises internal threads 4148 and the inner housing 4130 comprises cooperative external threads 4138, Thus, when assembled together, the threads 4148 of the outer housing 4140 are engaged with the threads 4138 of the inner housing 4130 such that, as the outer housing 4140 is rotated, the outer housing 4140 will translate relative to the inner housing 4130.

Further to the above, the inner housing 4130 comprises a collet 4132 including a plurality of fingers 4134. The fingers 4134 of the collet 4132 are configured to flex inward when an external force is applied to the collet 4132. In the illustrated example, the fingers 4134 of the collet 4132 comprise tapered outer surfaces 4136 which are aligned with a tapered inner surface 4142 of the outer housing 4140 when the outer housing 4140 is threadably engaged with the inner housing 4130. When the outer housing 4140 is rotated in the counter clockwise direction Dccw, for example, the outer housing 4140 will translate in direction D1 and the tapered inner surface 4142 of the outer housing 4140 will engage the tapered outer surfaces 4136 of the inner housing 4130 and deflect the fingers 4134 inward. Other embodiments are envisioned where the outer housing 4140 is rotatable in a clockwise direction to translate the outer housing 4140 in direction D1.

In use, the second ring 3200 is slid along the thermal sleeve 10 until the bottom end of the head penetration adapter 6 is received in the cutout region 3216 of the second ring 3200. An already installed thermal sleeve 10 may be cut, as discussed above, in order to receive the second ring 3200. The second ring 3200 is then welded to the head penetration adapter 6. The first ring 4100 is then installed onto the thermal sleeve 10 and slid along the thermal sleeve 10 until the upstanding rod members 4112 are received within their respective openings 3218 in the second ring 3200. Once the first ring 4100 is at the desired position, the mechanical clamp 4120 can be actuated to secure the first ring 4100 to the thermal sleeve 10. More specifically, the outer housing 4140 of the mechanical clamp 4120 can be rotated, as discussed above, to clamp the inner housing 4130 onto the thermal sleeve 10. Openings 4144 in the outer housing 4140 of the mechanical clamp 4120 may be utilized to facilitate rotation of the outer housing 4140 to secure the first ring 4100 to the thermal sleeve 10. In at least one embodiment, the openings 4144 may be engage by a wrench or any suitable tool to aid the user in rotating the outer housing 4140 relative to the inner housing 4130.

Further to the above, the outer housing 4140 comprises a crimp ring portion 4146 that is configured to be deformed into corresponding slots 4131 defined in the outer diameter of the inner housing 4130 of the first ring 4100 after the inner housing 4130 is clamped to the thermal sleeve 10. The slots 4131 are radially positioned around the outer diameter of the inner housing 4130. The crimp ring portion 4146 is configured to be bent and/or deflected into the slots 4131 to prevent the outer housing 4140 from becoming disengaged with the inner housing 4130 (i.e., prevents the outer housing 4140 from unthreading itself from the inner housing 4130 in service).

Further to the above, when the first ring 4100 is attached to the thermal sleeve 10, the second ring 3200 is attached to the head penetration adapter 6, and the first ring 4100 and second ring 3200 are operably engaged, the device 4000 resists, reduces, and/or prevents the thermal sleeve 10 from rotating about an axis thereof. However, the thermal sleeve 10 is permitted to axially translate due to the relationship between the upstanding rod members 4112 and the openings 4218.

FIGS. 22-25 depict a split clamp assembly 5000 configured to resist, reduce, and/or prevent rotation of the thermal sleeve 10 about an axis thereof relative to a modified head penetration adapter 6'. The split clamp assembly 5000 comprises a first clamp portion 5100 and a second clamp portion 5200 configured to be coupled together via fasteners 5300. The first clamp portion 5100 comprises an arcuate body 5110 including two lug portions 5112 extending therefrom. Each of the lug portions 5112 comprises a threaded hole therein. A pair of upstanding members 5114 extend from the lug portions 5112, In the illustrated embodiment, the upstanding members 5114 comprise a rectangular cross-section with rounded edges. However, other embodiments are envisioned where the upstanding members 5114 comprise a cylindrical shape, or any other suitable shape for engagement with a modified head penetration adapter. In any event, the second clamp portion 5200 comprises an arcuate body 5210 including two lug portions 5212 extending therefrom. The arcuate body 5110 of the first clamp portion 5100 and the arcuate body 5210 of the second clamp portion 5200 form an opening 5400 therebetween when the first clamp portion 5100 and the second clamp portion 5200 are coupled together. The opening 5400 is sized and shaped to receive the thermal sleeve 10. In the illustrated embodiment, the opening 5400 is substantially circular. However, in other embodiments, the opening 5400 can comprise a different shape suitable for receiving a thermal sleeve 10 such as, for example, an oval shape.

Further to the above, the second clamp portion 5200 comprises protrusions 5214 extending from each of the lug portions 5212. Each of the protrusions 5214 comprises an opening 5216 therein which terminates in a step 5217. A threaded hole 5219 extends through the remainder of the protrusion 5214 and the lug portion 5212 on each side of the second clamp portion 5200. The threaded holes 5219 are positioned such that they align with the threaded holes defined in the first clamp portion 5100 when the first clamp portion 5100 and the second clamp portion 5200 are coupled together. Each of the openings 5216 comprises a plurality of cutouts, or pockets 5218 in the sidewall thereof. In at least one embodiment, each opening 5216 comprises four pockets 5218 that are equally radially spaced within the inner diameter of the opening 5216. However, other embodiments are envisioned with more or less than four pockets 5218 that can be equally, or non-equally, radially spaced within the inner diameter of the opening 5216.

In use, the first clamp portion 5100 is positioned on one side of the thermal sleeve 10 and the second clamp portion 5200 is positioned on another side of the thermal sleeve 10. Once the first clamp portion 5100 and the second clamp portion 5200 are at the desired position relative to the modified head penetration adapter 6', the split clamp assembly 5000 can be clamped around the thermal sleeve 10 by installing the fasteners 5300. The split clamp assembly 5000 can be positioned relative to the modified head penetration adapter 6' such that the upstanding members 5114 of the split clamp assembly 5000 are received within axial slots 7' defined in the modified head penetration adapter 6', In at least one embodiment, the axial slots 7' are defined into the bottom end of the head penetration adapter 6 to create a modified head penetrations adapter 6', for example.

Further to the above, the fasteners 5300 are configured to threadably engage the threaded holes 5219 in the second clamp portion 5200 and extend into the threaded holes in the first clamp portion 5100. As the fasteners are tightened, the opening 5400 will decrease in size and squeeze the split clamp assembly 5000 around the thermal sleeve 10'. When the fasteners 5300 are installed, the head of each fastener 5310 may eventually bottom out on the step 5217 within each opening 5216. Each fastener 5300 comprises a crimp portion 5312 which can be deformed once the fastener 5300 is installed into the split clamp assembly 5000. More specifically, the crimp portion 5312 can be deflected into the pockets 5218 within the sidewalls of the opening 5216 to retain the fasteners 5300 within the split clamp assembly 5000. By crimping the crimp portions 5312, the fastener is prevented from rotating and prevented from becoming a loose part if the fastener 5300 fails in service. In at least one embodiment, after clamping the split clamp assembly 5000 to the thermal sleeve 10, the split clamp assembly 5000 can be welded to the thermal sleeve 10.

Further to the above, the relationship between the upstanding members 5114 and the axial slots 7' in the head penetration adapter 6' resist, reduce, and/or prevent rotation of the thermal sleeve 10 while permitting axial movement of the thermal sleeve 10 relative to the head penetration adapter 6'.

Figure 26:
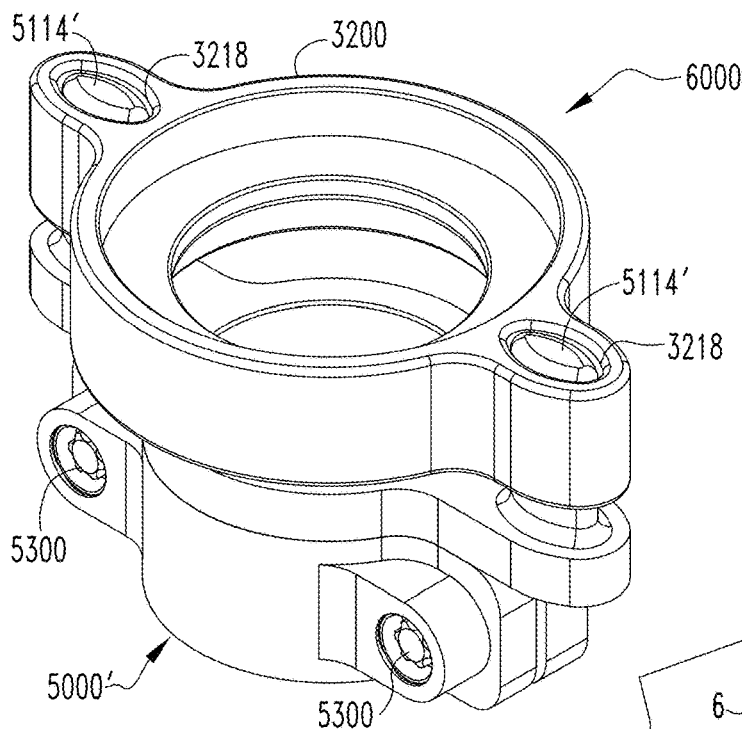
FIG. 26 is a perspective view of a device for resisting, reducing, and/or preventing rotation of a thermal sleeve about a central axis thereof relative to a head penetration adapter in a nuclear reactor in accordance with at least one aspect of the present disclosure.
Figure 27:
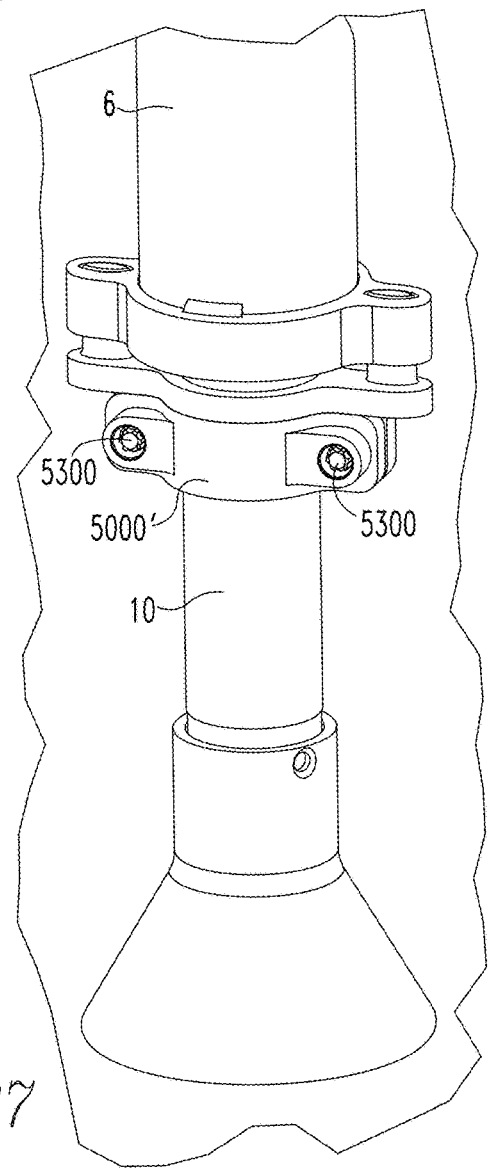
FIG. 27 is a perspective view of the device of FIG. 26, shown with first and second structures thereof coupled, respectively, to the lower portions of a head penetration adapter and thermal sleeve.
Figure 28:
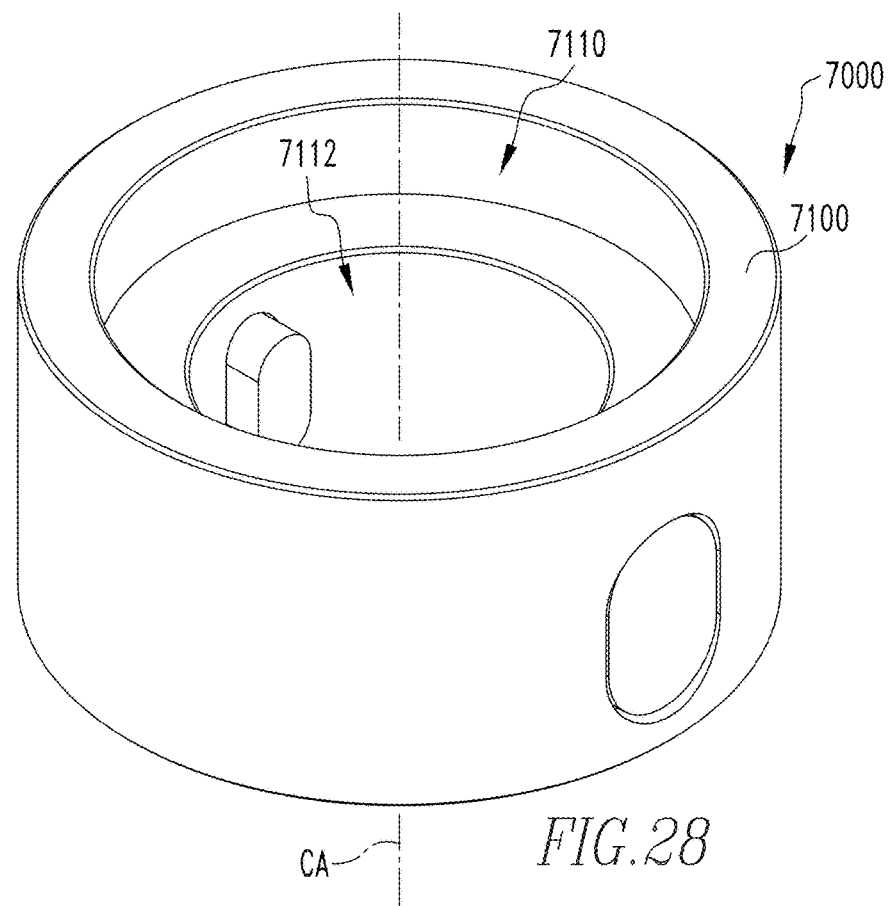
FIG. 28 is a perspective view of another device configured to resist, reduce, and/or prevent rotation of a thermal sleeve about a central axis thereof relative to a head penetration adapter in a nuclear reactor in accordance with at least one aspect of the present disclosure.
Figure 29:
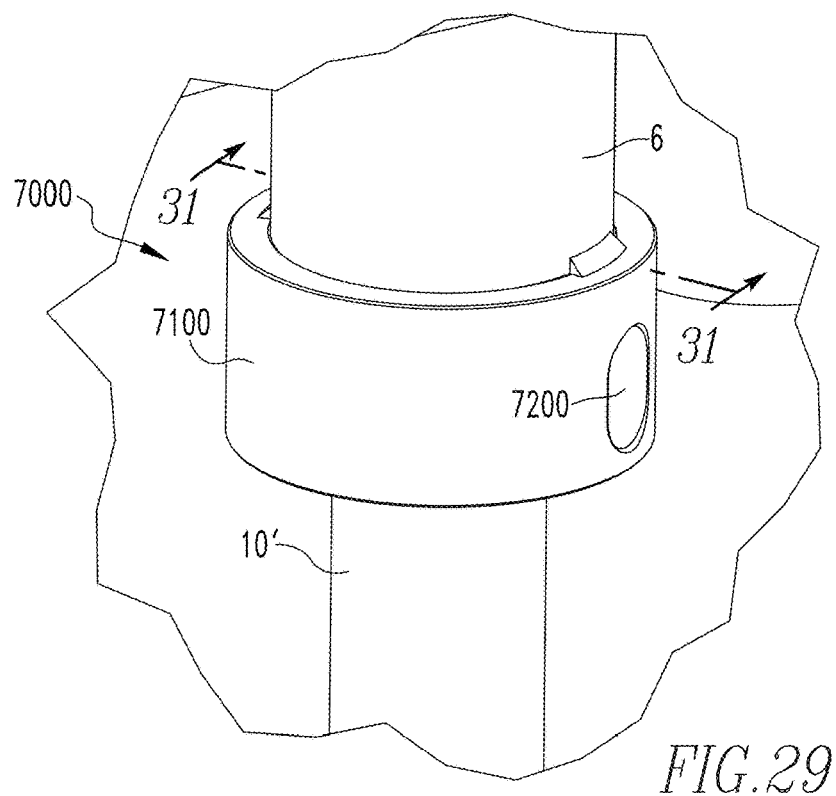
FIG. 29 is a perspective view of the device of FIG. 28 secured to a bottom portion of a head penetration adapter via welds.

FIGS. 26 and 27 depict a device 6000 configured to resist, reduce, and/or prevent rotation of the thermal sleeve 10 about an axis thereof relative to the head penetration adapter 6. The device 6000 comprises a split clamp assembly 5000', configured to be attached to a thermal sleeve 10, and the second ring 3200 (see FIGS. 16 and 18) configured to be attached to the head penetration adapter 6. The split clamp assembly 5000' and the second ring 3200 are configured for operable engagement to resist, reduce, and/or prevent rotation of the thermal sleeve 10 relative to the head penetration adapter 6, as discussed in greater detail below.

The split clamp assembly 5000' is similar to the split clamp assembly 5000 except the split clamp assembly 5000' comprises upstanding members 5114' which comprise an ellipse cross-section that is non-circular. However, other embodiments are envisioned where the upstanding members 5114' comprise a cylindrical shape, such as the rod members 2014 illustrated in FIG. 2.

Figure 19:
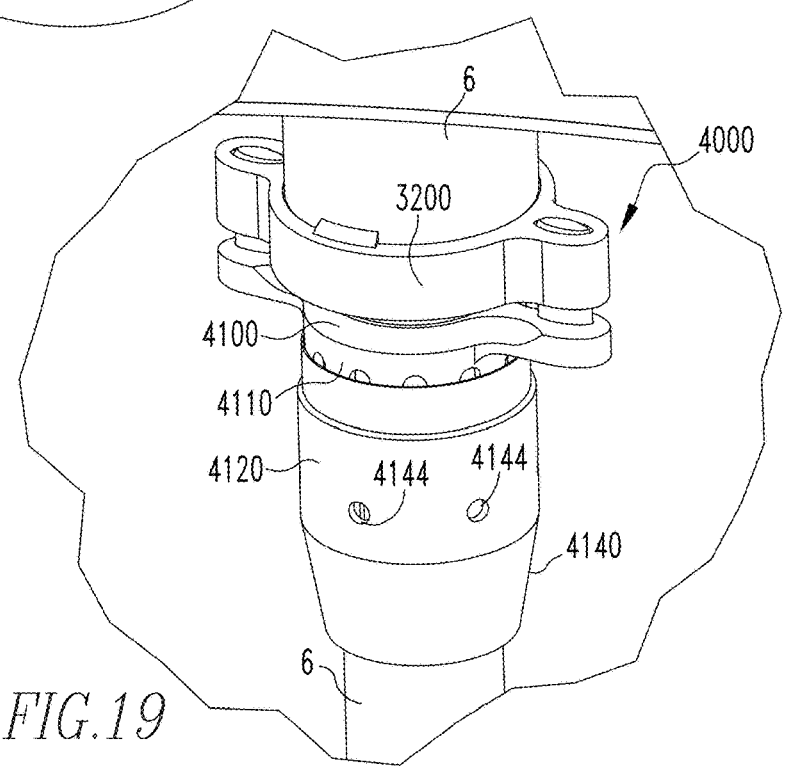
FIG. 19 is a perspective view of the device of FIG. 18, shown with first and second structures thereof coupled, respectively, to the lower portions of a head penetration adapter and thermal sleeve.
Figure 22:
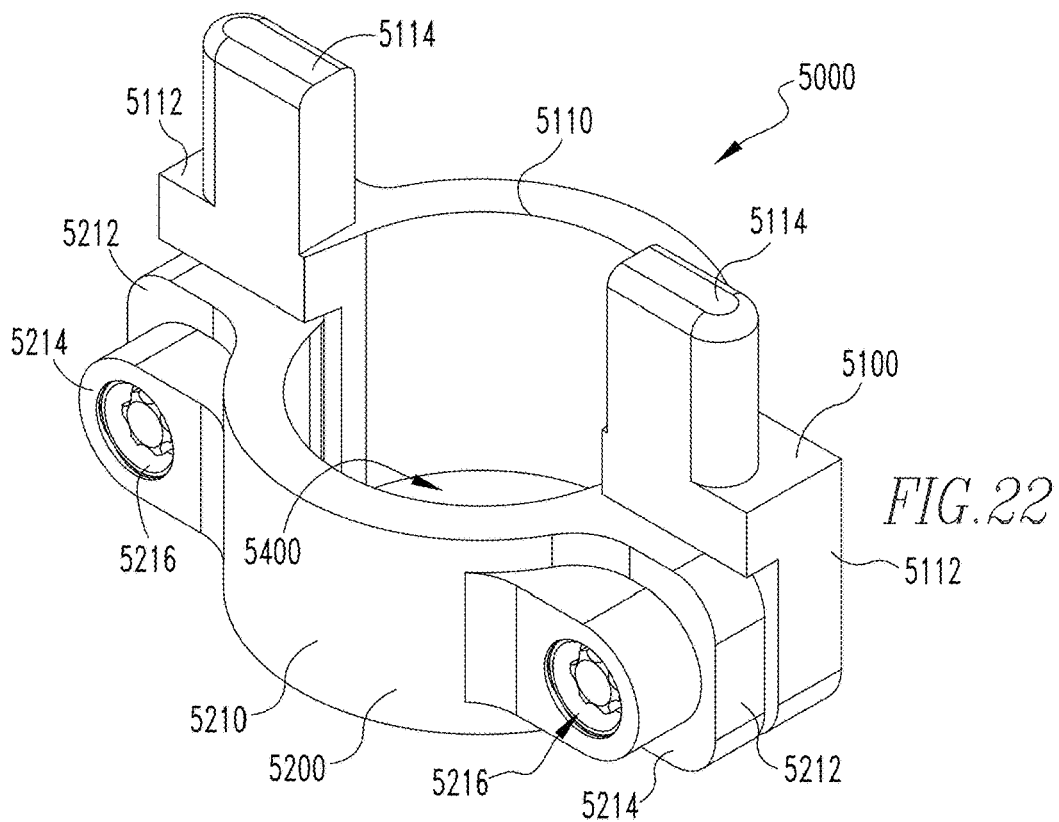
FIG. 22 is a perspective view of a device in the form of a split clamp for use in an arrangement for resisting, reducing, and/or preventing rotation of a thermal sleeve about a central axis thereof relative to a head penetration adapter in a nuclear reactor in accordance with at least one aspect of the present disclosure.
Figure 23:
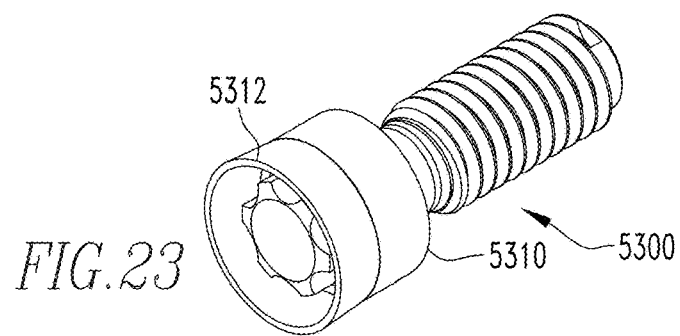
FIG. 23 is a perspective view of a fastener for use with the device of FIG. 22.
Figure 24:
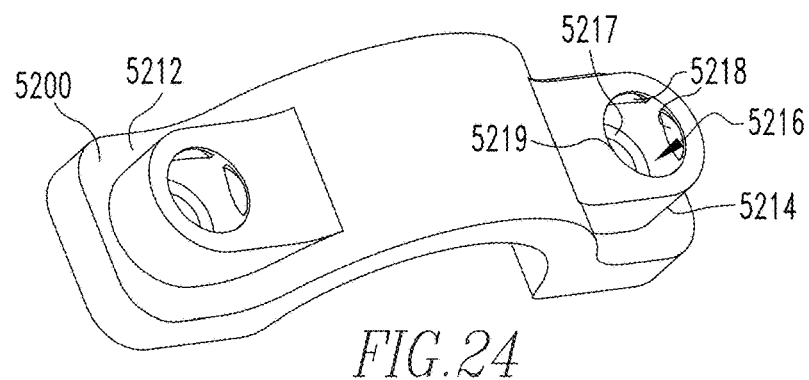
FIG. 24 is an enlarged view of a portion of the device of FIG. 22 illustrating pockets formed therein for engagement by crimped portions of the fastener of FIG. 23.
Figure 25:
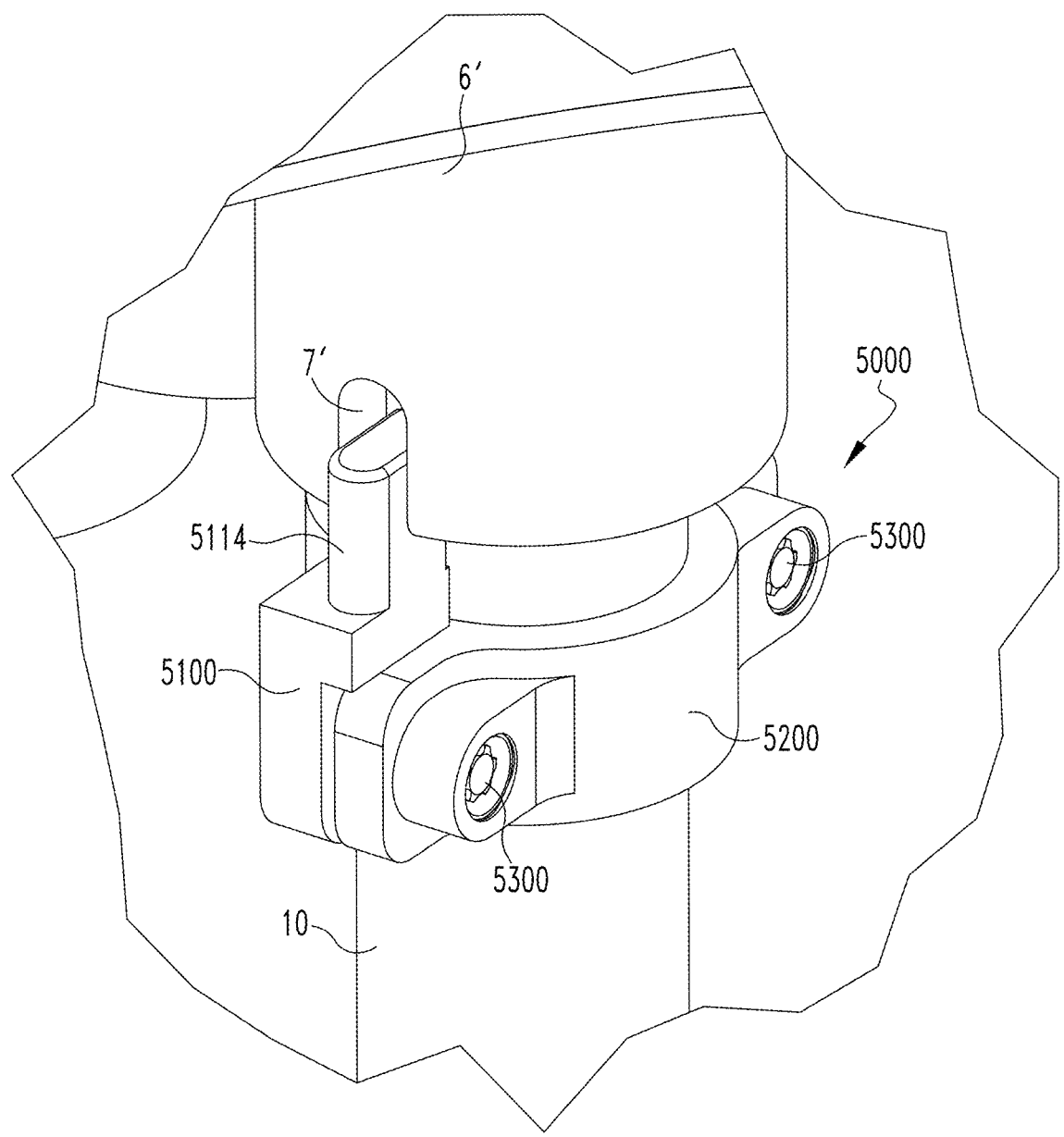
FIG. 25 is a perspective view of the device of FIG. 23 coupled to a thermal sleeve adjacent a lower end of a head penetration adapter in engagement with axial slots formed in the head penetration adapter.

In use, the second ring 3200 is attached (e.g., welded) to the head penetration adapter 6 as previously discussed with regard to FIGS. 17 and 19. Then, the split clamp assembly 5000' is positioned around the thermal sleeve 10 as was as discussed above with regard to split clamp assembly 5000. The split clamp assembly 5000' is then slid towards the head penetration adapter 6 until the upstanding rod members 5114' are received in the openings 3218 of the second ring 3200. Once the desired positioned is achieved, the split clamp assembly 5000' can be clamped to the thermal sleeve 10 by tightening the fasteners 5300 as was previously discussed. In at least one embodiment, after clamping the split clamp assembly 5000' to the thermal sleeve 10, the split clamp assembly 5000' can be welded to the thermal sleeve 10.

FIGS. 28-31 depict a device 7000 configured to resist, reduce, and/or prevent rotation of a modified thermal sleeve 10' about an axis thereof relative to a head penetration adapter 6. The device 7000 comprises a cylindrical body portion 7100 comprising a through hole 7112 therein. The through hole 7112 defines a central axis CA and is configured to receive the thermal sleeve 10'. The body portion 7100 further comprises a stepped portion 7110 configured to receive the bottom end of the head penetration adapter 6. As illustrated in FIG. 31, the body portion 7100 further comprises a pair of through holes 7114 spaced on either side of the central axis CA. The through holes 7114 define axes that are perpendicular to the central axis CA. Each of the through holes 7114 widen to a counter bore 7116 defined in the outer diameter of the body portion 7100. The device 7000 further comprises a slidable member 7200 including a head portion 7220. The slidable members 7200 are configured to slide within the through holes 7114 and the head portion 7220 of the slidable member 7200 is configured to be receive in the counter bore 7116 of the body portion 7100 of the device 7000.

Further to the above, axial slots 11' are defined one either side of a shaft axis SA defined by the modified thermal sleeve 10'. In at least one embodiment, the axial slots 11' are machined into an existing thermal sleeve 10 to create the modified thermal sleeve 10'. The axial slots 11' are positioned on either side of the shaft axis SA of the modified thermal sleeve 10'. The shaft axis SA of the modified thermal sleeve 10' is coincident with the central axis of the device 7000 when the device 7000 is assembled to the head penetration adapter 6 and the modified thermal sleeve 10', as discussed in greater detail below.

In use, the device 7000 is slid onto the modified thermal sleeve 10' and translated towards the head penetration adapter 6 until the stepped portion 7110 of the device 7000 engages the bottom end of the head penetration adapter 6. The device 7000 is then rotated until the slidable members 7200 are aligned with the axial slots 11' in the modified thermal sleeve 10'. The body portion 7100 of the device 7000 is then welded to the head penetration adapter 6 as illustrated in FIG. 31. The slidable members 7200 can then be slid into the axial slots 11' of the modified thermal sleeve 10' and the head portions 7220 of the slidable members 7200 are then welded to the body portion 7100 of the device 7000. The slidable members 7200 and axial slots 11' are sized and shaped such that, when the slidable members 7200 are received in the axial slots 11', rotational movement of the modified thermal sleeve 10' about the shaft axis SA thereof is restricted while permitting some amount of axial translation of the modified thermal sleeve 10' along the shaft axis SA relative to the head penetration adapter 6.

Further to the above, in at least one alternative embodiment, the slidable members 7200 comprise external threads that mate with internal threads defined within the through holes 7114 of the device 7000. In such an arrangement, the slidable members 7200 are threadably engaged with the body portion 7100 of the device and can be rotated to translate the slidable members 7200 into the axial slots 11' of the modified thermal sleeve 10'. Further, welds may be applied to the head portions 7220 of the slidable members 7200 after the slidable members 7200 are installed.

From the foregoing example embodiments, it is thus to be appreciated that some novel features of the disclosed concept are that the design can be implemented on both replacement compressible thermal sleeves as well as on an existing thermal sleeve. The parts utilized in such arrangements are designed to interface between stationary and movable components composed of different materials. Embodiments of the concept must function submerged in an elevated temperature, highly turbulent environment. Much of the novelty of the device is to allow axial movement of the sleeve during head installation, while restricting motions induced by turbulent cross-flow. The spline/keyway design permits axial motion while restraining the 5 other degrees of freedom (translations perpendicular to the thermal sleeve axis and all rotations). It is to be appreciated that the arrangements provided herein may generally be reversed (i.e., coupled to the alternative of the head penetration adapter/thermal sleeve) without varying from the scope of the present disclosure.

Figure 32:
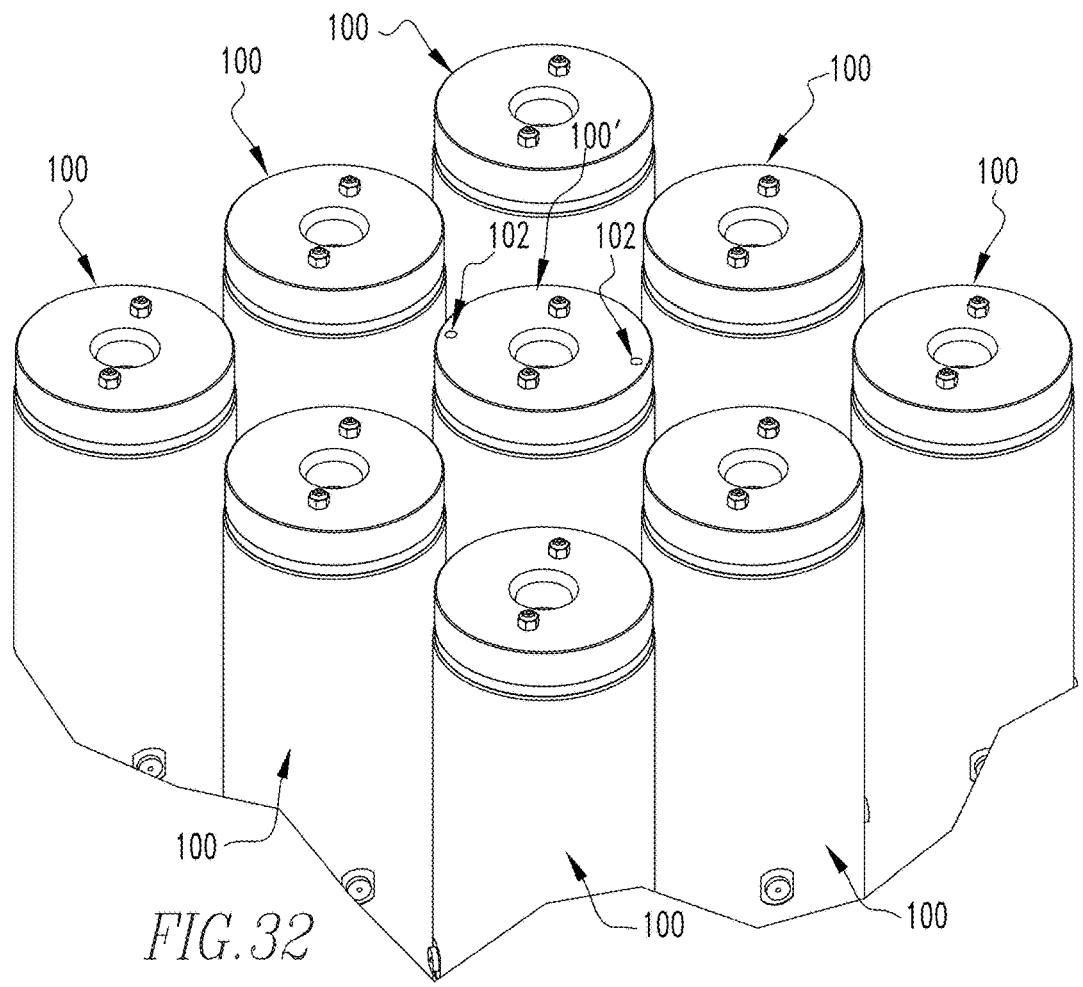
FIG. 32 is a perspective view of an arrangement of guide tubes of a nuclear reactor illustrating a modification to one of the guide tubes, in accordance with at least one aspect of the present disclosure.

As an alternative to the embodiments previously discussed which minimize/eliminate wear to one or both of the thermal sleeve and/or the associated head penetration adapter by inhibiting rotation of the thermal sleeve by utilizing interacting elements coupled to the thermal sleeve and the penetration adapter, the disclosed concept also provides embodiments which utilize interactions between the guide funnel of a thermal sleeve and one or more elements coupled to the corresponding guide tube below. An arrangement of a plurality of guide tubes 100 in which a guide tube 100' thereof has been modified in accordance with at least one embodiment of the disclosed concept is shown in FIG. 32. More particularly, modified guide tube 100' has been modified to include a plurality (two are shown) of threaded blind holes 102 formed in the top thereof. In at least one embodiment, the threaded blind holes 102 were formed by first forming blind holes via EDM, with tapping thereof then carried out using a conventional tap, remotely operated. It is to be appreciated, however, that threaded blind holes 102 may be formed via any other suitable method without varying from the scope of the present disclosure. It is also to be appreciated that the quantity of threaded blind holes 102 may be varied without varying from the scope of the present disclosure.

Figure 33:
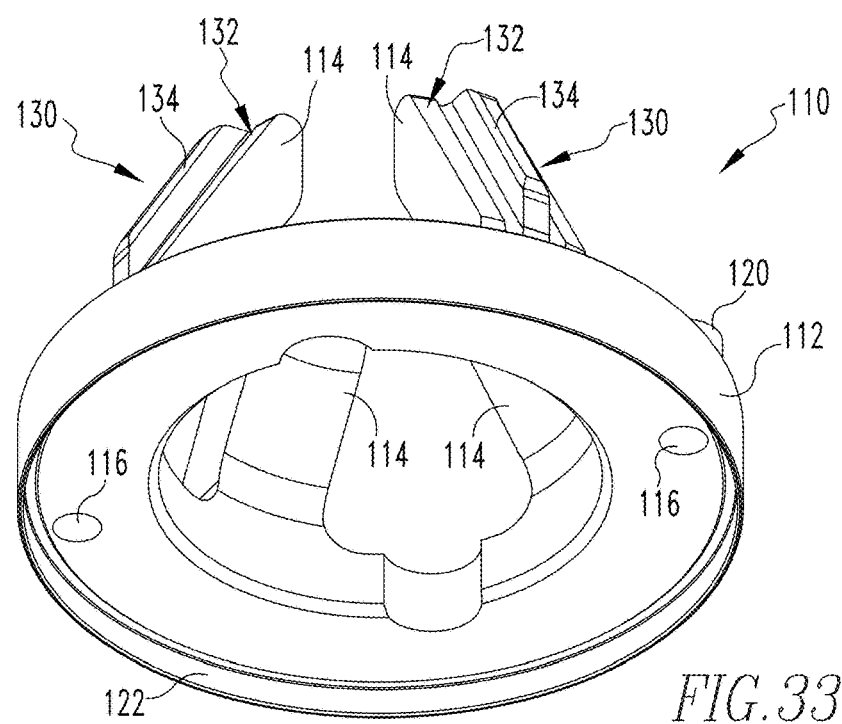
FIG. 33 is a perspective view of a wear mitigation device in accordance with at least one aspect of the present disclosure.
Figure 34:
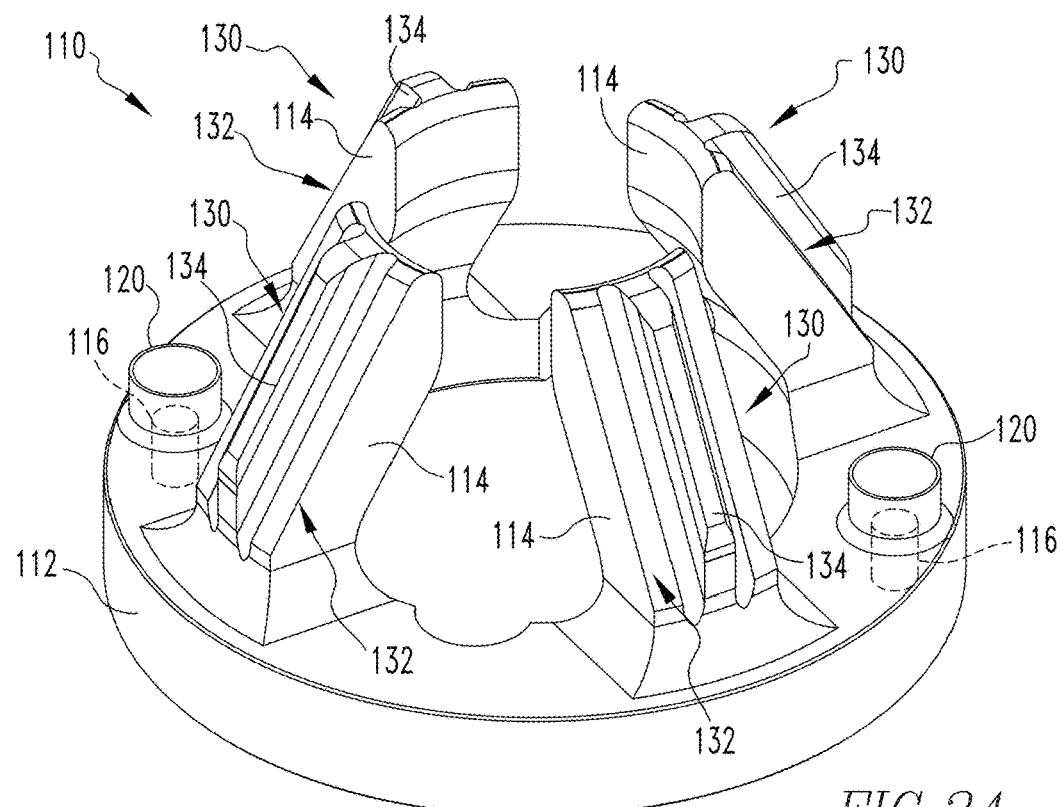
FIG. 34 is another perspective view of the wear mitigation device of FIG. 33.

Referring now to FIGS. 33 and 34, a wear mitigation device 110 is depicted. The wear mitigation device 110 includes a base 112, formed as a circular ring, that is configured to be coupled to the guide tube 100' and a plurality of protruding elements, or protruding members 114, each extending upward from the base 112, that are sized and configured to engage a guide funnel of a thermal sleeve, as will be discussed in further detail below. The wear mitigation device 110 shown in the figures includes four protruding members 114, however, it is to be appreciated that the quantity of protruding members 114 may be varied without varying from the scope of the present disclosure.

Figure 36A:
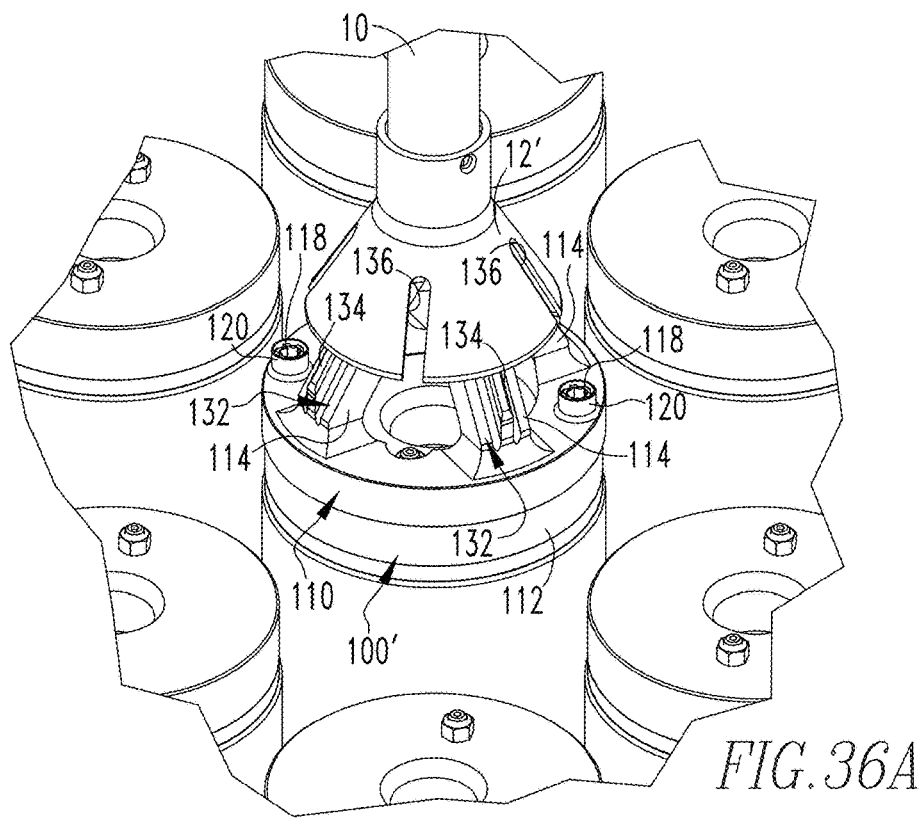
FIG. 36A is a perspective view of an arrangement of guide tubes, similar to FIG. 32, illustrating the wear mitigation device of FIGS. 33 and 34 installed on one of the guide tubes and the guide funnel of FIG. 35 engaged with the wear mitigation device in a first positioning.
Figure 36B:
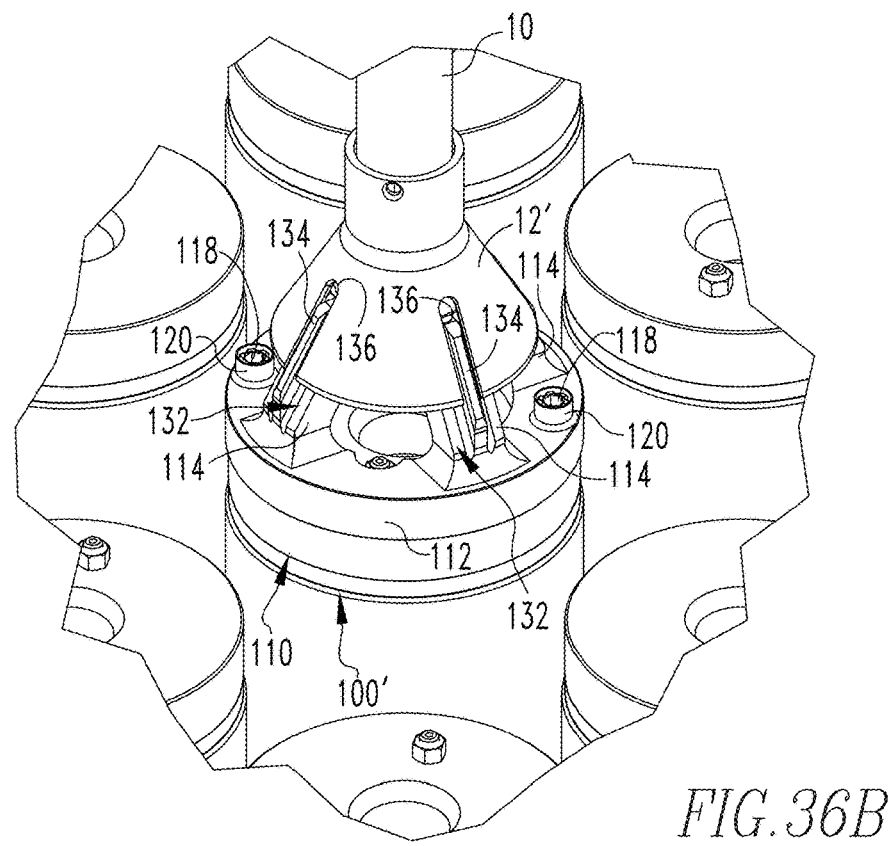
FIG. 36B is a perspective view of an arrangement of guide tubes, similar to FIG. 32, illustrating the wear mitigation device of FIGS. 33 and 34 installed on one of the guide tubes and the guide funnel of FIG. 35 engaged with the wear mitigation device in a second positioning different from the first positioning shown in FIG. 36A.
Figure 37:
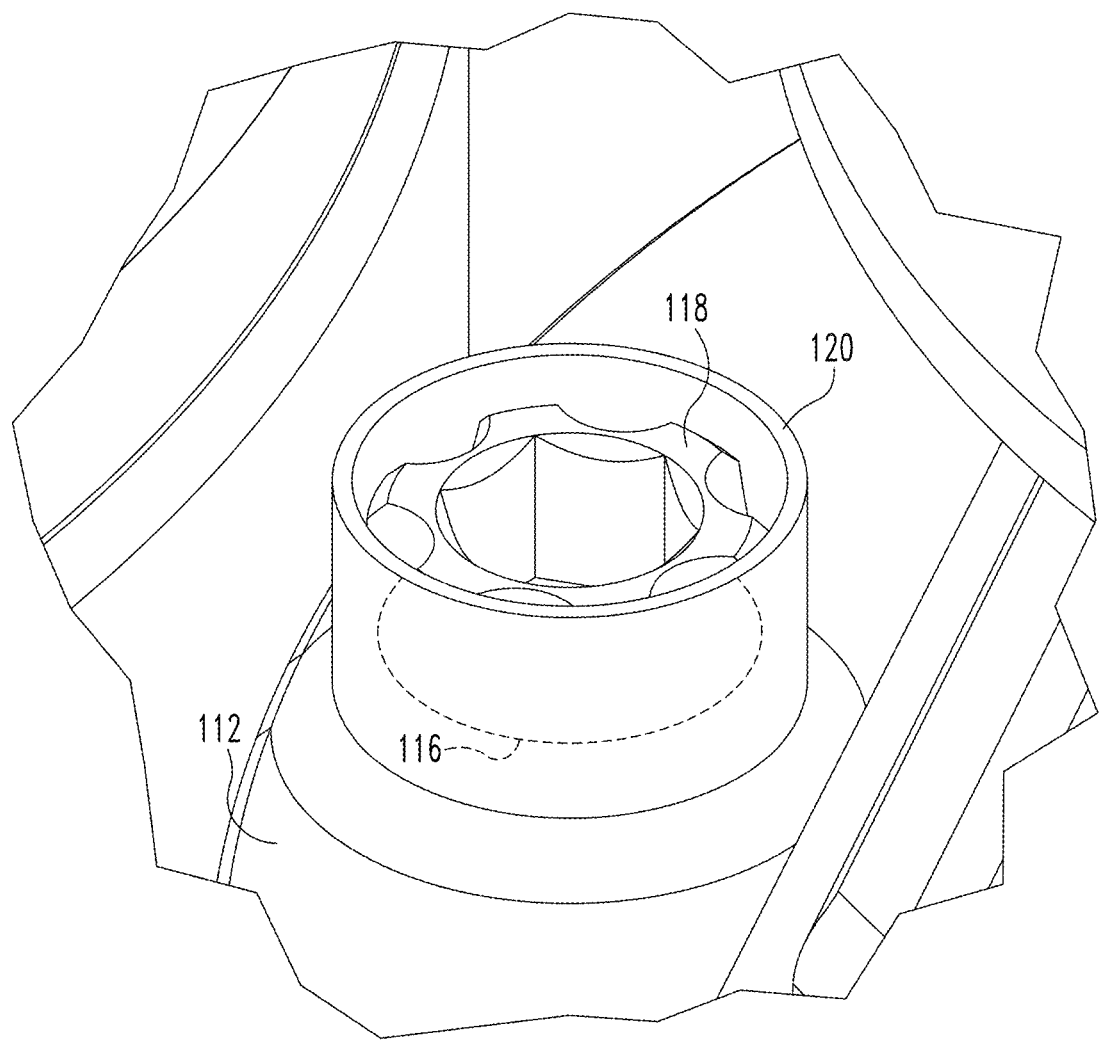
FIG. 37 is an enlarged view of FIG. 36A illustrating the interaction of a fastening mechanism for securing the wear mitigation device of FIG. 34 to a guide tube and further illustrating a crimp collar of the wear mitigation device for inhibiting unwanted rotation of the fastening mechanism in accordance with at least one aspect of the present disclosure.

To facilitate coupling of the base 112 to the modified guide tube 100', the base 112 includes a plurality of apertures 116 defined therethrough. Each aperture 116 is positioned so as to align with a corresponding one of the plurality of threaded blind holes 102 of modified guide tube 100' and to receive a threaded bolt 118 therethrough, such as shown in FIGS. 36A and 36B, which threadingly engages the corresponding threaded blind hole 102. In order to prevent each threaded bolt 118 from loosening, the base 112 further includes a plurality of collars 120, with each collar 120 being disposed about a corresponding one of the apertures 116 and extending upward from the base 112, as shown in FIG. 37. Each collar 120 is deformable inward toward the head portion of each threaded bolt 118 via a crimping tool or other suitable mechanism in a manner such that the collar 120 may be deformed against the head portion of the bolt 118, thus preventing rotation of the bolt 118. Additionally, the collar 120 prevents loose parts from being introduced into the reactor in the unlikely event of the head portion of the bolt 118 separating from the remainder of bolt 118. In order to properly align the base 112 with the guide tube 100', the base 112 may include a circumferential lip 122 (FIG. 33) extending downward therefrom which is sized and configured to cooperatively engage a portion of the modified guide tube 100' in a manner that aligns the base 110 with the modified guide tube 100'.

Figure 35:
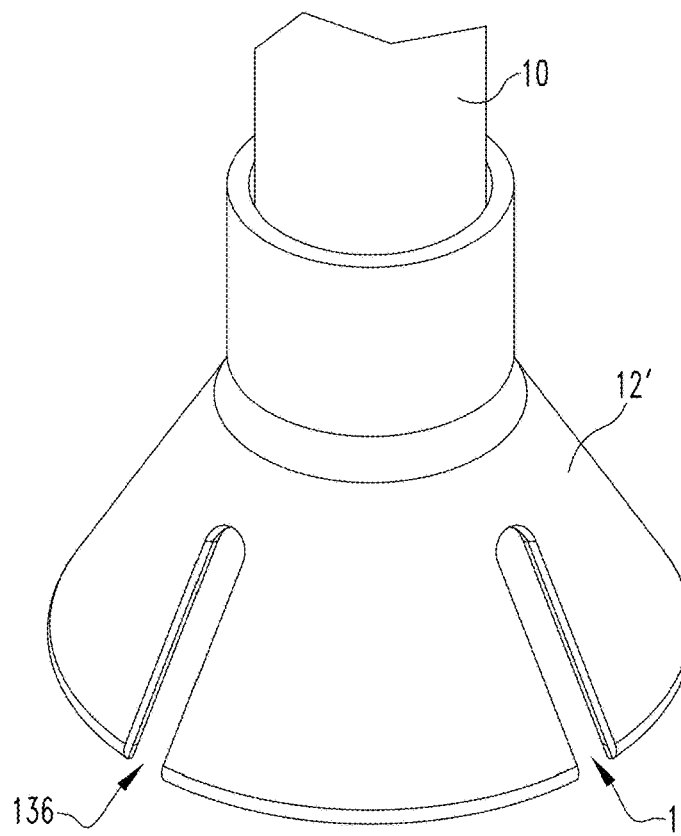
FIG. 35 is a perspective view of a guide funnel configured to be installed on a lower portion of a thermal sleeve in accordance with in accordance with at least one aspect of the present disclosure.

Referring again to FIGS. 33 and 34, as well as to FIGS. 35, 36A and 36B, each of the protruding members 114 includes a portion 130 that is configured to engage a corresponding portion of a guide funnel 12' of thermal sleeve 10. In the example of FIGS. 33, 34, 36A and 36B, the portion 130 includes an outward facing surface 132 that is disposed at an angle that corresponds to the angle of an inner conical surface of the guide funnel 12'. The portion 130 further includes a key 134 extending further outward from surface 132. In the illustrated embodiment, the key 134 is in the form of a vertically oriented ridge-like element which is sized and configured to cooperatively engage a corresponding slot 136 (e.g., formed via EDM machining or other suitable method) defined in the guide funnel 12'. The engagement between each key 134 and corresponding slot 136 resists, reduces, and/or prevents rotation of the thermal sleeve 10, thus reducing wear otherwise resulting from rotation. FIG. 36A shows an example of a potential initial "raised up" orientation of the guide funnel 12' on wear mitigation device 110. Thermal sleeve 10 and guide funnel 12' thereof will rotate as a result of coolant flow until oriented such that slots 136 align with keys 134, thus causing guide funnel 12' and thermal sleeve 10 to drop into the "fixed" position such as shown in FIG. 36B.

Figure 38:
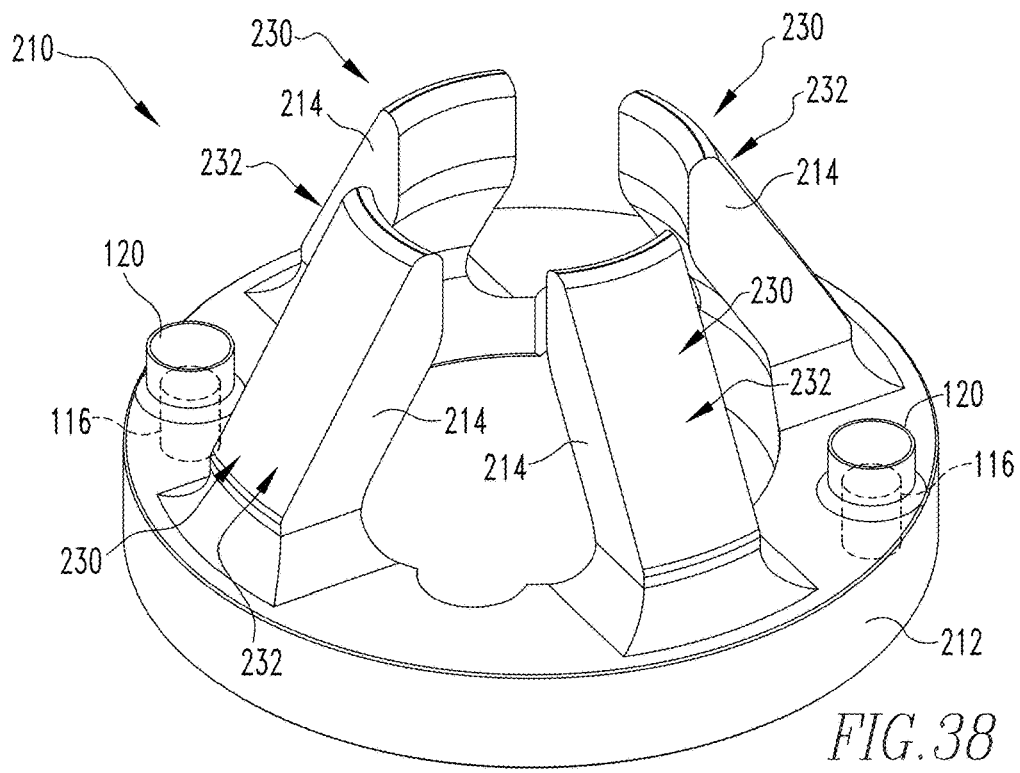
FIG. 38 is an upper perspective view of a wear mitigation device in accordance with at least one aspect of the present disclosure.
Figure 39:
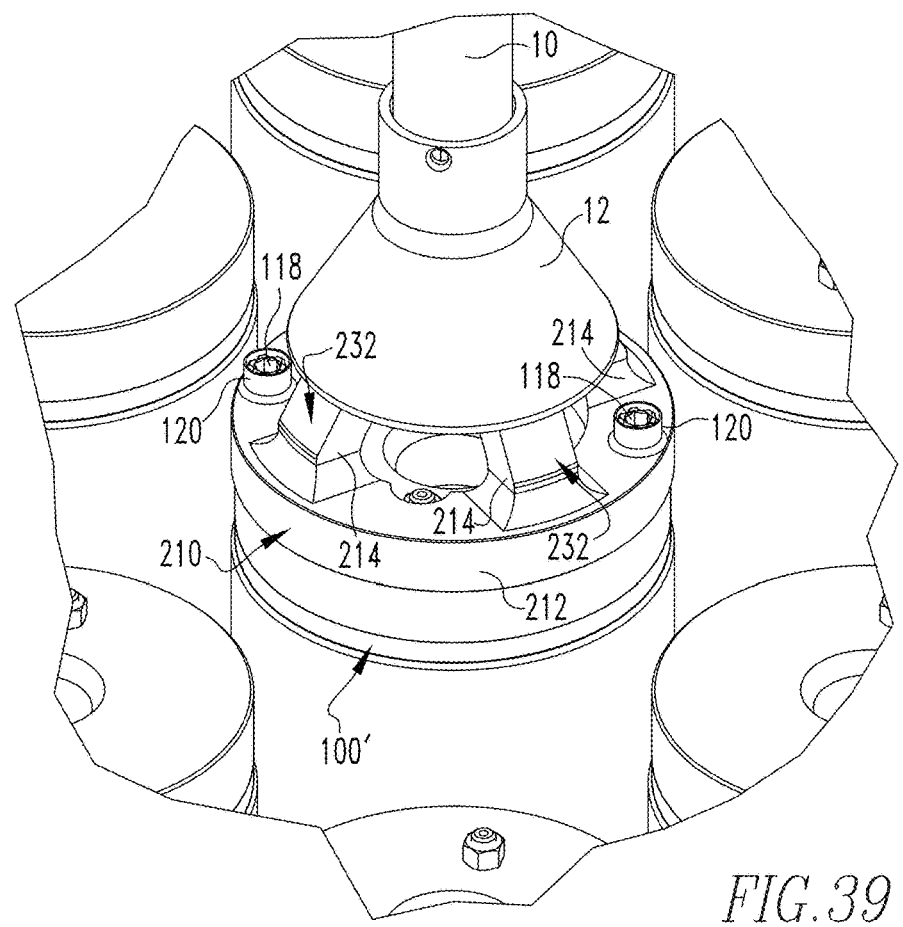
FIG. 39 is a perspective view of an arrangement of guide tubes, similar to FIG. 32, shown with the wear mitigation device of FIG. 38 installed on one of the guide tubes and a guide funnel attached to a lower portion of a thermal sleeve engaged with the wear mitigation device.

FIGS. 38 and 39 depict a wear mitigation device 210. The wear mitigation device 210 is similar to the device 110 previously discussed. The wear mitigation device 210 comprise a based 212, formed as a circular ring that is configured to be coupled to the guide tube 100', and a plurality of protruding members 214, each extending upward from the base 212, that are sized and configured to engage a guide funnel 12 of a thermal sleeve 10, as will be discussed in greater detail below.

A portion 230 of each protruding member 214 of the device 210 is configured to engage a corresponding portion of a guide funnel 12 of the thermal sleeve 10 and includes an outward facing surface 232 that is disposed at an angle that corresponds to the angle of an inner conical surface of guide funnel 12. As device 210 does not include any key, such as keys 134 of device 110, the device 210 is configured to provide additional support surfaces to thermal sleeve 10 and guide funnel 12 thereof, which helps to reduce wear thereto, and reduce the rate at which thermal sleeve 10 drops, while resisting, reducing, and/or preventing rotation of thermal sleeve 10 and guide funnel 12 thereof (e.g., via increased frictional forces due to increased surface contact areas).

Figure 40:
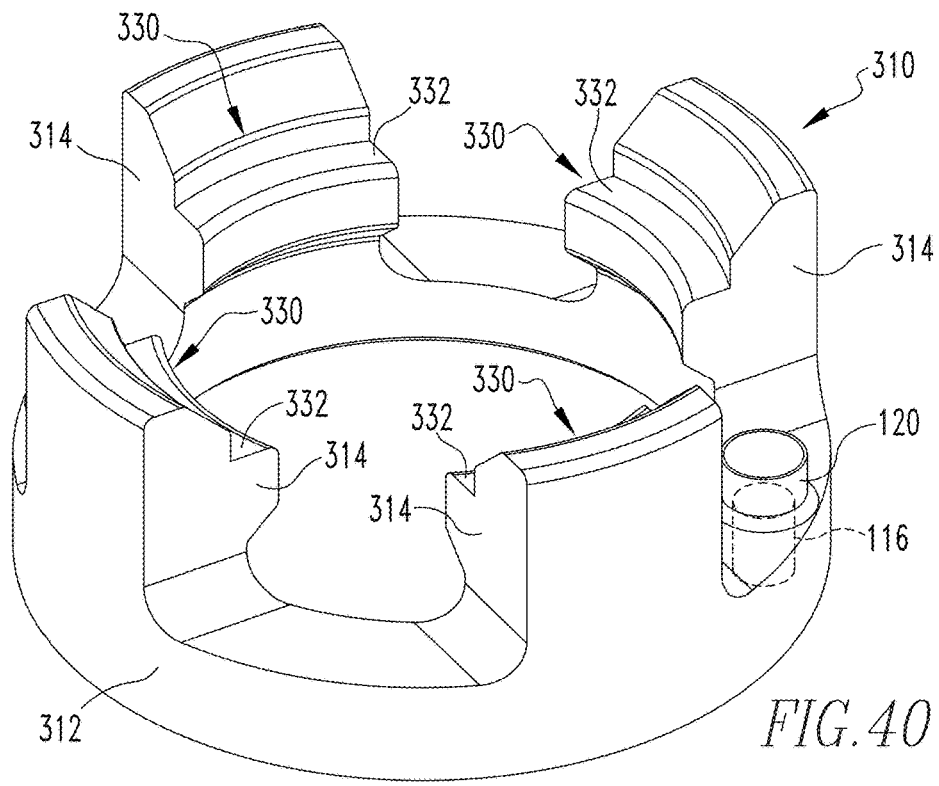
FIG. 40 is a perspective view of a wear mitigation device in accordance with at least one aspect of the present disclosure.
Figure 41:
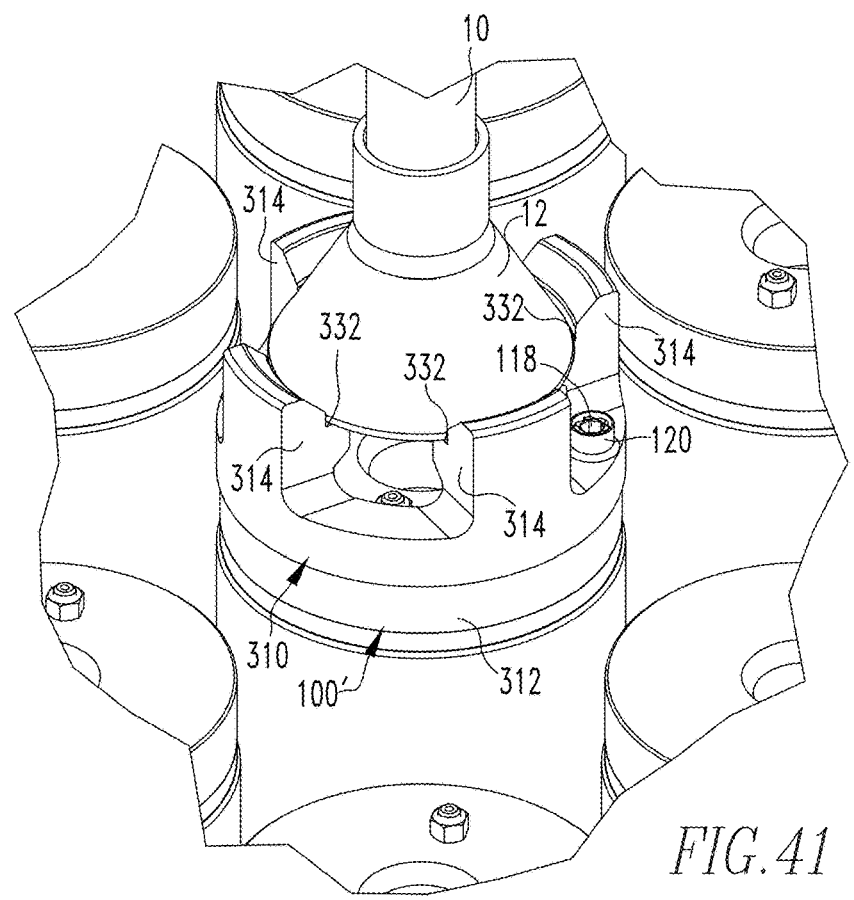
FIG. 41 is a perspective view of an arrangement of guide tubes, similar to FIG. 32, shown with the wear mitigation device of FIG. 40 installed on one of the guide tubes and a guide funnel attached to a lower portion of a thermal sleeve engaged with the wear mitigation device.
Figure 42:
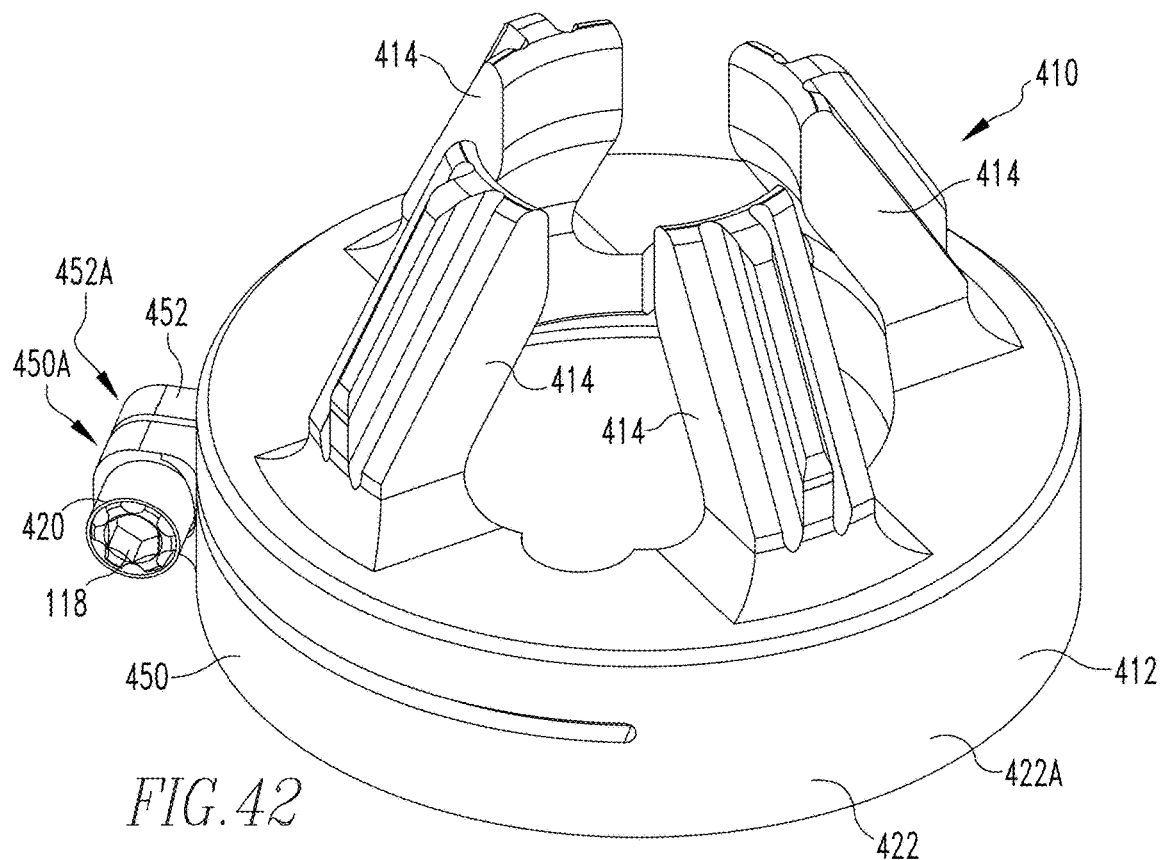
FIG. 42 is a perspective view of a wear mitigation device in accordance with at least one aspect of the present disclosure.
Figure 43:
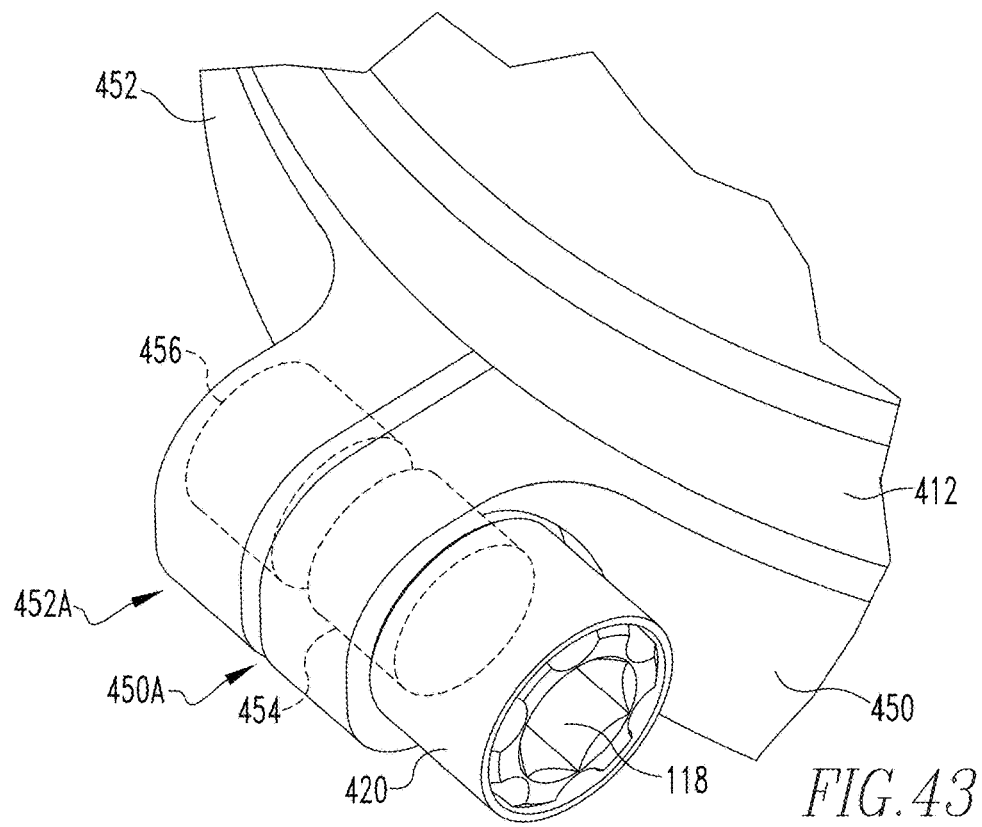
FIG. 43 is an enlarged perspective view of a portion of the wear mitigation device of FIG. 42.
Figure 44:
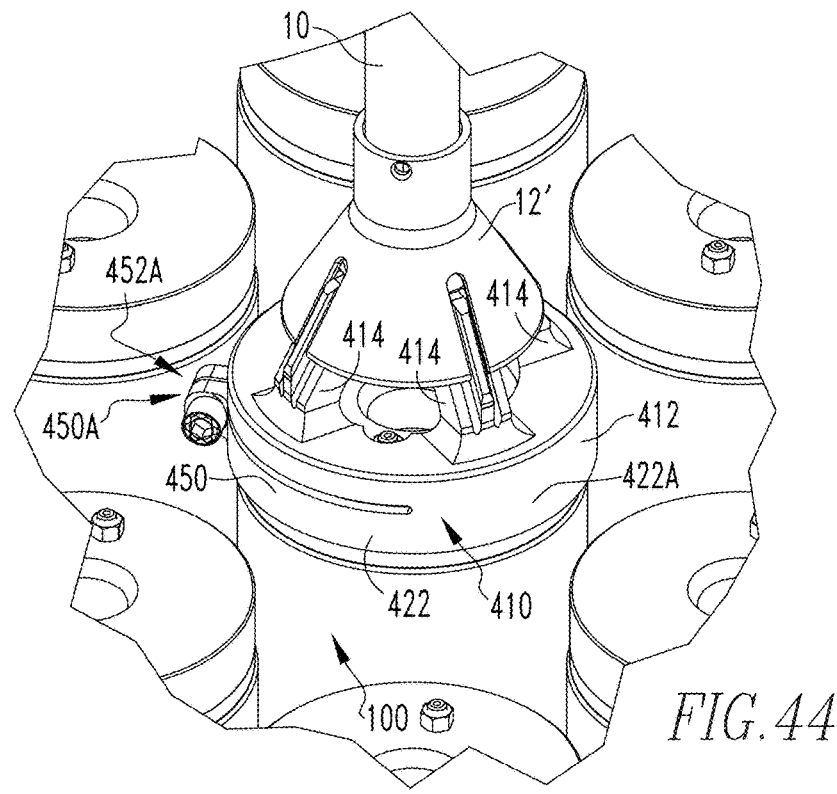
FIG. 44 is a perspective view of an arrangement of guide tubes, similar to FIG. 32, shown with the wear mitigation device of FIG. 42 installed on one of the guide tubes and the guide funnel of FIG. 35 engaged with the wear mitigation device.
Figure 45:
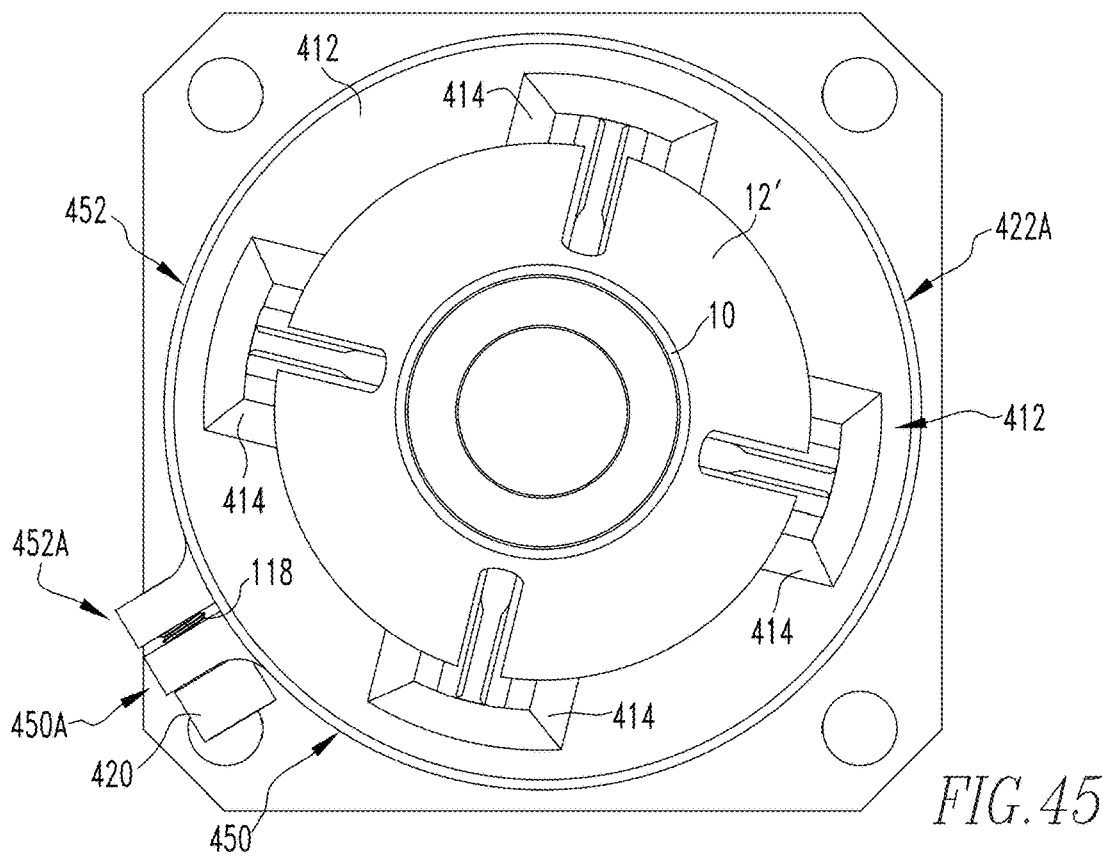
FIG. 45 is a top view of the arrangement of FIG. 44.

FIGS. 40 and 41 depict a wear mitigation device 310. The wear mitigation device 310 is similar to the wear mitigation devices 110 and 210. The wear mitigation device 310 includes a base 312, formed as a circular ring, that is configured to be coupled to the guide tube 100', and a plurality of protruding members 314 extending upward from the base 312. A portion 330 of each of the protruding members 314 of the device 310 is configured to engage a corresponding portion of a guide funnel 12 of the thermal sleeve 10. Each portion 330 comprises an inward facing notch 332 that is sized and configured to engage a portion of the outer periphery of the guide funnel 12. As the device 310 does not include any key, such as keys 134 of device 110, the device 310, similar to the device 210, is configured to provide additional support surfaces to thermal sleeve 10 and guide funnel 12 thereof, which helps to reduce wear thereto, and reduces the rate at which the thermal sleeve 10 drops, while resisting, reducing, and/or preventing rotation of thermal sleeve 10 and the guide funnel 12 thereof (e.g., via increased frictional forces due to increased surface contact areas).

As an alternative to the previous devices 110, 210 and 310 which utilized bases 112, 212 and 312 that are bolted to a modified guide tube 100', some example embodiments which instead clamp on to an unmodified guide tube 100 are discussed in greater detail below.

FIGS. 42-45 depict a wear mitigation device 410. The wear mitigation device 410 is similar to the wear mitigation devices 110, 210, and 310. For example, the wear mitigation device includes a base 412 somewhat similar to that of devices 110, 210 and 310, previously discussed, except base 412 is not configured to be bolted to a guide tube 100 but instead is configured to be clamped thereto, as discussed in greater detail below.

Wear mitigation device 410 includes a plurality of protruding members 414 extending upward from base 412 that are identical to the plurality of protruding members 114 of wear mitigation device 110 discussed above (see FIGS. 33 and 34). The base 412 includes a bottom portion 422 that is configured to generally surround a top portion of a guide tube 100. The bottom portion 422 includes a first arcuate arm member 450 that extends circumferentially in a first direction around a portion of guide tube 100 from a portion 422A of the bottom portion 422 to a distal end 450A, and a second arcuate arm member 452 that extends circumferentially in a second direction (opposite the first direction) around another portion of guide tube 100 from portion 422A of the bottom portion 422 to a distal end 452A that is disposed adjacent, but separate from, distal end 450A of the first arm member 450. Each of the arm members 450 and 452 are elastically deformable such that the distal ends 450A and 452A thereof can be compressed together in a manner that clamps the base 412, and thus wear mitigation device 410, to the guide tube 100. In the illustrated embodiment, the distal end 450A includes an aperture 454 (FIG. 43) that is configured to allow a portion of a threaded bolt 118 to pass therethrough. The distal end 450A further comprises a crimpable collar 420 positioned about the aperture 454 that is configured to function in a manner similar to collar 120 previously discussed. Distal end 452A includes a threaded aperture 456 (FIG. 43) that is configured to be threadingly engaged by the threaded bolt 118. It is to be appreciated, that other suitable arrangements for tightening (or loosening) arm members 450 and 452 may be employed without varying from the scope of the present disclosure.

Figure 46:
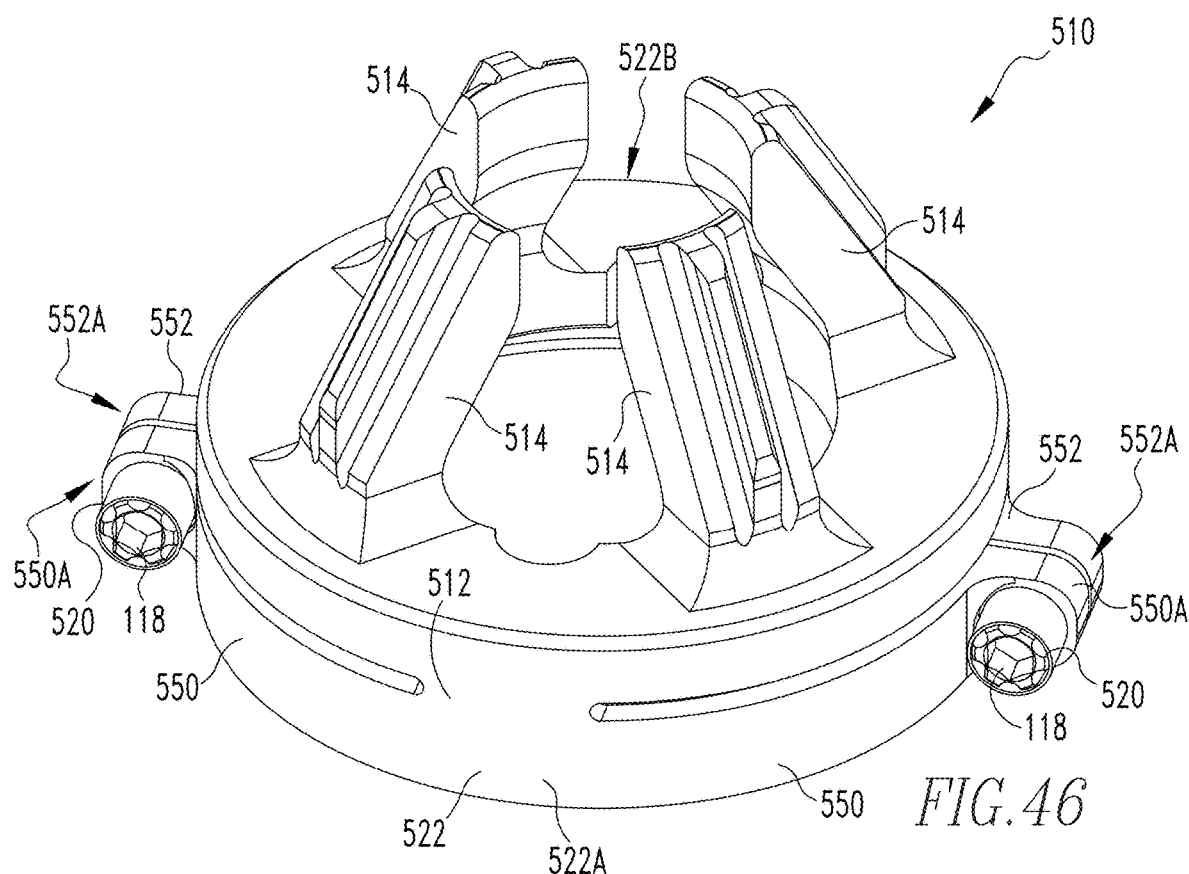
FIG. 46 is a perspective view of a wear mitigation device in accordance with at least one aspect of the present disclosure.

FIG. 46 depicts a wear mitigation device 510 that is similar to the wear mitigation devices 410, For example, the wear mitigation device 510 includes a base 512 that is similar to that of device 410 except the base 512 comprises two separate clamping locations on opposite sides of the base 512 which are configured to clamp the wear mitigation device 510 to a guide tube 100. More specifically, the base 512 includes a first set of first and second arcuate arm members 550 and 552 and a second set of first and second arcuate arm members 550 and 552, with each set functioning similar to the arrangement of the first and second arcuate arm members 450 and 452 of device 410, as discussed in greater detail below.

The wear mitigation device 510 includes a plurality of protruding members 514 extending upward from base 512 that are identical to the plurality of protruding members 114 of wear mitigation device 110 discussed above (see FIGS. 33 and 34). The base 512 includes a bottom portion 522 that is configured to generally surround a top portion of a guide tube 100. The bottom portion 522 includes the pair of first arcuate arm members 550 which extend circumferentially around a first portion of guide tube 100 from a portion 522A of the bottom portion 522. Each of the arcuate arm members 550 terminates at a distal end 550A. The bottom portion 522 further comprises the pair of second arcuate arm members 552 which extend circumferentially around a second portion (opposite the first portion) of the guide tube 100 from a portion 522B of the bottom portion 522. Each of the second arcuate arm members 552 terminates at a distal end 552A that is disposed adjacent, but separate from, a corresponding distal end 550A of each of the first arm members 550. Each of the arm members 550 and 552 are elastically deformable such that their respective distal ends 550A and 552A can be compressed together in a manner that clamps the base 512, and thus wear mitigation device 510, to the guide tube 100.

Further to the above, the distal ends 550A include an aperture, similar to aperture 454 (FIG. 43), that is configured to allow a portion of a threaded bolt 118 to pass therethrough. The distal ends 550A further comprises a crimpable collar 520 positioned about each aperture that is configured to function in a manner similar to collar 120 previously discussed. Further, the distal ends 552A include a threaded aperture, similar to threaded aperture 456 (FIG. 43), that is configured to be threadingly engaged by the threaded bolts 118. It is to be appreciated, that other suitable arrangements for tightening (or loosening) arm members 550 and 552 may be employed without varying from the scope of the present disclosure.

Figure 47:
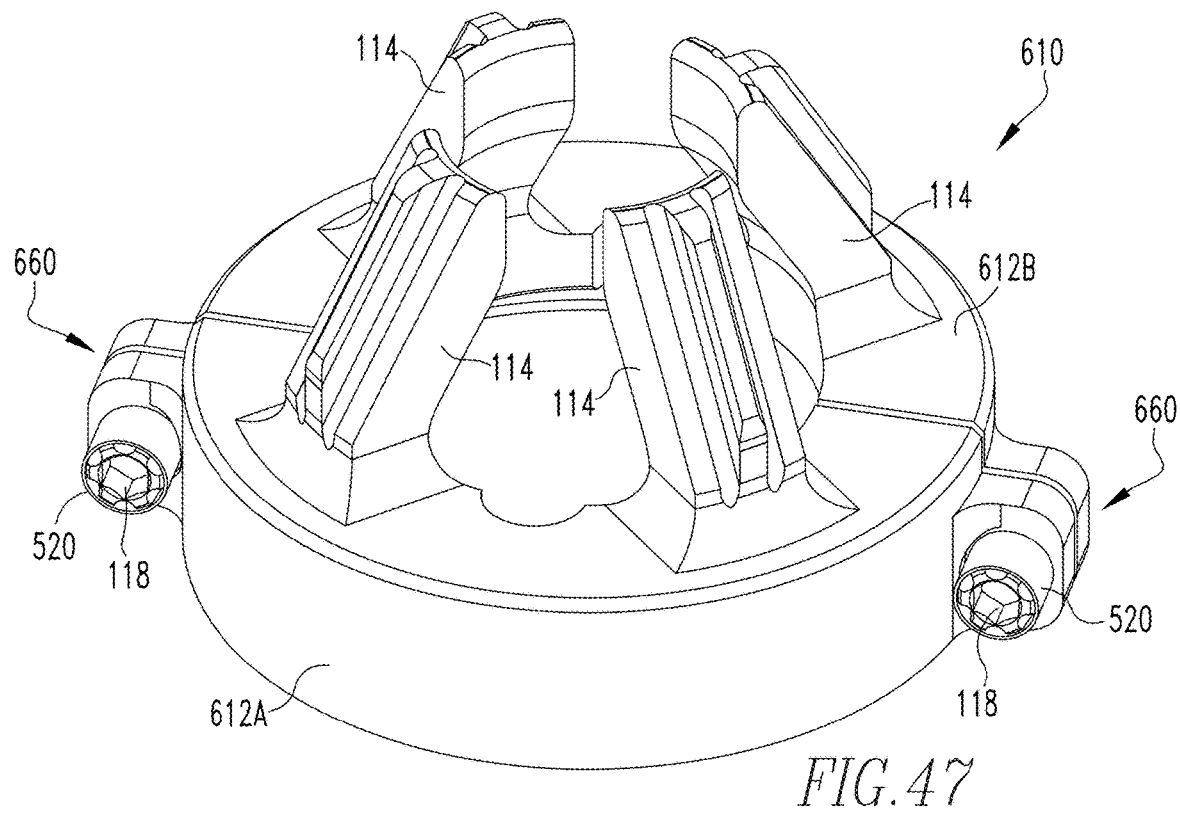
FIG. 47 is a perspective view of a wear mitigation device in accordance with at least one aspect of the present disclosure.
Figure 48:
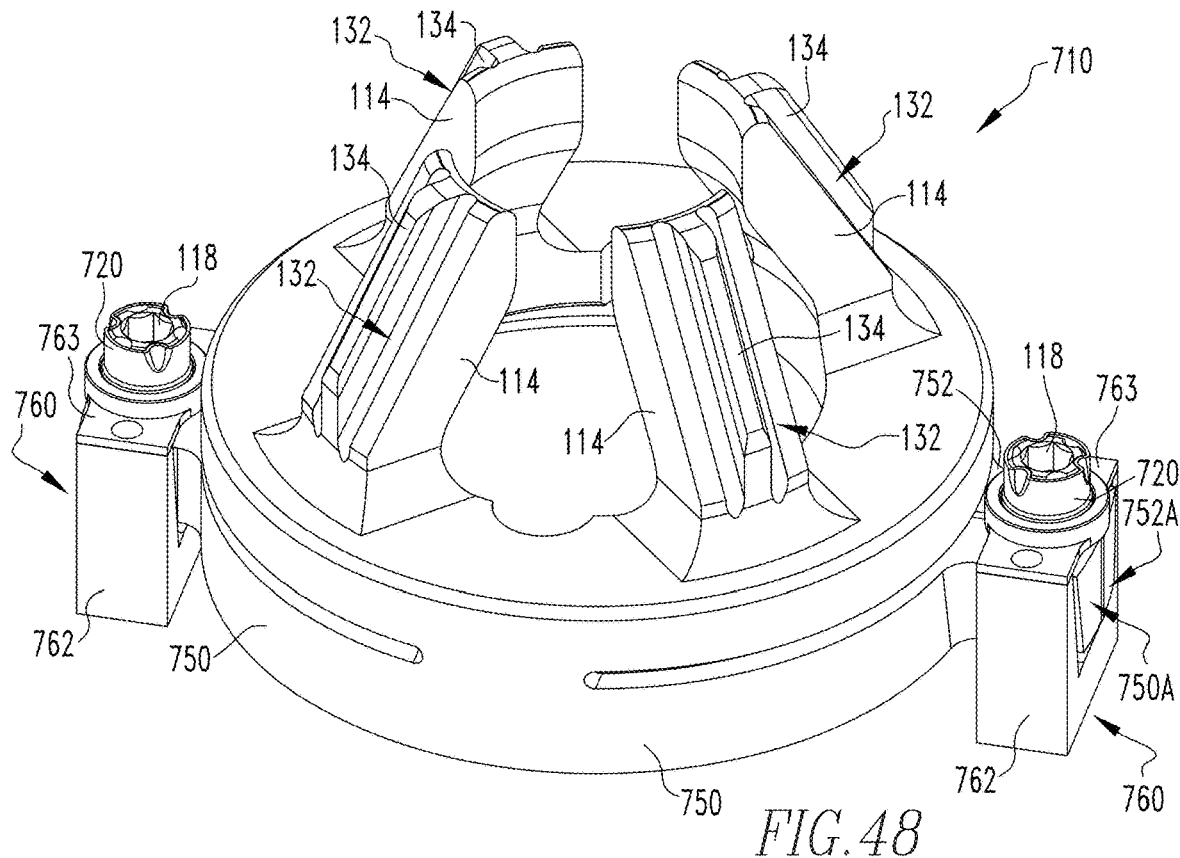
FIG. 48 is a perspective view of a wear mitigation device in accordance with at least one aspect of the present disclosure.
Figure 49:
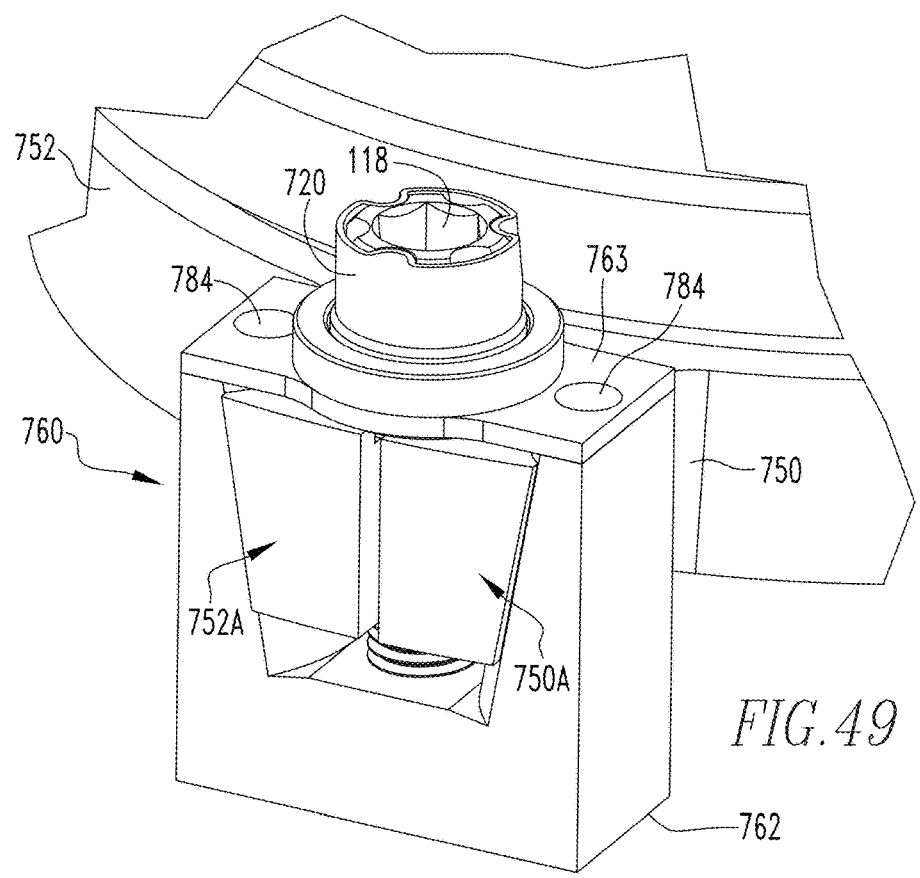
FIG. 49 is an enlarged perspective view of a portion of the wear mitigation device of FIG. 48.
Figure 50:
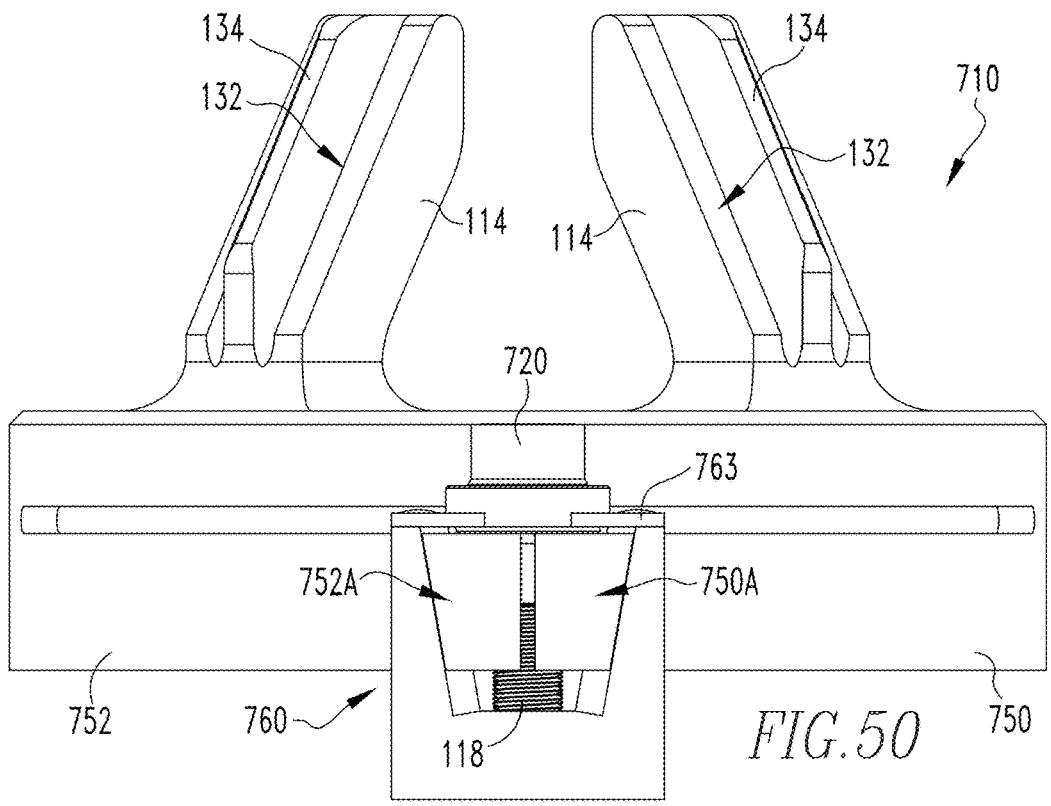
FIG. 50 is a side elevation view of the wear mitigation device of FIG. 48.
Figure 51:
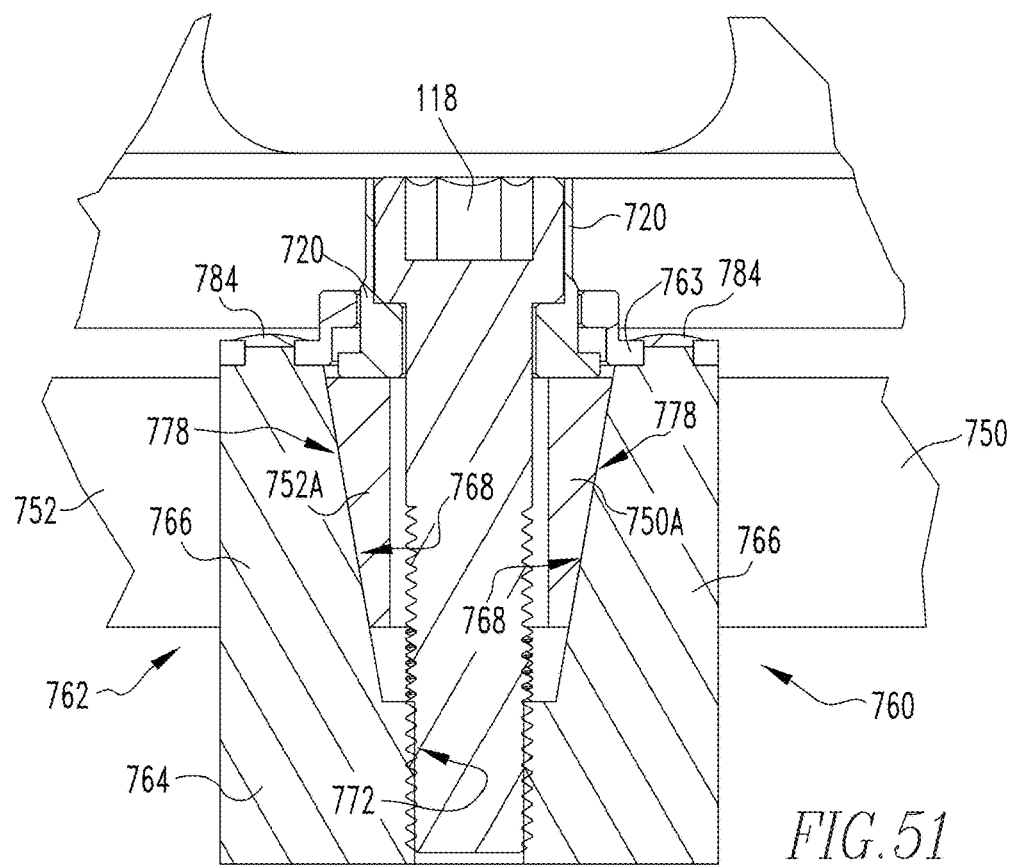
FIG. 51 is a cross-sectional view of a portion of the wear mitigation device of FIG. 48.
Figure 52:
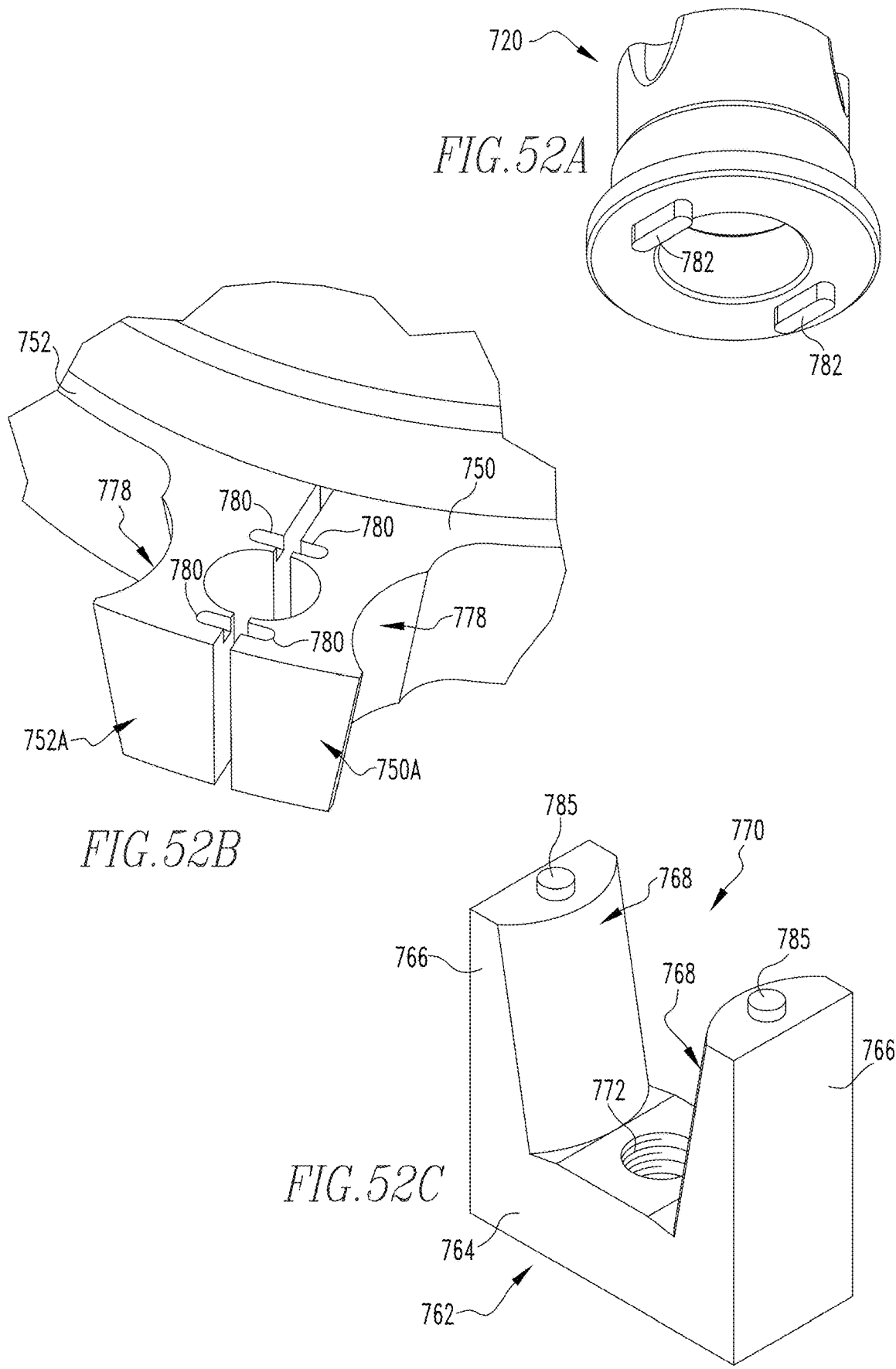
FIG. 52A is a perspective view of a crimping cup for use with the wear mitigation device of FIG. 48.
FIG. 52B is a perspective view of arm members of the wear mitigation device of FIG. 48.
FIG. 52C is a perspective view of a clamping wedge of the wear mitigation device of FIG. 48.

FIG. 47 illustrates another wear mitigation device 610 in accordance with yet another embodiment that is similar to the devices 410 and 510 previously discussed, except the base of the device 610 does not utilize any arm members to secure the device 610 to a guide tube 100. More specifically, the base is formed as two separate portions 612A and 612B, which are coupled together via suitable adjustable fastening mechanisms 660. In the illustrated example, the fastening mechanisms 660 are similar to the arrangement used to tighten distal ends 550A and 552A of devices 410 and 510 previously discussed, however, it is to be appreciated that other suitable fastening arrangements may be employed without varying from the scope of the present disclosure.

FIGS. 48-54 depict a wear mitigation device 710 similar to devices 510 and 610 (FIGS. 46 and 47). For example, the wear mitigation device 710 comprises distal ends 750A and 752A of first and second arcuate arm members 750 and 752 similar to the devices 510 and 610. Further, the wear mitigation device 710 comprises protruding members 114 which include outwardly facing surfaces 132 and keys 134, as previously discussed. The wear mitigation device 710 comprises vertical coupling arrangements 760 configured to couple together the distal ends 750A and 752A of the first and second arcuate arm members 750 and 752, as discussed in greater detail below.

Each vertical coupling arrangement 760 includes a clamping wedge 762, a crimp cup 720, a retention plate 763, and a threaded bolt 118. Referring primarily to FIG. 520, the clamping wedge 762 is formed as a generally U-shaped member including a base 764 and a pair of vertically extending members 766 extending upward from the base 764. Each of the vertically extending members 766 includes an inward facing surface 768 that is disposed at an outward angle such that a generally V-shaped groove 770 is defined between inward facing surfaces 768. In the example illustrated, each of inward facing surfaces 768 are shaped as a portion of a cylinder, however it is to be appreciated that other arrangements may be employed without varying from the scope of the present disclosure. The base 764 includes a vertically oriented threaded hole 772 defined therein which is sized and configured to be threadingly engaged by a threaded portion of the bolt 118.

Referring primarily to FIG. 52B, each of distal ends 750A and 752A of arcuate arm members 750 and 752 include an engagement surface 778 that is correspondingly shaped and positioned to engage with a corresponding one of the inward facing surfaces 768 of the clamping wedge 762. Each of the distal ends 750A and 752A also include slots 780 which are engaged by cooperatively shaped protrusions 782 (FIG. 52A) that extend from a bottom surface of the crimp cup 720. When assembled, each of distal ends 750A and 752A are positioned within the V-shaped groove 770 of the clamping wedges 762 such that engagement surfaces 778 are engaged with inward facing surfaces 768. Apertures in the retention plate 763 are aligned with protrusions 785 extending above the vertically extending members 766 of the clamping wedge 762. The retention plate 763 is then is coupled (e.g., via plug welds 784) to the tops of the vertically extending members 766 of the clamping wedge 762 so as to capture the distal ends 750A and 752A within the V-shaped groove 770. The bolt 118 is then inserted through the crimp cup 720, passed between distal ends 750A and 752A and into threaded hole 772 in base 764 of clamping wedge 762.

In use, the base of the wear mitigation device 710 is placed around the guide tube 100 and then the bolts are tightened to clamp the wear mitigation device 710 to the guide tube 100. More specifically, when the bolt 118 is rotated in the clockwise direction, for example, the clamping wedge 762 will move upward (i.e., towards the crimp cup 720 of the bolt 118). The inward facing surfaces 768 of the clamping wedge 762 will engage the engagement surfaces 778 of the distal ends 750A and 752A as the clamping wedge 762 moves upward. Thus, the distal ends 750A and 752A are clamped together, and thus, the wear mitigation device 710 is clamped around the guide tube 100 when the bolts 118 are rotated in a clockwise direction. Other embodiments are envisioned where the bolts 118 are rotated in a counter clockwise direction to clamp the wear mitigation device to the guide tube 100.

Figure 53:
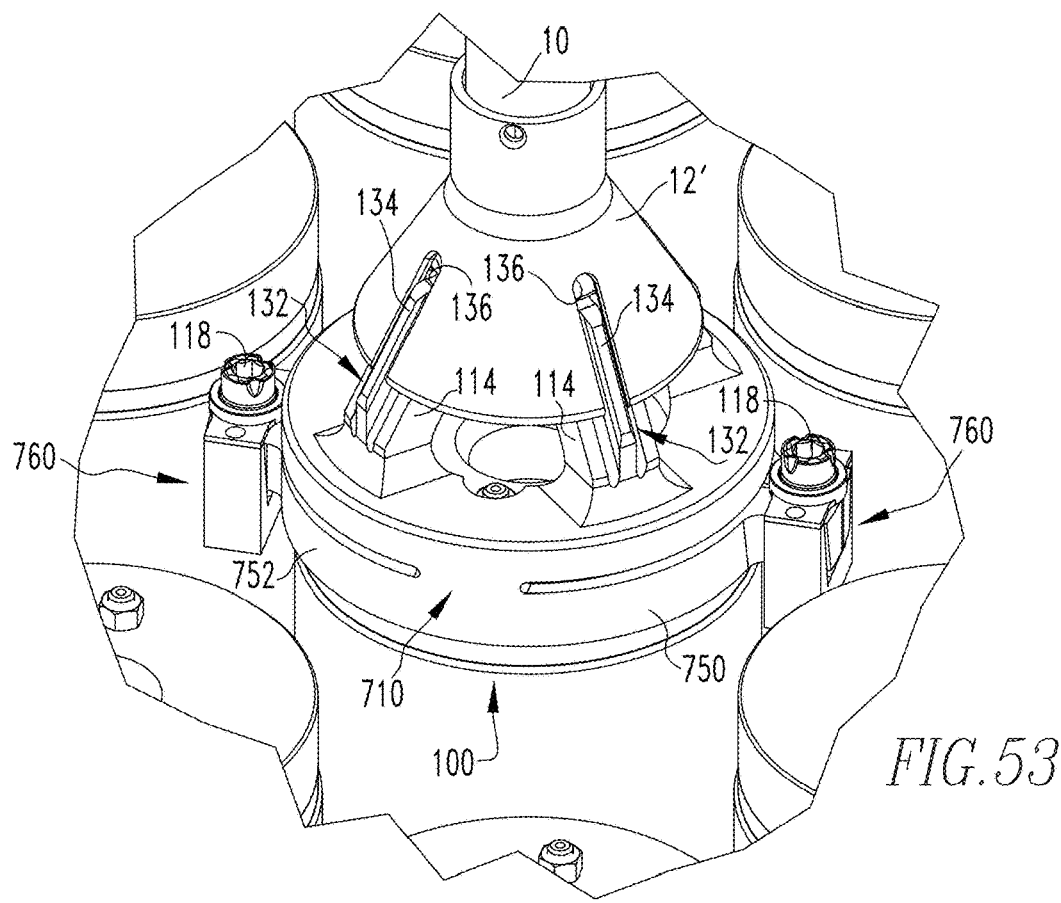
FIG. 53 is a perspective view of an arrangement of guide tubes, similar to FIG. 32, shown with the wear mitigation device of FIG. 48 installed on one of the guide tubes and a guide funnel, such as shown in FIG. 35, engaged with the wear mitigation device.
Figure 54:
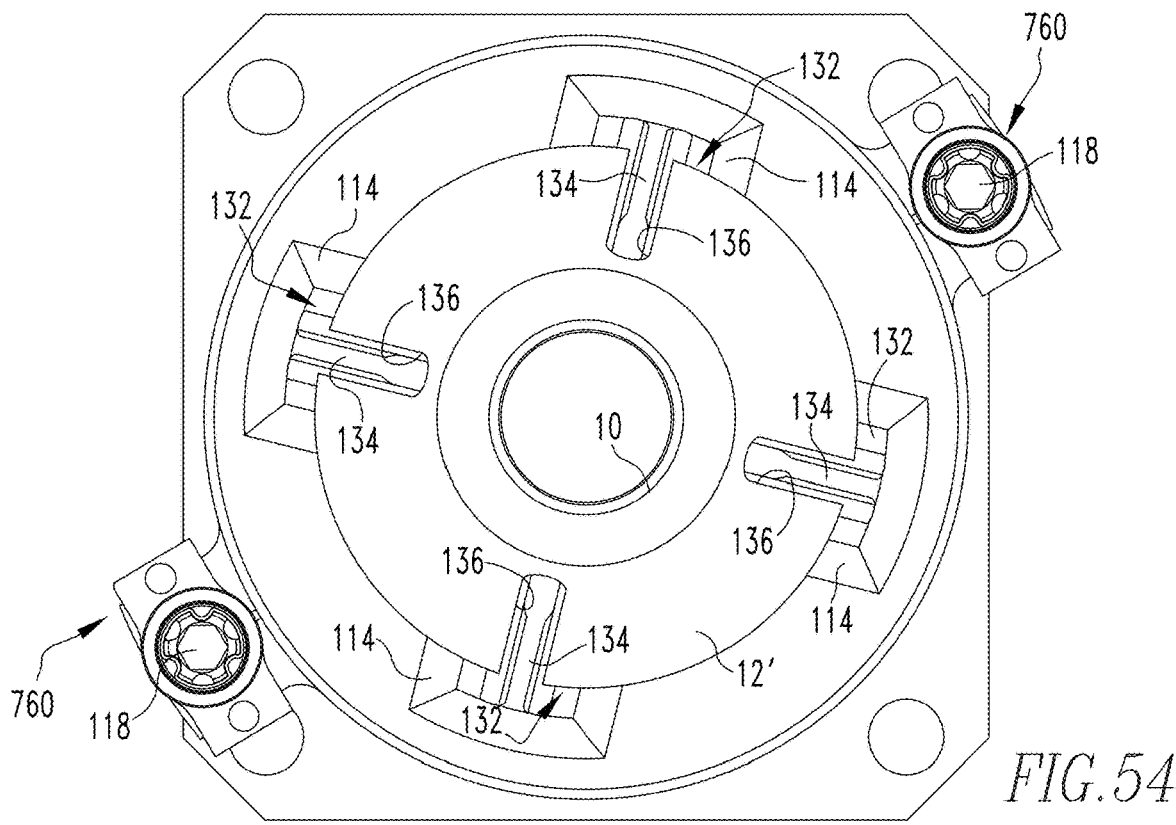
FIG. 54 is a top view of the arrangement of FIG. 53.

It is to be appreciated that each vertical coupling arrangement 760 is designed so as to be fully assembled (i.e., as shown in Figures, 48-51) in both a fully loosened positioning (i.e., when first and second arcuate arm members 750 and 752 are in a completely untightened positioning prior to install on a guide tube 100) as well as in a fully tightened positioning (i.e., when first and second arcuate arm members 750 and 752 are tightened against a guide tube 100 (i.e., as shown in FIG. 53) and provides for a vertically arranged bolt 118 that can be readily accessed during installation and/or removal of wear mitigation device 710 from a guide tube 100.

Figure 55A:
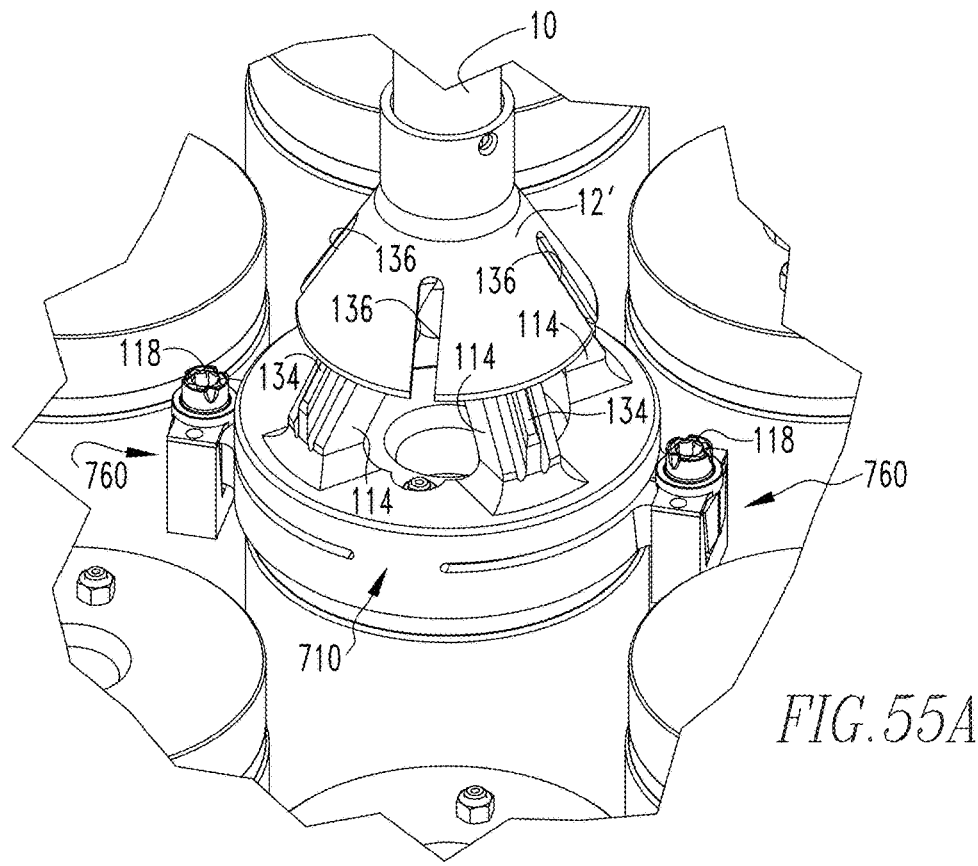
FIG. 55A is a perspective view of an arrangement of guide tubes, similar to FIG. 32, shown with the wear mitigation device of FIG. 48 installed on one of the guide tubes and a guide funnel, such as shown in FIG. 35, engaged with the wear mitigation device in a first positioning.
Figure 55B:
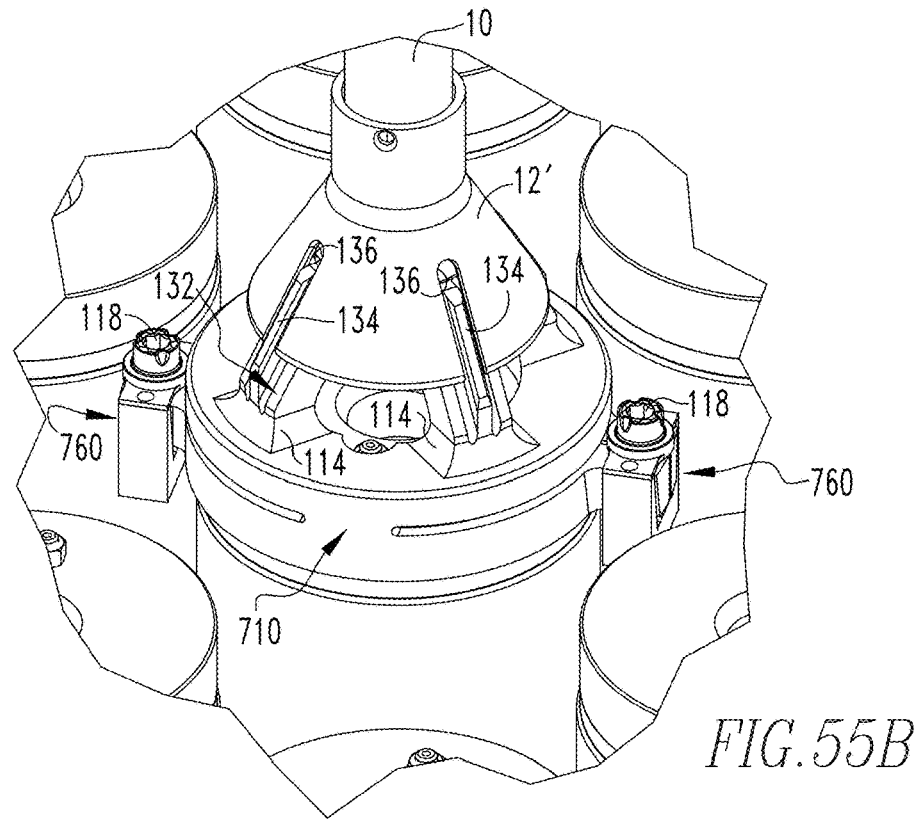
FIG. 55B is a perspective view of an arrangement of guide tubes, similar to FIG. 32, shown with the wear mitigation device of FIG. 48 installed on one of the guide tubes and a guide funnel, such as shown in FIG. 35, engaged with the wear mitigation device in a second positioning different from the first positioning shown in FIG. 55A.
Figure 56:
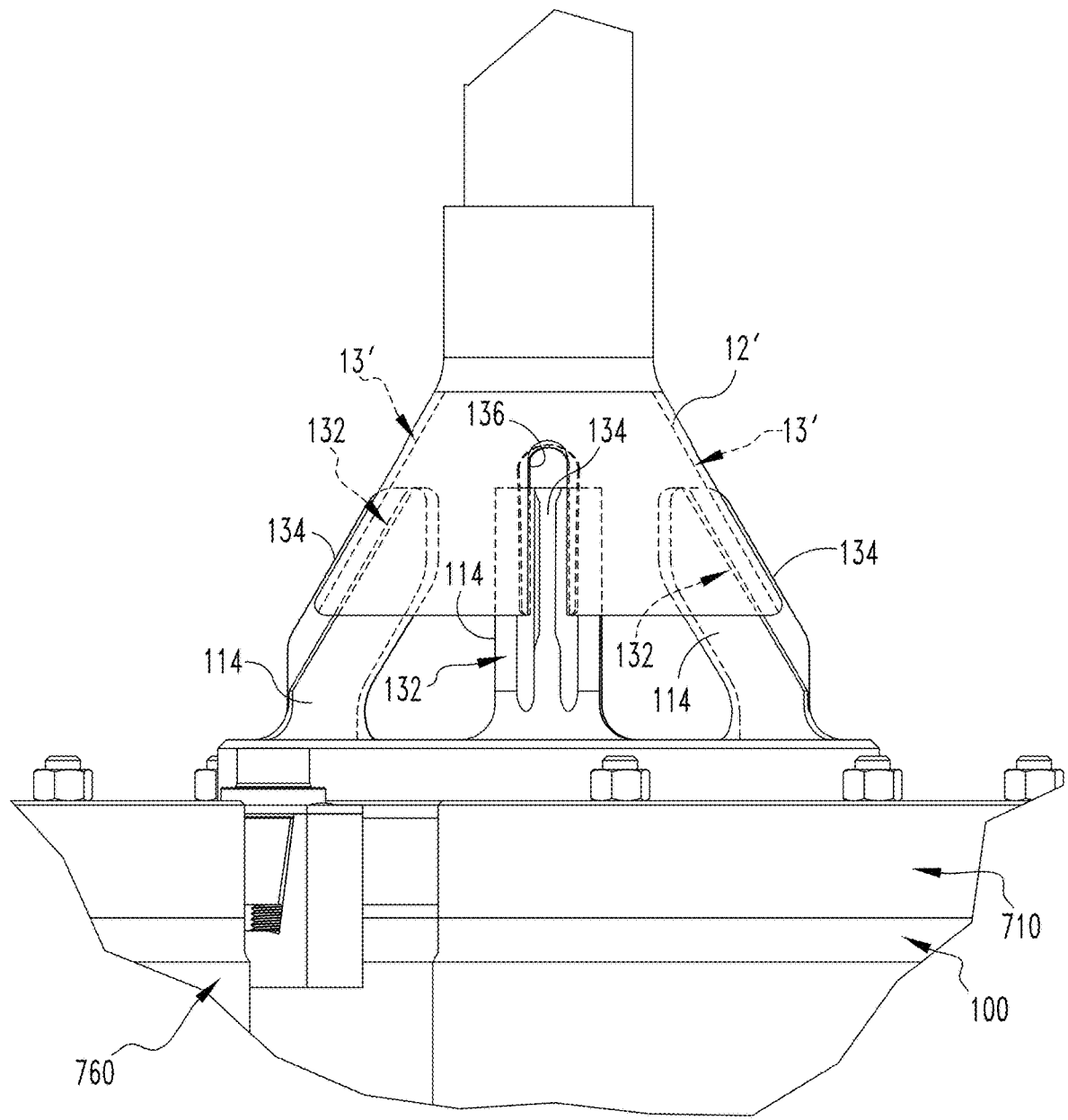
FIG. 56 is a side elevation view of the arrangement of FIG. 55B with the guide funnel shown with hidden lines to better illustrate the interaction between the guide funnel and the wear mitigation device.
Figure 57:
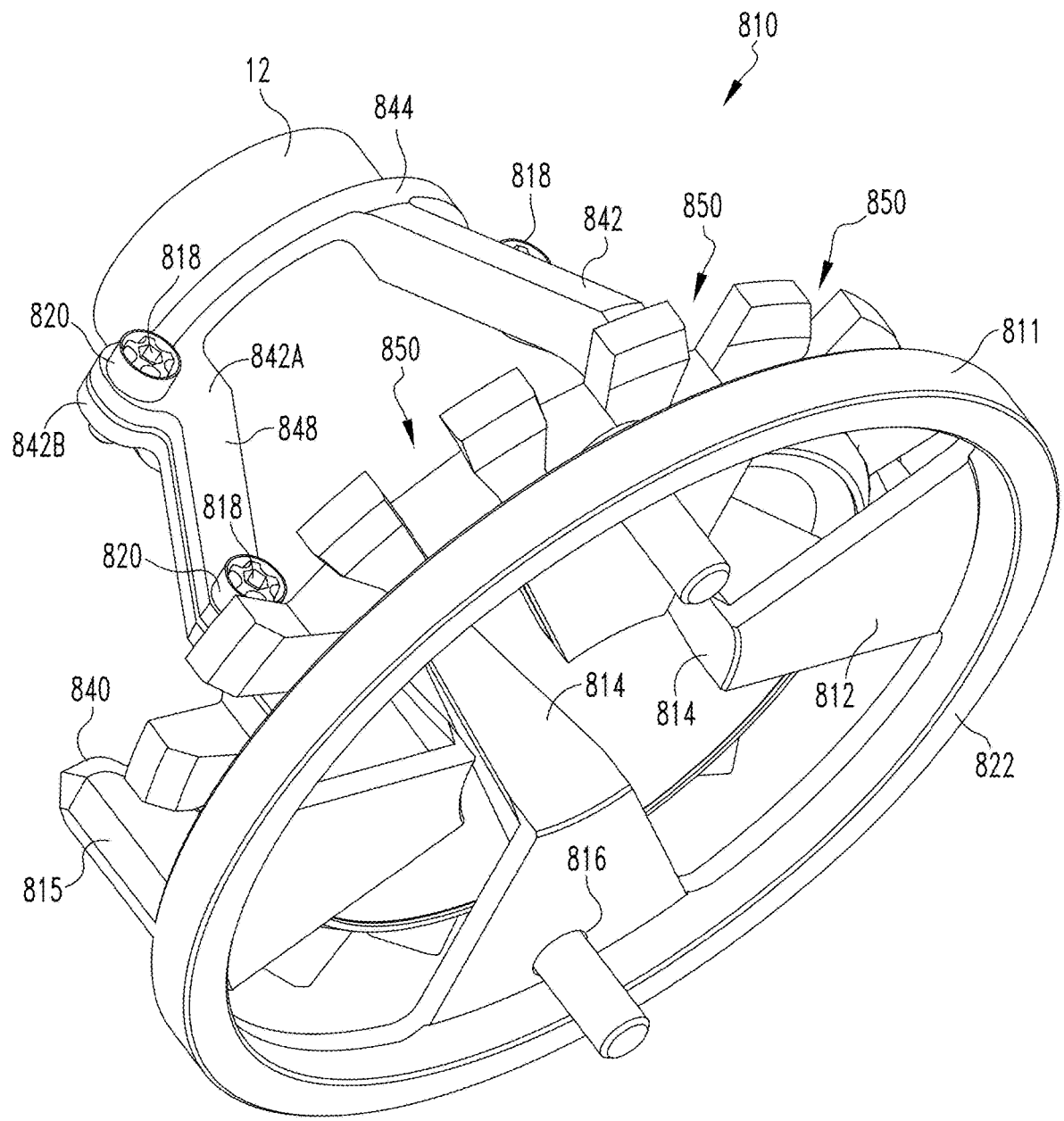
FIG. 57 is a perspective view of wear mitigation device assembled to a guide funnel, such as the guide funnel shown in FIG. 39, in accordance with at least one aspect of the present disclosure.
Figure 58:
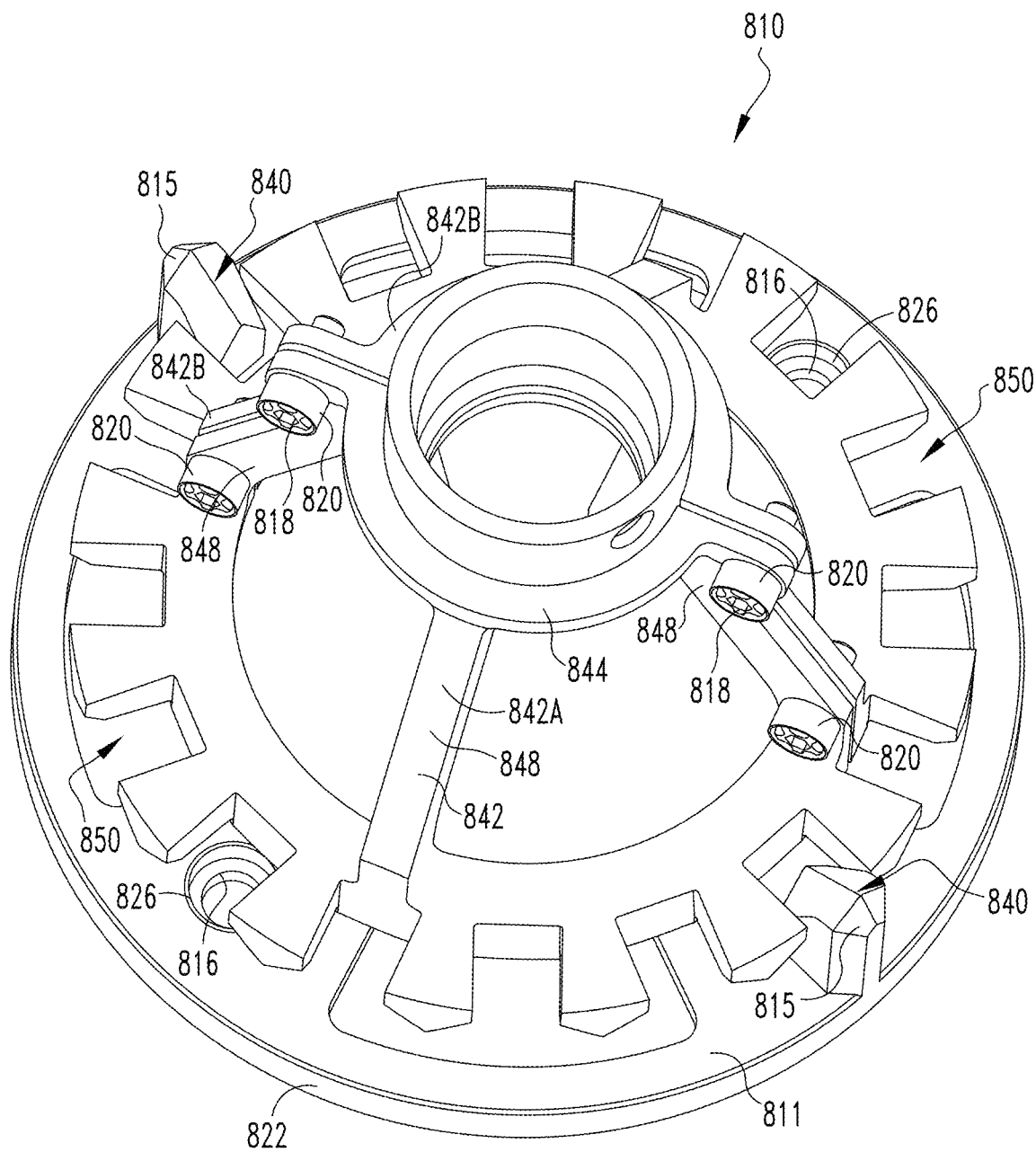
FIG. 58 is another perspective view of the wear mitigation device and the guide funnel of FIG. 57.
Figure 59:
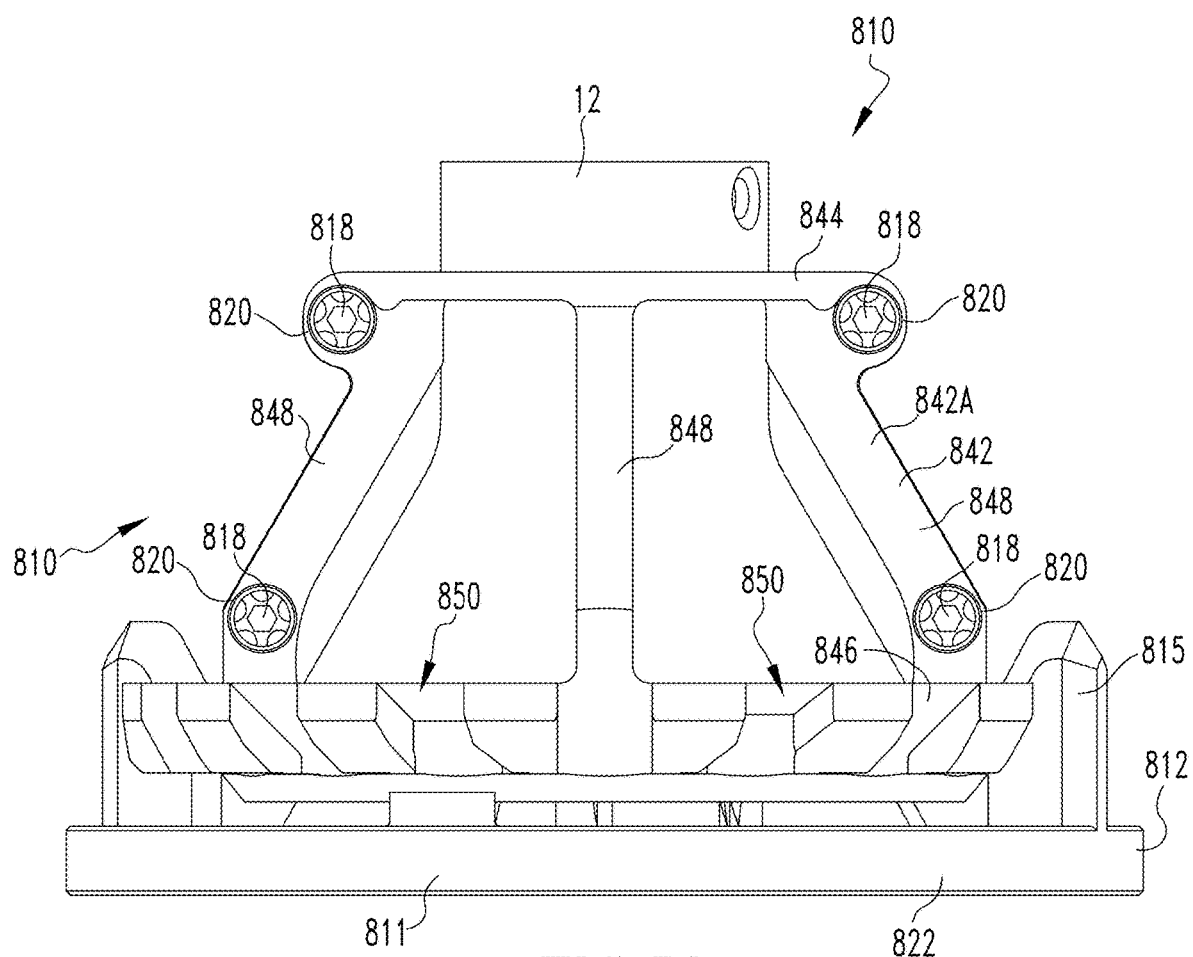
FIG. 59 is a side elevation view of the wear mitigation device and the guide funnel of FIG. 57.
Figure 60:
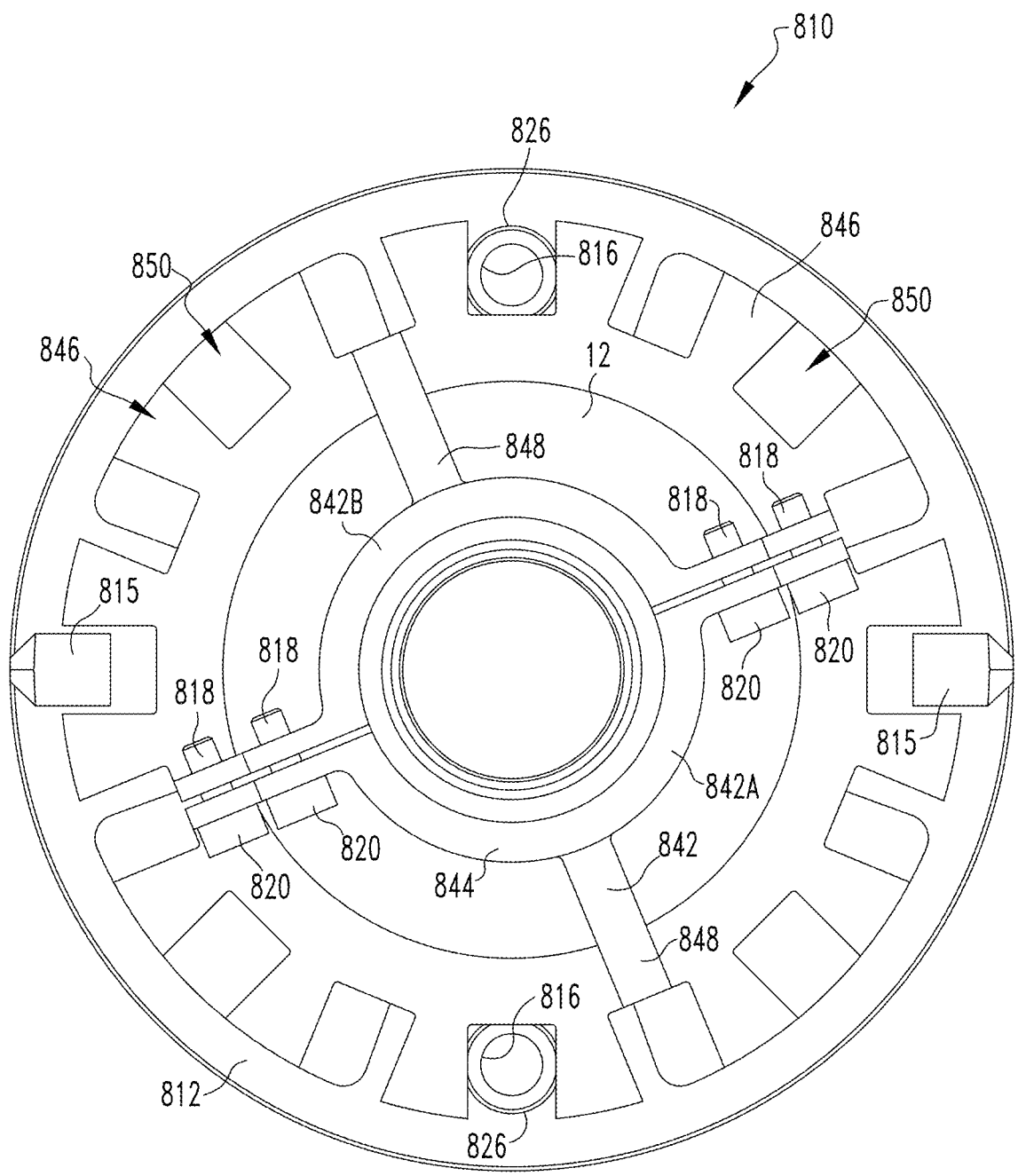
FIG. 60 is a top view of the wear mitigation device and the guide funnel of FIG. 57.
Figure 61:
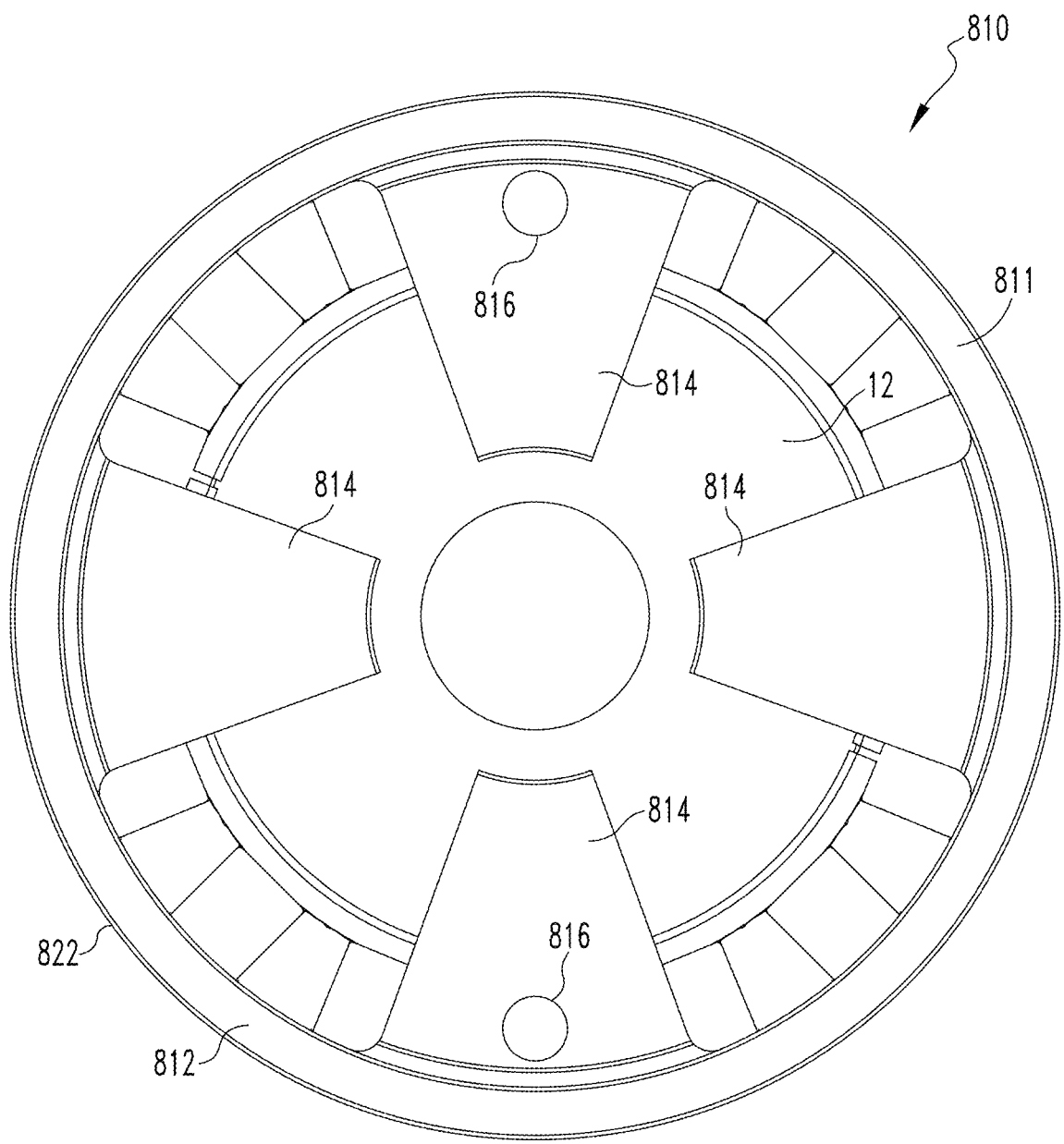
FIG. 61 is a bottom view of the wear mitigation device and the guide funnel of FIG. 57.

Similar to the arrangement of FIG. 36A, FIG. 55A shows an example of a potential initial "raised up" orientation of guide funnel 12' on wear mitigation device 710. Thermal sleeve 10 and guide funnel 12' thereof will rotate as a result of coolant flow until oriented such that the slots 136 align with the keys 134, thus causing the guide funnel 12' and the thermal sleeve 10 to drop into the "fixed" position such as shown in FIG. 55B. However, unlike the arrangement of FIG. 36B in which the outward facing surfaces 132 of device 110 were in contact with the inward facing conical surface 13' of guide funnel 12', the protruding members 114 of the device 710 are sized and configured such that the outward facing surfaces 132 thereof are spaced apart from the inward facing conical surface 13' of guide funnel 12' when guide funnel 12' is in the "fixed" position, as shown in FIGS. 55B and 56. It is to be appreciated that such an arrangement of the device 710 serves to resist and/or reduce and/or prevent rotation of thermal sleeve 10 and guide funnel 12' thereof, while not preventing axial and lateral (to an extent) movement of guide funnel 12' and thermal sleeve 10. Such an arrangement ensures that the flanged top of the thermal sleeve 10 remains in contact with the head penetration adapter 6, thus preventing thermal continuity with the water inside of the CRDM latch assembly.

FIGS. 57-61 depict a wear mitigation arrangement 810 comprising a base portion 811 having a base 812, formed as a circular ring, that is configured to be coupled to a modified guide tube 100' (as previously discussed, e.g., see FIG. 32). The wear mitigation device 810 further comprises a plurality of inner protruding members 814, and a plurality of outer protruding members 815. Each inner protruding member 814 extends generally upward and inward from a radially inner portion of base 812 and is sized and configured to engage the inner conical surface of a guide funnel 12 of a thermal sleeve 10. In the illustrated embodiment, the wear mitigation arrangement 810 includes four inner protruding members 814, however, it is to be appreciated that the quantity of protruding members 814 may be varied without varying from the scope of this disclosure. Each outer protruding member 815 extends generally upward from a radially outward portion of base 812 and includes a ridge 840 facing outward and slightly upward. The wear mitigation arrangement 810 includes two outer protruding members 815, however, it is to be appreciated that the quantity of outer protruding members 815 may be varied without varying from the scope of the present disclosure.

In order to couple the base 812 to the modified guide tube 100', the base 812 includes a plurality of apertures 816 defined therethrough. Each aperture 816 is positioned so as to align with a corresponding one of the plurality of threaded blind holes 102 of modified guide tube 100'(previously discussed) and to receive a threaded bolt (such as threaded bolt 118 of FIGS. 36A and 36B) therethrough which threadingly engages the corresponding threaded blind hole 102 (e.g., similar to the arrangements shown in FIGS. 36A and 36B). In the illustrated embodiment, each aperture is surrounded by a counter bore 826 in the base 812 to seat the head of the threaded bolt. However, other embodiments are envisioned where each aperture is surrounded by a collar that is crimpable, as previously discussed, to prevent the threaded bolts from loosening in service. In order to properly align base 812 with guide tube 100', base 812 may include a circumferential lip 822 that extends downward therefrom which is sized and configured to cooperatively engage a portion of modified guide tube 100' in a manner that aligns base 812 with modified guide tube 100'.

Continuing to refer to FIGS. 57-61, the wear mitigation arrangement 810 further includes a cage 842 which is configured to be generally coupled to the guide funnel 12 just above the conical portion thereof and engage the base portion 811 in a manner that inhibits rotation of the guide funnel 12. More specifically, the cage 842 includes an upper collar 844, a lower ring 846, and a plurality of connecting members 848 which span between the upper collar 844 and the lower ring 846 connecting the two upper collar 844 and lower ring 846 together. The lower ring 846 includes a plurality of circumferentially spaced notch portions 850 defined in the lower ring 846. Each notch portion 850 is configured to engage one of the correspondingly positioned outer protruding member 815 of the base portion 811 in a manner that inhibits rotation of the guide funnel 12. In the illustrated embodiment of FIGS. 57-61 only two notch portions 850 are engaged by outer protruding members 815 of base portion 811. However, other embodiments are envisioned with more or less than two notch portions 850 are engaged by more or less than two outer protruding members 815 (i.e., more or less than two outer protruding members 815 may be provided).

Further to the above, the cage 842 is formed as two separate portions 842A and 842B, which are coupled together via threaded bolts 818. In the illustrated embodiment the bolts are positioned at the top and bottom of the cage 842 and on either side of the cage 842 (i.e., a total of four bolts 818 are provided). Other embodiments are envisioned with more or less than four bolts, for example. The cage 842 further comprises crimpable collars 820, which function in the same manner as those previously discussed, extending from portion 842A of the cage 842. The collars 820 surround the head portion of each bolt 818 when the bolts 818 are assembled to the cage 842. It is to be appreciated that by being separable into two portions 842A and 842B, the cage 842 may readily be retrofitted to the guide funnel 12 on an installed thermal sleeve 10. It is also to be appreciated that the cage 842 may be formed as a single unitary member or in more than two portions which may be coupled together without varying from the scope of the present disclosure.

Figure 62:
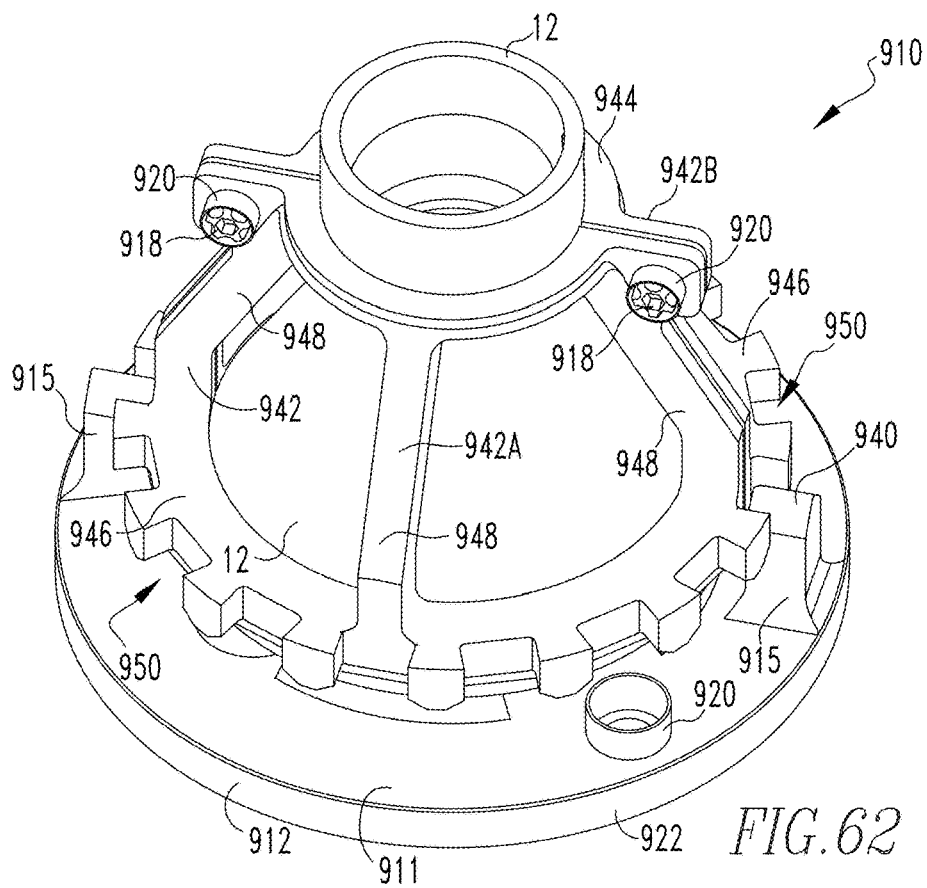
FIG. 62 is a perspective view of a wear mitigation device assembled to a guide funnel, such as the guide funnel shown in FIG. 39, in accordance with at least one aspect of the present disclosure.
Figure 63:
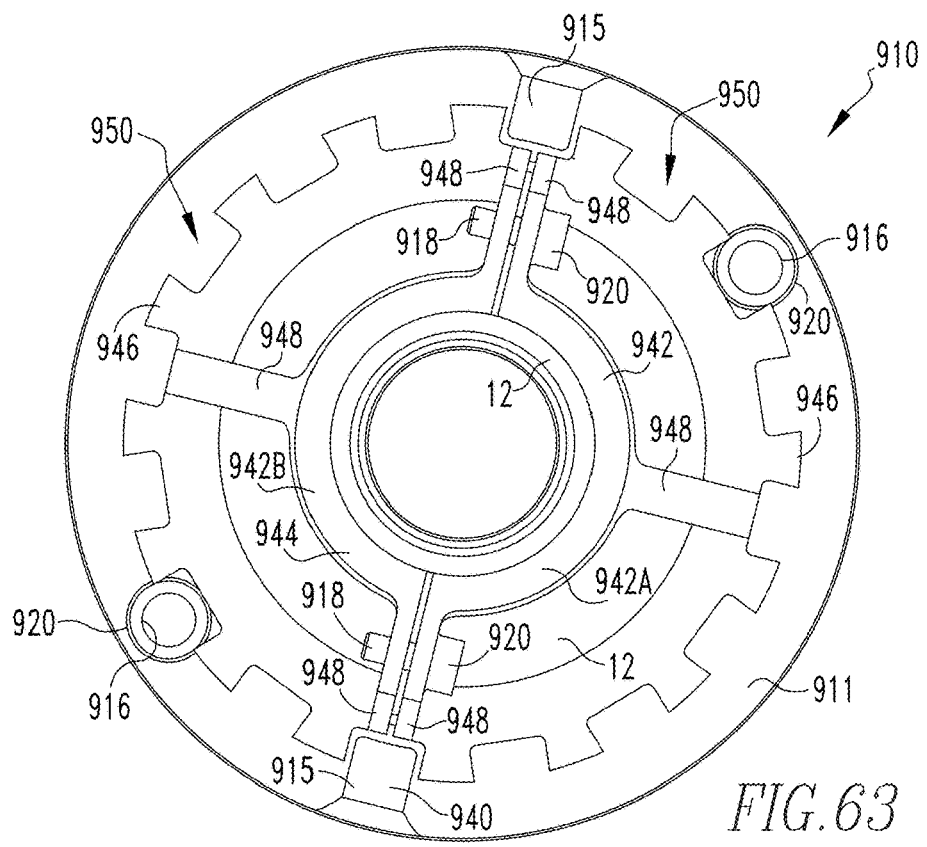
FIG. 63 is a top view of the wear mitigation device and the guide funnel of FIG. 62.

FIGS. 62 and 63 depict a wear mitigation device 910 comprising a base portion 911 having a base 912, formed as a circular ring, that is configured to be coupled to a modified guide tube 100' (such as previously discussed, e.g., see FIG. 32). The wear mitigation device 910 further comprises a plurality of inner protruding members similar to the arrangement of FIGS. 57-61, which the inner conical surfaces of the guide funnel are configured to be seated on. Further, the device 910 comprises a plurality of protruding members 915 which protrude upward from the base portion 911 towards the guide funnel 12. Each of the protruding members 915 includes a flat top surface 940. In the illustrated embodiment, the wear mitigation device 910 includes two protruding members 915, however, it is to be appreciated that the quantity of protruding members 915 may be varied without varying from the scope of the present disclosure.

In order to couple the base 912 to the modified guide tube 100', the base 912 includes a plurality of apertures 916 defined therethrough. Each aperture 916 is positioned so as to align with a corresponding one of the plurality of threaded blind holes 102 of modified guide tube 100'(previously discussed) and to receive a threaded bolt (such as threaded bolt 118 of FIGS. 36A and 36B) therethrough which threadingly engages the corresponding threaded blind hole 102 (e.g., similar to the arrangements shown in FIGS. 36A and 36B). In order to prevent each threaded bolt from loosening, the base 912 further includes a plurality of collars 920, with each collar 920 being disposed about a corresponding one of apertures 916 and extending upward from the base 912. Each collar 920 is deformable inward toward the head portion of each threaded bolt via a crimping tool (not shown) or other suitable mechanism in a manner such that collar 920 may be deformed against the head portion, thus preventing rotation of the threaded bolt engaged by the collar 920. Additionally, the collar 920 prevents loose parts should the head portion separate from the remainder of the threaded bolt. In order to properly align the base 912 with guide tube 100', the base 912 may include a circumferential lip 922 that extends downward therefrom which is sized and configured to cooperatively engage a portion of modified guide tube 100' in a manner that aligns the base 912 with the modified guide tube 100'.

Continuing to refer to FIGS. 62 and 63, the wear mitigation device 910 further includes a cage 942 which is configured to be generally coupled to the guide funnel 12 just above the conical portion thereof and engage the base portion 911 in a manner which inhibits rotation of the guide funnel 12. More particularly, the cage 942 includes an upper collar 944, a lower ring 946, and a plurality of connecting members 948 which span between the upper collar 944 and the lower ring 946 connecting the upper collar 944 and lower ring 946 together. The lower ring 946 includes a plurality of circumferentially spaced notches or recessed portions 950 disposed facing radially outward from the lower ring 946. Each recessed portion 950 is configured to engage a correspondingly positioned protruding member 915 of the base portion 911 in a manner that inhibits rotation of the guide funnel 12 about a central axis of the guide funnel 12, while allowing for axial movement of the guide funnel 12, In the example embodiment of FIGS. 62 and 63, only two recessed portions 950 are engaged by the protruding members 915 of the base portion 911. However, other embodiments are envisioned with more or less than two recessed portions 950 engaged with protruding members 915 (i.e., more or less than two protruding members 915 may be provided).

As illustrated in FIGS. 62 and 63, the cage 942 is formed as two separate portions 942A and 942B, which are coupled together via threaded bolts 918. The cage 942 further comprises crimpable collars 920, which function in the same manner as those previously discussed, extending from portion 942A of the cage 942. The collars 920 surround the head portion of each bolt 918 when the bolts 918 are assembled to the cage 942, It is to be appreciated that by being separable into two portions 942A and 942B, the cage 942 may readily be retrofitted to the guide funnel 12 on an installed thermal sleeve 10. It is also to be appreciated that the cage 942 may be formed as a single unitary member or in more than two portions which may be coupled together without varying from the scope of the present disclosure.

Figure 64:
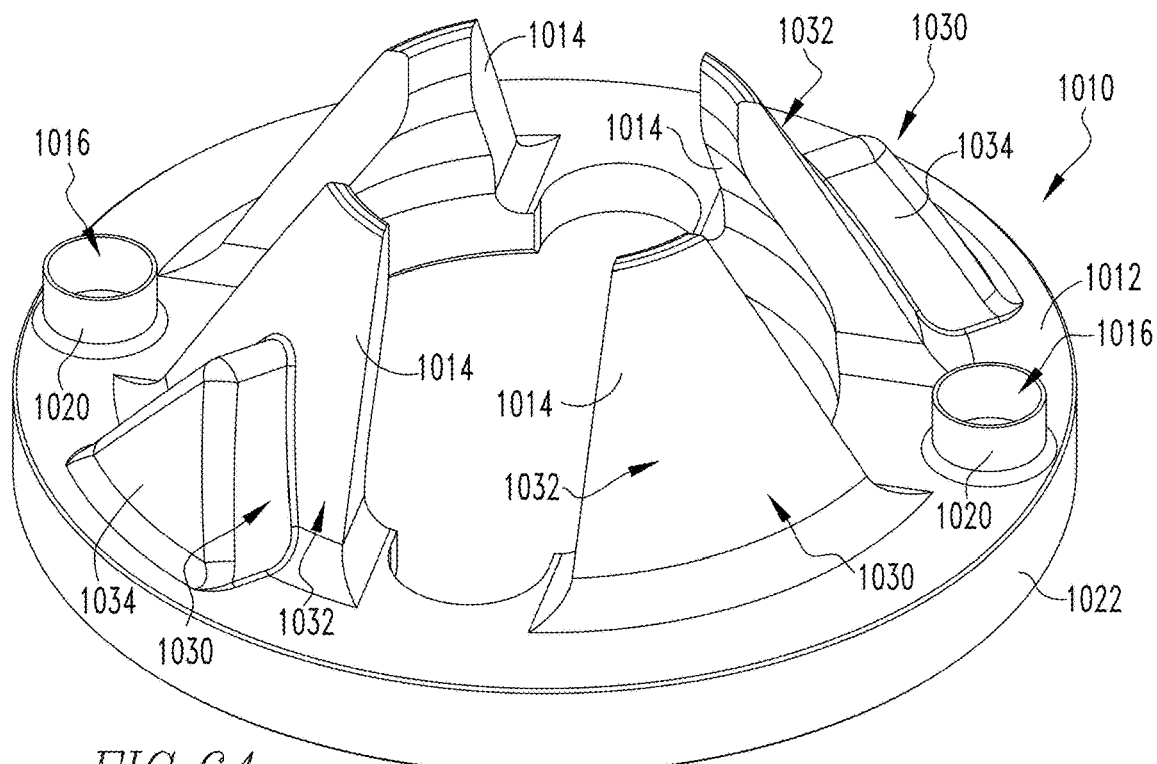
FIG. 64 is a perspective view of a wear mitigation device in accordance with at least one aspect of the present disclosure.
Figure 65:
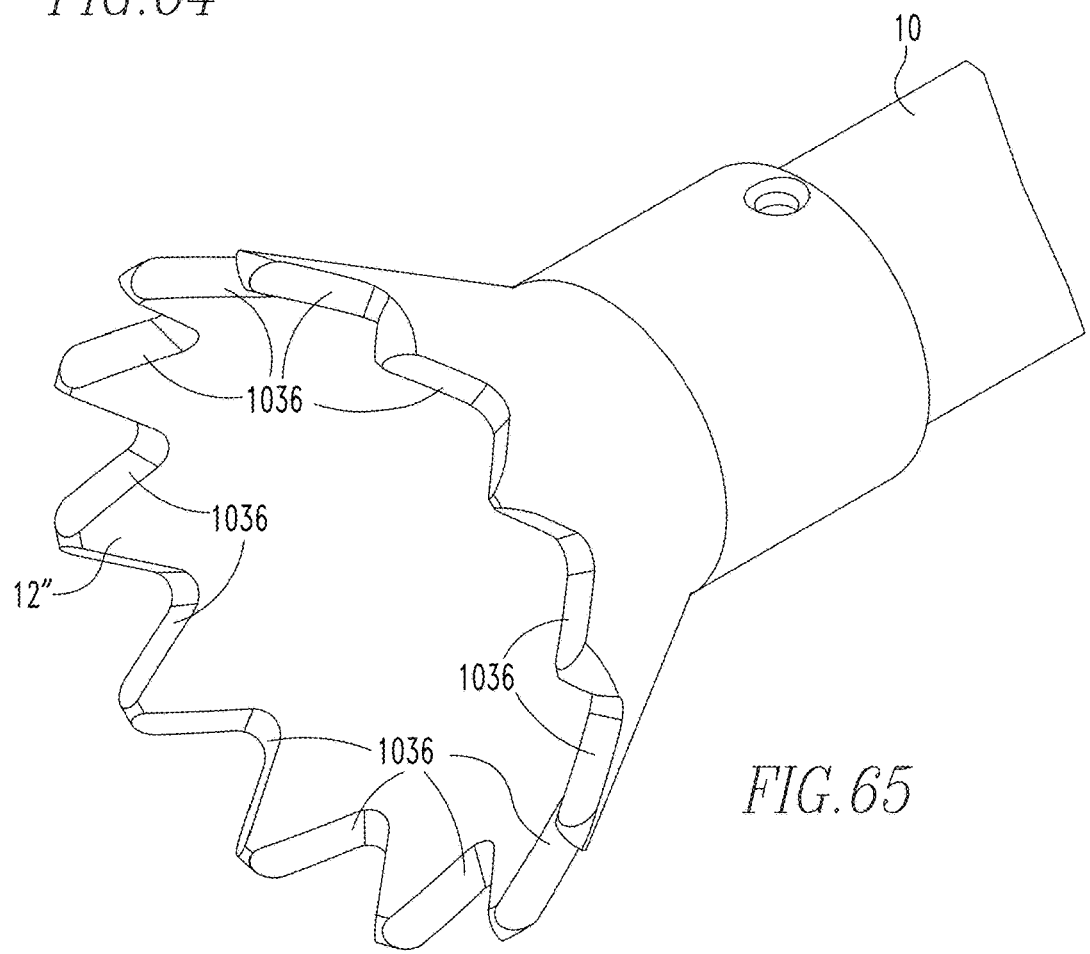
FIG. 65 is a perspective view of another guide funnel installed on a lower portion of a thermal sleeve in accordance with at least one aspect of the present disclosure.

FIG. 64 depicts a wear mitigation device 1010 comprising a base 1012, similar to base 112 previously discussed in regard to FIG. 34, and a plurality of protruding members 1014. Each of the protruding members 1014 extend upward from the base 1012 and are sized and configured to engage a guide funnel 12" of a thermal sleeve 10, such as shown in FIG. 65. In the illustrated embodiment, the wear mitigation device 1010 includes four protruding members 1014, however, it is to be appreciated that the quantity of protruding members 1014 may be varied without varying from the scope of the present disclosure.

Figure 66:
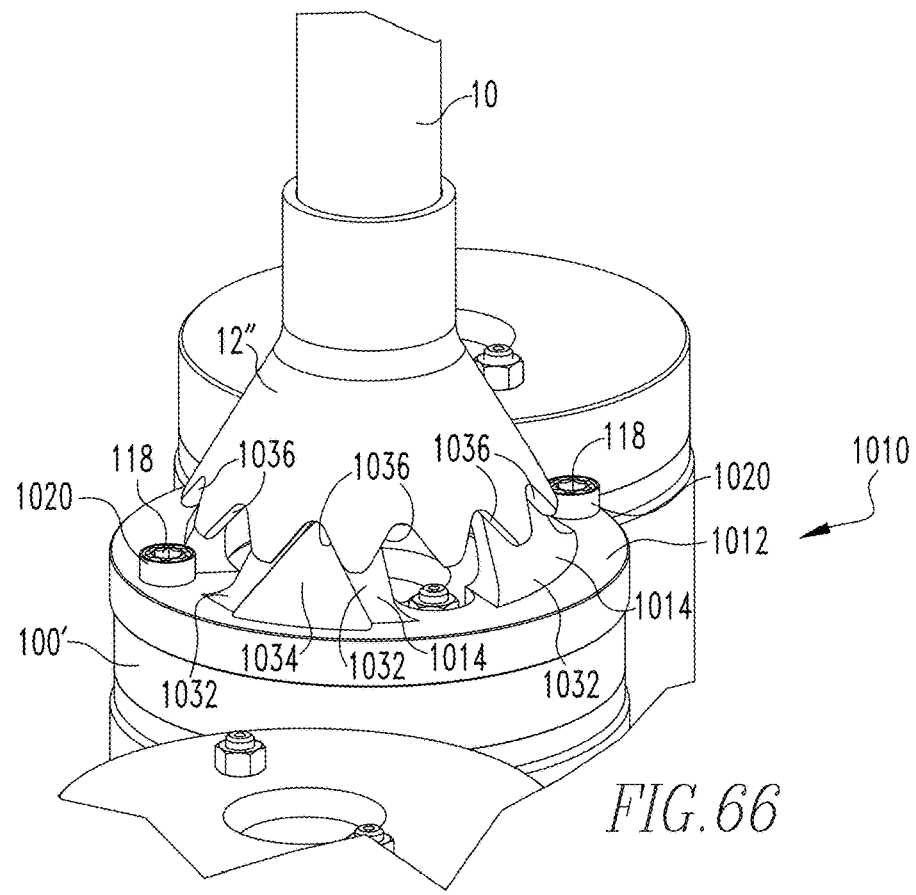
FIGS. 66 and 67 are perspective views of an arrangement of guide tubes, similar to FIG. 32, shown with the wear mitigation device of FIG. 64 installed on one of the guide tubes and the guide funnel of FIG. 65 engaged with the wear mitigation device.
Figure 67:
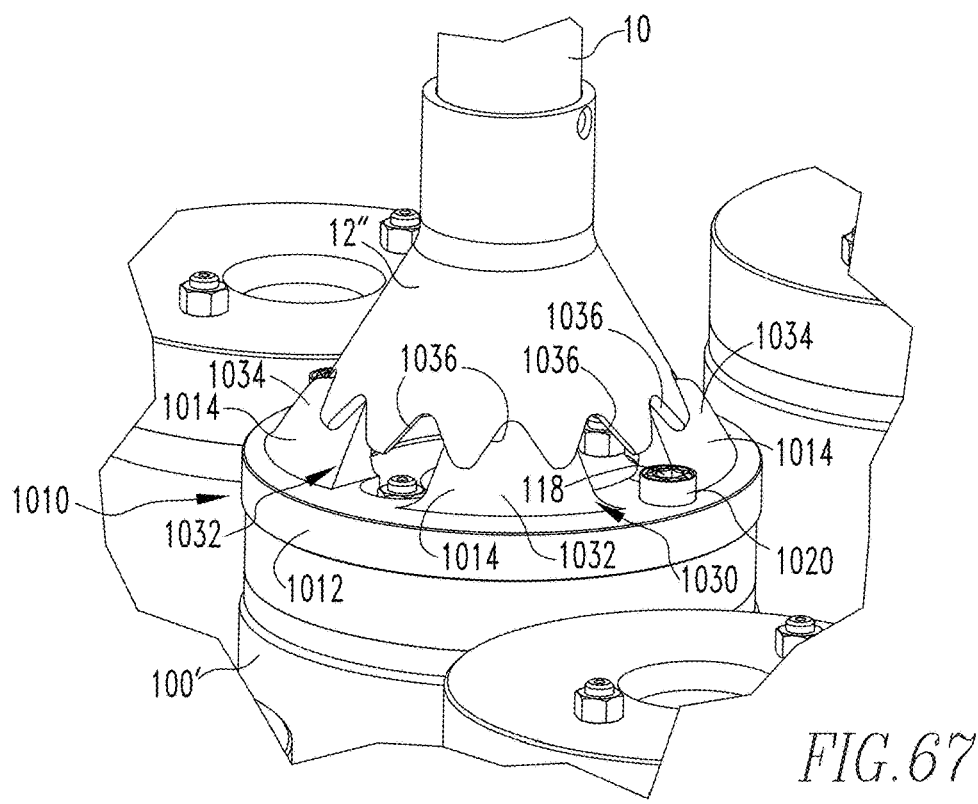
Figure 68:
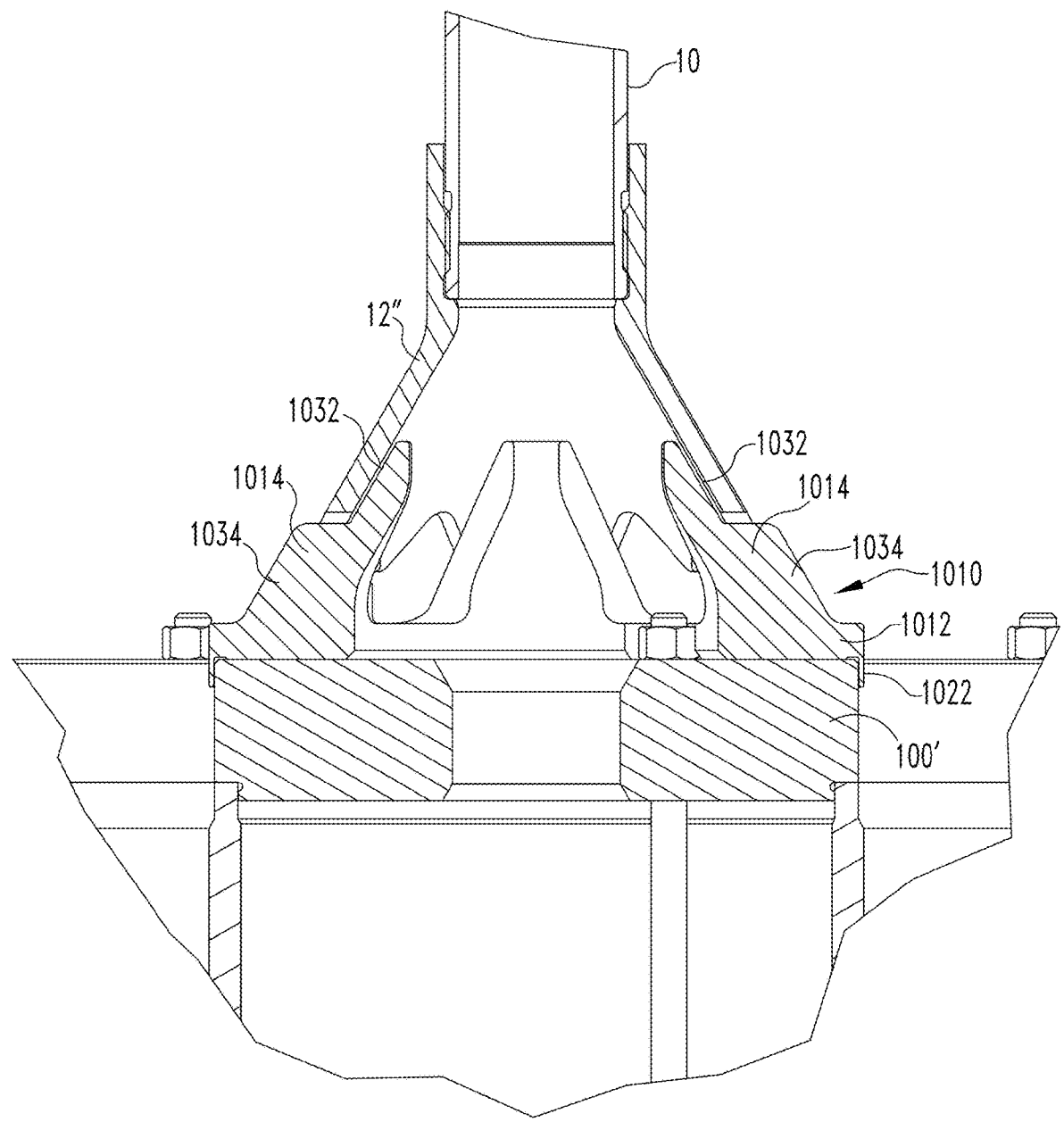
FIG. 68 is a sectional elevation view of the wear mitigation device and guide funnel of FIGS. 66 and 67.

In order to couple the base 1012 to the modified guide tube 100', the base 1012 includes a plurality of apertures 1016 defined therethrough. Each aperture 1016 is positioned so as to align with a corresponding one of the plurality of threaded blind holes 102 of modified guide tube 100' and to receive a threaded bolt 118 therethrough, such as shown in FIGS. 66 and 67, which threadingly engages the corresponding threaded blind hole 102. In order to prevent each threaded bolt 118 from loosening, the base 1012 further includes a plurality of collars 1020, with each collar 1020 being disposed about a corresponding one of the apertures 1016 and extending upward from base 1012, Each collar 1020 is deformable inward toward the head portion of each threaded bolt 118 via a crimping tool (not shown) or other suitable mechanism in a manner such that collar 1020 may be deformed against the head portion, thus preventing rotation of the threaded bolt 118 engaged by the collar 1020. Additionally, the collar 1020 prevents loose parts should the head portion separate from the remainder of the threaded bolt 118. In order to properly align the base 1012 with the guide tube 100', the base 1012 may include a circumferential lip 1022 that protrudes downward from the base 1012 and which is sized and configured to cooperatively engage a portion of the modified guide tube 100' in a manner that aligns the base 1012 with the modified guide tube 100'.

Each extending member 1014 includes a portion 1030 that is configured to engage a corresponding portion of guide funnel 12" of the thermal sleeve 10. Each portion 1030 includes an outward facing surface 1032 that is disposed at an angle that corresponds to the angle of an inner conical surface of guide funnel 12". Two of the portions 1030 further include a generally triangular-shaped key 1034 extending further outward from the outward facing surface 1032. The triangular-shaped key 1034 is sized and configured to cooperatively engage a corresponding triangular-shaped indent or notch 1036 (e.g., formed via EDM machining or other suitable method) defined in guide funnel 12". The engagement between each triangular-shaped key 1034 and corresponding notch 1036 resists, reduces, and/or prevents rotation of the thermal sleeve 10, thus reducing wear otherwise resulting from rotation.

Various aspects of the subject matter described herein are set out in the following examples.

Example 1—A device for resisting rotation of a thermal sleeve about a central axis thereof relative to a head penetration adapter in a nuclear reactor, wherein the device comprises a first structure provided on or in the thermal sleeve and a second structure provided on or in the head penetration adapter. The first structure and the second structure are configured to be operably engaged to resist rotation of the thermal sleeve about the central axis relative to the head penetration adapter while allowing axial movement of the thermal sleeve relative to the head penetration adapter.

Example 2—The device of Example 1, wherein the first structure comprises a first ring configured to be coupled to the thermal sleeve, wherein the first ring comprises a plurality of rod members extending therefrom, wherein each rod member extends along a rod axis that is parallel to the central axis of the thermal sleeve when the first structure is coupled to the thermal sleeve, wherein the second structure comprises a second ring configured to be coupled to the head penetration adapter, wherein the second ring comprises a plurality of thru-holes formed therein, wherein each thru-hole defines a thru-hole axis that is parallel to the central axis when the second ring is coupled to the head penetration adapter, and wherein each rod member of the first ring is configured to slidingly engage a corresponding thru-hole of the second ring.

Example 3—The device of Example 2, wherein the first ring is formed of a stainless steel material, and wherein the second ring is formed from an alloy.

Example 4—The device of Examples 2 or 3, wherein the second ring comprises a female threaded portion which is configured to engage a cooperatively male threaded portion of the head penetration adapter.

Example 5—The device of Examples 2, 3, or 4, wherein the second ring comprises an inner stepped portion configured to receive a lower end of the head penetration adapter.

Example 6—The device of Examples 2, 3, 4, or 5, wherein the second ring comprises a first segment and a second segment, and wherein the first segment is couplable to the second segment to attach the second ring to the head penetration adapter.

Example 7—The device of Examples 2, 3, 4, 5, or 6, wherein the plurality of rod members comprises two rod members.

Example 8—The device of Examples 2, 3, 4, 5, 6, or 7, wherein the first ring comprises a first segment and a second segment, and wherein the first segment is couplable to the second segment to attach the first ring to the thermal sleeve.

Example 9—The device of Example 8, wherein the first segment and the second segment each include interlocking portions, and wherein the first segment and the second segment are couplable together via the interlocking portions.

Example 10—The device of Example 2, wherein the first ring comprises a first piece and a second piece separate from the first piece, wherein the first piece includes one rod member of the plurality of rod members, and wherein the second piece includes another rod member of the plurality of rod members.

Example 11—The device of Examples 2 or 10, wherein each rod member has a non-circular cross-section and wherein each thru-hole has a correspondingly-shaped non-circular cross-section.

Example 12—The device of Examples 1, 2, 3, 4, 5, 6, 7, 8, 9, 10, or 11, wherein one of the first structure and the second structure comprises a mechanical clamp configured to mechanically couple one of the first structure and the second structure to the thermal sleeve or the head penetration adapter.

Example 13—The device of Examples 1, 2, 3, 4, 5, 6, 7, 8, 9, 10, 11, or 12, wherein the first structure comprises a split clamp configured to be coupled to the thermal sleeve, and wherein the split clamp comprises two segments which are configured to be coupled together via threaded fasteners.

Example 14—The device of Example 13, wherein one of the two segments includes pockets formed therein for engagement by crimped portions of one of the threaded fasteners.

Example 15—The device of Examples 13 or 14, wherein one of the two segments comprises a pair of rods extending therefrom, wherein the second structure comprises axial slots formed in the head penetration adapter, and wherein each rod is configured to engage a respective axial slot in the head penetration adapter.

Example 16—The device of Example 1, wherein the second structure comprises a body portion configured to be coupled to the head penetration adapter, wherein the body portion includes a plurality of apertures oriented orthogonal to the central axis, wherein each aperture comprises a slidable member positioned therein, wherein the first structure comprises a plurality of slots defined in the thermal sleeve, and wherein each slidable member is configured to engage a corresponding slot in the thermal sleeve.

Example 17—A device for reducing wear of a thermal sleeve of a nuclear reactor, the device comprising a base configured to be coupled to a guide tube of the nuclear reactor and a plurality of protrusions extending upward from the base. Each protrusion is configured to engage a corresponding portion of a guide funnel of the thermal sleeve.

Example 18—The device of Example 17, wherein the base comprises a generally circular ring.

Example 19—The device of Example 18, wherein the ring comprises a plurality of apertures defined therein.

Example 20—The device of Examples 17, 18, or 19, wherein the base further comprises a circumferential lip extending downward therefrom, and wherein the circumferential lip is sized and configured to engage an outer portion of the guide tube.

Example 21—The device of Examples 17, 18, 19, or 20, wherein the base further comprises a plurality of collars, each collar being disposed about a corresponding one of the apertures and extending upward from the base.

Example 22—The device of Examples 17, 18, 19, 20, or 21, wherein each protrusion extending from the base comprises an outward facing surface disposed at an angle that corresponds to the angle of an inner conical surface of the guide funnel.

Example 23—The device of Example 22, wherein each outward facing surface is sized and configured to engage a corresponding portion of the inner conical surface of the guide funnel.

Example 24—The device of Examples 22 or 23, wherein the outward facing surface of each protrusion of the base comprises a key extending further outward therefrom, and wherein each key is sized and configured to cooperatively engage a corresponding slot defined in the guide funnel.

Example 25—The device of Example 24, wherein each key comprises a vertically oriented ridge-like element.

Example 26—The device of Examples 17, 18, 19, 20, 21, 22, 23, 24, or 25, wherein each protrusion of the base comprises an inward facing notch that is sized and configured to engage a portion of an outer periphery of a guide funnel coupled to the thermal sleeve.

While specific embodiments of the invention have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the invention which is to be given the full breadth of the appended claims and any and all equivalents thereof.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

In summary, numerous benefits have been described which result from employing the concepts described herein. The foregoing description of the one or more forms has been presented for purposes of illustration and description. It is not intended to be exhaustive or limiting to the precise form disclosed, Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope,

What is claimed is:

1. A device for resisting rotation of a thermal sleeve about a central axis thereof relative to a head penetration adapter in a nuclear reactor, wherein the device comprises:
   a first structure provided on or in the thermal sleeve; and
   a second structure provided on or in the head penetration adapter, wherein the first structure and the second structure are configured to be operably engaged to resist rotation of the thermal sleeve about the central axis relative to the head penetration adapter while allowing axial movement of the thermal sleeve relative to the head penetration adapter, wherein the first structure comprises a first ring configured to be coupled to the thermal sleeve, wherein the first ring comprises a plurality of rod members extending therefrom, wherein each rod member extends along a rod axis that is parallel to the central axis of the thermal sleeve when the first structure is coupled to the thermal sleeve, wherein the second structure comprises a second ring configured to be coupled to the head penetration adapter, wherein the second ring comprises a plurality of thru-holes formed therein, wherein each thru-hole defines a thru-hole axis that is parallel to the central axis when the second ring is coupled to the head penetration adapter, and wherein each rod member of the first ring is configured to slidingly engage a corresponding thru-hole of the second ring.

2. The device of claim 1, wherein the first ring is formed of a stainless steel material, and wherein the second ring is formed from an alloy.

3. The device of claim 1, wherein the second ring comprises a female threaded portion which is configured to engage a cooperatively male threaded portion of the head penetration adapter.

4. The device of claim 1, wherein the second ring comprises an inner stepped portion configured to receive a lower end of the head penetration adapter.

5. The device of claim 1, wherein the second ring comprises a first segment and a second segment, and wherein the first segment is couplable to the second segment to attach the second ring to the head penetration adapter.

6. The device of claim 1, wherein the plurality of rod members consists of two rod members.

7. The device of claim 1, wherein the first ring comprises a first segment and a second segment, and wherein the first segment is couplable to the second segment to attach the first ring to the thermal sleeve.

8. The device of claim 7, wherein the first segment and the second segment each include interlocking portions, and wherein the first segment and the second segment are couplable together via the interlocking portions.

9. The device of claim 1, wherein the first ring comprises a first piece and a second piece separate from the first piece, wherein the first piece includes one rod member of the plurality of rod members, and wherein the second piece includes another rod member of the plurality of rod members.

10. The device of claim 1, wherein each rod member has a non-circular cross-section and wherein each thru-hole has a correspondingly-shaped non-circular cross-section.

11. The device of claim 1, wherein one of the first ring and the second ring comprises a mechanical clamp configured to mechanically couple one of the first ring and the second ring to the thermal sleeve or the head penetration adapter.

12. The device of claim 1, wherein the first ring comprises a split clamp configured to be coupled to the thermal sleeve, and wherein the split clamp comprises two segments which are configured to be coupled together via threaded fasteners.

13. The device of claim 12, wherein one of the two segments includes pockets formed therein for engagement by crimped portions of one of the threaded fasteners.

14. A device for resisting rotation of a thermal sleeve about a central axis thereof relative to a head penetration adapter in a nuclear reactor, wherein the device comprises:
a first structure provided on or in the thermal sleeve; and
a second structure provided on or in the head penetration adapter, wherein the first structure and the second structure are configured to be operably engaged to resist rotation of the thermal sleeve about the central axis relative to the head penetration adapter while allowing axial movement of the thermal sleeve relative to the head penetration adapter, wherein the first structure comprises a split clamp configured to be coupled to the thermal sleeve, wherein the split clamp comprises two segments which are configured to be coupled together via threaded fasteners, wherein one of the two segments comprises a pair of rods extending therefrom, wherein the second structure comprises axial slots defined in the head penetration adapter, wherein the axial slots extend longitudinally along a length of the head penetration adapter, and wherein each rod is configured to engage a respective axial slot in the head penetration adapter.

15. A device for resisting rotation of a thermal sleeve about a central axis thereof relative to a head penetration adapter in a nuclear reactor, wherein the device comprises:
a first structure provided on or in the thermal sleeve; and
a second structure provided on or in the head penetration adapter, wherein the first structure and the second structure are configured to be operably engaged to resist rotation of the thermal sleeve about the central axis relative to the head penetration adapter while allowing axial movement of the thermal sleeve relative to the head penetration adapter, wherein the second structure comprises a body portion configured to be coupled to the head penetration adapter, wherein the body portion includes a plurality of apertures oriented orthogonal to the central axis, wherein each aperture comprises a slidable member positioned therein, wherein the first structure comprises a plurality of slots defined in the thermal sleeve, and wherein each slidable member is configured to engage a corresponding slot in the thermal sleeve.

* * * * *